(12) United States Patent
Gizzatov et al.

(10) Patent No.: US 11,078,405 B2
(45) Date of Patent: *Aug. 3, 2021

(54) 3 IN 1 FOAM FORMULATION FOR ENHANCED OIL RECOVERY INCLUDING CONFORMANCE CONTROL, ULTRA-LOW INTERFACIAL TENSION, AND WETTABILITY ALTERATION

(71) Applicant: SAUDI ARABIAN OIL COMPANY, Dhahran (SA)

(72) Inventors: Ayrat Gizzatov, Cambridge, MA (US); Shehab Alzobaidi, Cambridge, MA (US); Amr Abdel-Fattah, Dhahran (SA)

(73) Assignee: SAUDI ARABIAN OIL COMPANY

( * ) Notice: Subject to any disclaimer, the term of this patent is extended or adjusted under 35 U.S.C. 154(b) by 0 days.

This patent is subject to a terminal disclaimer.

(21) Appl. No.: 16/990,653

(22) Filed: Aug. 11, 2020

(65) Prior Publication Data

US 2020/0369949 A1 Nov. 26, 2020

Related U.S. Application Data

(63) Continuation-in-part of application No. 15/917,097, filed on Mar. 9, 2018.

(Continued)

(51) Int. Cl.
| | |
|---|---|
| *E21B 43/16* | (2006.01) |
| *C09K 8/594* | (2006.01) |
| *C09K 8/584* | (2006.01) |

(52) U.S. Cl.
CPC .............. *C09K 8/594* (2013.01); *C09K 8/584* (2013.01); *E21B 43/164* (2013.01); *E21B 43/166* (2013.01)

(58) Field of Classification Search
CPC ........ C09K 8/594; C09K 8/584; E21B 43/164
(Continued)

(56) References Cited

U.S. PATENT DOCUMENTS

| | | | |
|---|---|---|---|
| 3,939,911 | A | 2/1976 | Maddox et al. |
| 4,008,165 | A | 2/1977 | Maddox et al. |

(Continued)

FOREIGN PATENT DOCUMENTS

| | | |
|---|---|---|
| CN | 103421481 A | 12/2013 |
| CN | 104419395 A | 3/2015 |

(Continued)

OTHER PUBLICATIONS

"Safety Assessment of Alkyl Betaines as Used in Cosmetics", Cosmetic Ingredient Review Final Report, 2014, pp. 23.

(Continued)

*Primary Examiner* — Zakiya W Bates
*Assistant Examiner* — Ashish K Varma
(74) *Attorney, Agent, or Firm* — Bracewell LLP; Constance Gall Rhebergen

(57) ABSTRACT

Embodiments of the disclosure provide compositions and methods suitable for injection of a nanosurfactant-based foam composition into a hydrocarbon-bearing formation for enhanced recovery operations. The nanosurfactant-based foam composition includes a gaseous component and nanoassemblies. The nanoassemblies contain a petroleum sulfonate surfactant, mineral oil, and a zwitterionic co-surfactant.

20 Claims, 30 Drawing Sheets

Related U.S. Application Data

(60) Provisional application No. 62/469,414, filed on Mar. 9, 2017.

(58) Field of Classification Search
USPC .................................................. 166/270.1
See application file for complete search history.

(56) References Cited

U.S. PATENT DOCUMENTS

| | | |
|---|---|---|
| 4,017,405 A | 4/1977 | Holm |
| 4,018,278 A | 4/1977 | Shupe |
| 4,066,124 A | 1/1978 | Carlin et al. |
| 4,088,189 A | 5/1978 | Shupe |
| 4,094,798 A | 6/1978 | Tate et al. |
| 4,110,228 A | 8/1978 | Tyler et al. |
| 4,110,229 A | 8/1978 | Carlin et al. |
| 4,120,358 A | 10/1978 | Kalfoglou |
| 4,154,301 A | 5/1979 | Carlin et al. |
| 4,194,565 A * | 3/1980 | Kalfoglou ............. C09K 8/584 166/275 |
| 4,296,812 A | 10/1981 | Kalfoglou |
| 4,318,816 A | 3/1982 | Schievelbein |
| 4,667,740 A | 5/1987 | Maddox, Jr. |
| 5,074,385 A | 12/1991 | Tanino et al. |
| 5,203,411 A | 4/1993 | Dawe et al. |
| 5,360,558 A | 11/1994 | Pakulski et al. |
| 5,736,496 A | 4/1998 | Durbut et al. |
| 6,302,209 B1 * | 10/2001 | Thompson, Sr. ... B01F 17/0028 166/305.1 |
| 7,094,738 B2 | 8/2006 | Patal et al. |
| 7,104,327 B2 | 9/2006 | Harris et al. |
| 7,932,214 B2 | 4/2011 | Zamora et al. |
| 7,939,470 B1 | 5/2011 | Wagle et al. |
| 8,252,729 B2 | 8/2012 | Zhang |
| 8,403,044 B2 | 3/2013 | Hutchison et al. |
| 8,637,622 B2 | 1/2014 | Monin et al. |
| 8,946,132 B2 | 2/2015 | Chang et al. |
| 8,969,261 B2 | 3/2015 | Talingting Pabalan et al. |
| 8,985,206 B2 | 3/2015 | Morvan et al. |
| 9,321,955 B2 | 4/2016 | Hill et al. |
| 9,512,704 B2 | 12/2016 | Dawson et al. |
| 9,951,264 B2 | 4/2018 | Penny et al. |
| 10,059,872 B2 | 8/2018 | Janak et al. |
| 10,190,036 B2 | 1/2019 | Hernandez-Altamirano et al. |
| 2012/0095111 A1 | 4/2012 | Findley et al. |
| 2012/0285694 A1 | 11/2012 | Morvan et al. |
| 2013/0292121 A1 | 11/2013 | Penny et al. |
| 2015/0107832 A1 | 4/2015 | Dewolf et al. |
| 2015/0183979 A1 | 7/2015 | Pabalan et al. |
| 2016/0003018 A1 * | 1/2016 | Saboowala ............. C09K 8/68 166/298 |
| 2016/0075932 A1 * | 3/2016 | Silveira .................. C09K 8/703 166/308.6 |
| 2016/0076348 A1 | 3/2016 | Fernandez-Ibanez et al. |
| 2016/0160113 A1 | 6/2016 | Nguyen et al. |
| 2016/0186546 A1 | 6/2016 | Dawson et al. |
| 2016/0194550 A1 | 7/2016 | Hill et al. |
| 2016/0251568 A1 | 9/2016 | Do et al. |
| 2016/0257879 A1 | 9/2016 | Huang et al. |
| 2016/0290104 A1 | 10/2016 | Nelson et al. |
| 2017/0044423 A1 | 2/2017 | Weerasooriya et al. |
| 2017/0198193 A1 | 7/2017 | Rebolledo et al. |
| 2018/0134941 A1 | 5/2018 | Saboowala et al. |
| 2018/0346798 A1 | 6/2018 | Abdel-Fattah |
| 2018/0273830 A1 | 9/2018 | Hernandez Altamirano et al. |
| 2019/0169492 A1 | 6/2019 | Hill et al. |
| 2019/0330518 A1 | 10/2019 | Dai et al. |
| 2019/0345373 A1 | 11/2019 | Favero |

FOREIGN PATENT DOCUMENTS

| | | |
|---|---|---|
| CN | 105971571 A | 9/2016 |
| EP | 1201720 A1 | 5/2002 |
| EP | 2465911 A1 | 6/2012 |
| GB | 2001377 A | 1/1979 |
| WO | 2015135777 A2 | 9/2015 |
| WO | 2018209716 A1 | 11/2018 |
| WO | 2019195604 A1 | 10/2019 |

OTHER PUBLICATIONS

"Safety Assessment of Alkyl Sultaines as Used in Cosmetics", Tentative Report for Public Comment, 2017, pp. 21.

Ahmed et al., "Empirical Modeling of the Viscosity of Supercritical Carbon Dioxide Foam Fracturing Fluid under Different Downhole Conditions", Energies, 2018, pp. 1-16.

Gizzatov et al., "Nanofluid of Petroleum Sulfonate Nanocapsules for Enhanced Oil Recovery in High-Temperature and High-Salinity Reseervoirs", Energy & Fuels 33 (2019) pp. 11567-11573.

He et al., "Brine-Soluble Zwitterionic Copolymers with Tunable Adsorption onRocks", Applied Materials & Interfaces, 2020, pp. 13568-13574.

International Search Report and Written Opinion for International Application No. PCT/US2018/021647; report dated Aug. 8, 2018; 16 pages.

Li, et al, : "Synergism in mixed zwitterionic-anionic surfactant solutions and the aggregation numbers of the mixed micelles" Colloids and Surfaces A: Physiochemicaland Engineering Aspects, vol. 145, No. 1-3, pp. 167-174, Dec. 1998.

Negin et al., "Most common surfactants employed in chemical enhanced oilrecovery", Petroleum, 2017, pp. 197-211.

Rosen, et al,"Synergism in binary mixtures of surfactants 12. Mixtures containing surfactants with two hydrophilic and two or three hydrophobicgroups";Colloids and Surfaces A: Physiochemicaland Engineering Aspects; vol. 88, No. 1; pp. 1-11; Aug. 1994.

Syed et al., "Influence of lauryl betaine on aqueous solution stability, foamability and foam stability", Journal of Petroleum Exploration and Production Technology, 2019, pp. 2659-2665.

Alzobaidi et al., "Continuous flow synthesis of petroleum sulfonates from crude oil and formulation into nano-surfactants for cost efficient oil mobilization", Society of Petroleum Engineers, 2018, pp. 1-9.

Singh et al., "Foams with wettability-altering capabilities for oil-wet carbonates: A synergistic approach", Society of Petroleum Engineers, 2016, pp. 1-14.

* cited by examiner

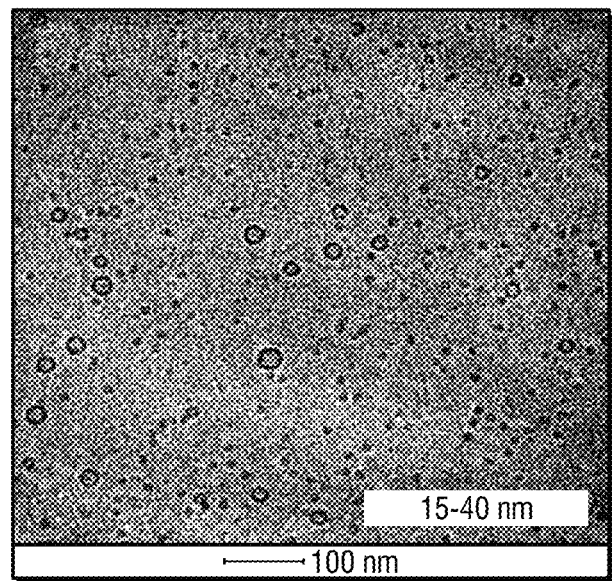
FIG. 3
 
FIG. 4A     FIG. 4B

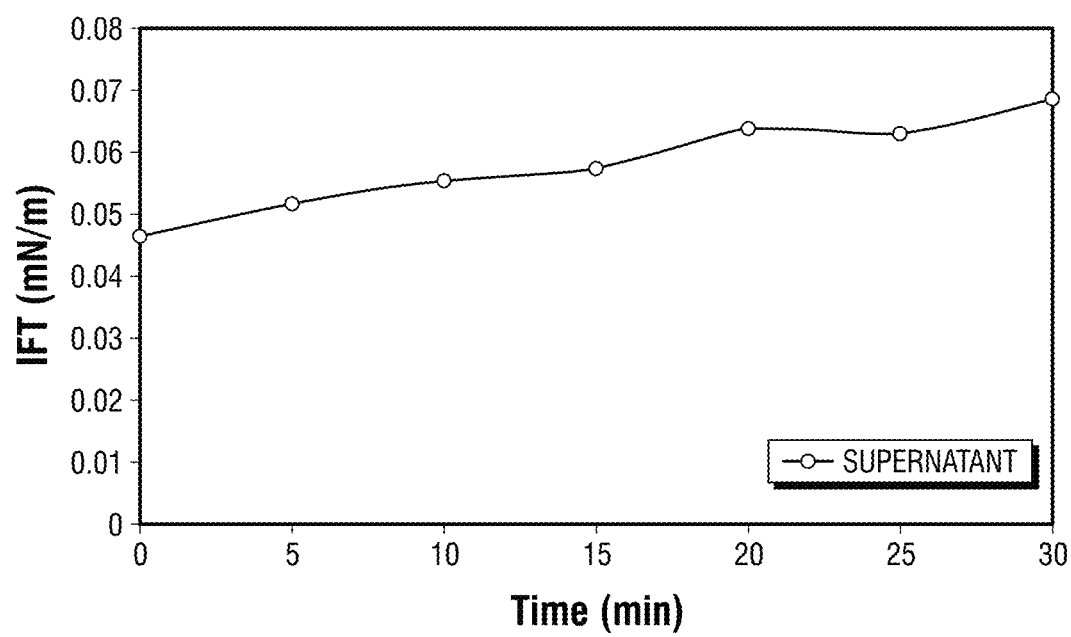
*FIG. 12*
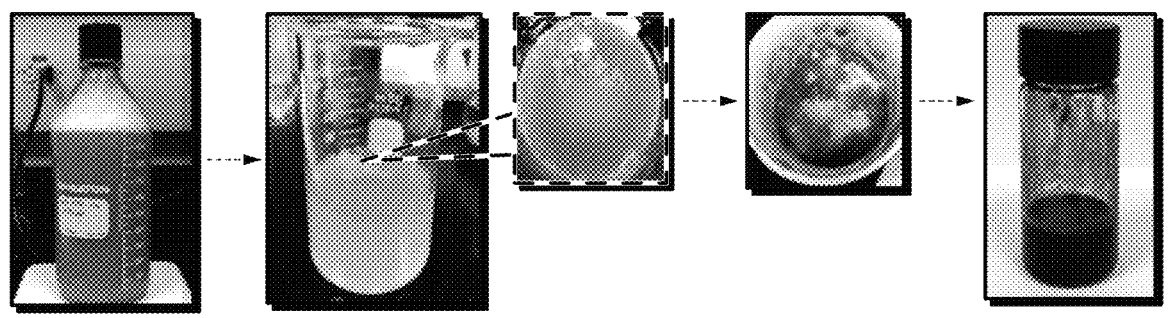
*FIG. 13A*  *FIG. 13B*  *FIG. 13C*  *FIG. 13D*  *FIG. 13E*

3 IN 1 FOAM FORMULATION FOR ENHANCED OIL RECOVERY INCLUDING CONFORMANCE CONTROL, ULTRA-LOW INTERFACIAL TENSION, AND WETTABILITY ALTERATION

CROSS-REFERENCE TO RELATED APPLICATIONS

This application is a continuation-in-part application of U.S. patent application Ser. No. 15/917,097, filed on Mar. 9, 2018, which claims the benefit of and priority to U.S. Provisional Application Ser. No. 62/469,414, filed on Mar. 9, 2017; all of the above-referenced applications are incorporated by reference in their entireties into this application.

FIELD

This disclosure relates to nanoparticle compositions that are stable under high salinity and high temperature conditions. This disclosure is also directed to methods of producing these nanoparticle compositions and their use for improved and enhanced oil recovery applications.

BACKGROUND

Current waterflood operations result in about an average of 50% recovery of original oil in place. In conventional surfactant-based enhanced oil recovery (EOR) applications, tremendous amounts of surfactants are used to mobilize or solubilize oil. This is primarily due to a significant portion of the surfactants injected being adsorbed onto the rock near the wellbore area or diffused into the water-filled small pores. In order to deliver a specific concentration of surfactants to a distant oil location, large concentrations of surfactants need to be injected to account for the surfactants lost by adsorption or diffusion into dead-end pores before reaching the target oil. One way to mitigate the loss of surfactants is to increase the amount of surfactants in water, either by increasing the concentration of a given slug size of surfactants or increasing the slug size of a given concentration of surfactants, to deliver enough surfactants to the oil/water interface. Other approaches use sacrificial chemicals to passivate the rock surface and minimize surfactant adsorption. Overall, the approaches fail to maintain a constant concentration of surfactant over an extended period in the formation. These techniques also increase the cost of current surfactant-enhanced oil recovery techniques.

SUMMARY

Embodiments disclosed and described here address the shortcomings in the art such as lack of long term stability of EOR compositions under conditions of high salinity and high temperature. Embodiments include a nanosurfactant-containing composition suitable for injection into a hydrocarbon-bearing formation for enhanced recovery operations. In an embodiment, the EOR composition includes nanoparticles containing a sulfonate surfactant, a zwitterionic co-surfactant, and mineral oil. These nanosurfactants are delivered as aqueous compositions containing cations, such as sodium, calcium, magnesium, and potassium. The sulfonate surfactant and the zwitterionic co-surfactant form nanoparticles having a particle diameter ranging from about 10 nanometers (nm) to 100 nm. The nanoparticles are stable under high salinity and high temperature conditions. In certain embodiments, a substantial portion of the nanoparticles are stable for at least three months at temperatures of at least 100 degrees Celsius (° C.). The sulfonate surfactant can be selected from the group consisting of an alkyl sulfonate, an alkyl aryl sulfonate, and combinations thereof. In certain embodiments, the sulfonate surfactant is petroleum sulfonate. The zwitterionic co-surfactant can contain cocamidopropyl hydroxysultaine.

Embodiments disclosed and described here include methods for recovering hydrocarbons from a hydrocarbon-bearing formation. One such method includes introducing into the hydrocarbon-bearing formation a fluid containing nanoparticles. The nanoparticles are formed by mixing effective amounts of a sulfonate surfactant, a zwitterionic co-surfactant, and mineral oil. The method further includes driving the fluid through the hydrocarbon-bearing formation to displace hydrocarbons from the hydrocarbon-bearing formation; and recovering the displaced hydrocarbons. The sulfonate surfactant and the zwitterionic co-surfactant can form nanoparticles having a particle diameter ranging from about 10 nm to 100 nm. The nanoparticles are stable under high salinity and high temperature conditions. In certain embodiments, a substantial portion of the nanoparticles are stable for at least three months at temperatures of at least 100° C. The sulfonate surfactant can be selected from the group consisting of an alkyl sulfonate, an alkyl aryl sulfonate, and combinations thereof. The sulfonate surfactant can contain petroleum sulfonate. The zwitterionic co-surfactant can contain cocamidopropyl hydroxysultaine.

Embodiments disclosed and described here include methods for producing nanosurfactant-containing fluids suitable for injection into a hydrocarbon-bearing formation for enhanced recovery operations. One such method includes the steps of mixing a first aqueous mixture containing a sulfonate surfactant and a second aqueous mixture containing a zwitterionic co-surfactant in a reactor to form a third aqueous mixture. In the next step, a fourth aqueous mixture containing cations is mixed with the third aqueous mixture in the reactor to produce a fluid containing nanosurfactants with a particle diameter ranging from about 10 nm to 100 nm and containing the sulfonate surfactant and the zwitterionic co-surfactant. In certain embodiments, the first aqueous mixture containing the sulfonate surfactant further contains mineral oil and fresh water. The sulfonate surfactant can be selected from the group consisting of an alkyl sulfonate, an alkyl aryl sulfonate, and combinations thereof. The first aqueous mixture containing the sulfonate surfactant can further contain petroleum sulfonate, mineral oil, and fresh water. In certain embodiments, the second aqueous mixture is produced by mixing the zwitterionic co-surfactant in fresh water. In certain embodiments, the fourth aqueous mixture containing cations is sea water. The zwitterionic co-surfactant can contain cocamidopropyl hydroxysultaine. The petroleum sulfonate in the fluid containing nanosurfactants can range from 0.1 to 0.25 weight percent. The mineral oil in the fluid containing nanosurfactants can range from 0.002 to 0.02 weight percent. The zwitterionic co-surfactant in the fluid containing nanosurfactants can range from 0.1 to 0.2 weight percent.

Another method for producing nanosurfactant-containing fluids includes the steps of mixing a petroleum sulfonate surfactant, mineral oil, and a zwitterionic co-surfactant with fresh water in a reactor; introducing an aqueous salt solution to the reactor; and operating the reactor to produce nanoparticles containing the petroleum sulfonate surfactant, the mineral oil, and the zwitterionic co-surfactant and having a particle diameter ranging from about 10 nm to 100 nm. These nanoparticles are stable under high salinity and high temperature conditions. In certain embodiments, a substantial portion of the nanoparticles are stable for at least three months at temperatures of at least 100° C. The zwitterionic co-surfactant can contain cocamidopropyl hydroxysultaine.

Embodiments of the disclosure provide a method of producing hydrocarbons from a hydrocarbon-bearing formation. The method includes the step of preparing a nanosurfactant composition. The method includes the step of introducing the nanosurfactant composition and a gaseous component into the hydrocarbon-bearing formation such that a nanosurfactant-based foam is generated to displace the hydrocarbons from the hydrocarbon-bearing formation. The nanosurfactant-based foam reduces interfacial tension between the hydrocarbons and the saline water. The nanosurfactant composition is formed by the step of combining a sulfonate surfactant, an oil, and fresh water to form a first mixture. The nanosurfactant composition is formed by the step of combining a zwitterionic co-surfactant and the fresh water to form a second mixture. The nanosurfactant composition is formed by the step of combining the first mixture and the second mixture to form a third mixture. The nanosurfactant composition is formed by the step of combining the third mixture and saline water to form the nanosurfactant composition. The saline water includes divalent cations. The nanosurfactant composition includes a nanoassembly. The nanoassembly has a hydrophobic interior and a hydrophilic exterior. The hydrophobic interior includes the sulfonate surfactant, a hydrophobic portion of the zwitterionic co-surfactant, and the oil. The hydrophilic exterior includes a hydrophilic portion of the zwitterionic co-surfactant. The hydrophilic portion of the zwitterionic co-surfactant stabilizes the nanoassembly by interacting with the divalent cations present in the saline water. The oil facilitates containment of the sulfonate surfactant in the hydrophobic interior of the nanoassembly.

In some embodiments, the nanoassembly has a diameter ranging between 10 nm and 100 nm. In some embodiments, the sulfonate surfactant is petroleum sulfonate. In some embodiments, the petroleum sulfonate includes an alkyl sulfonate, and alkyl aryl sulfonate, and combinations of the same. In some embodiments, the nanosurfactant composition has a sulfonate surfactant content ranging between 0.05 wt. % and 0.25 wt. %. In some embodiments, the zwitterionic co-surfactant includes a sulfobetaine, a carboxybetaine, and combinations of the same. In some embodiments, the zwitterionic co-surfactant is cocamidopropyl hydroxysultaine. In some embodiments, the zwitterionic co-surfactant is lauryl betaine. In some embodiments, the nanosurfactant composition has a zwitterionic co-surfactant content ranging between 0.01 wt. % and 0.25 wt. %. In some embodiments, the oil is mineral oil. In some embodiments, the gaseous component includes nitrogen, carbon dioxide, and combinations of the same. In some embodiments, the fresh water has a total dissolved solids concentration less than 3,000 ppm. In some embodiments, the saline water has a total dissolved solids concentration greater than 10,000 ppm.

Embodiments of the disclosure also provide nanosurfactant-based foam composition suitable for injection into a hydrocarbon-bearing formation for enhanced oil recovery operations. The nanosurfactant-based foam composition includes a gaseous component and a nanosurfactant composition. The nanosurfactant composition includes a nanoassembly and an aqueous environment. The nanoassembly includes a hydrophobic interior and a hydrophilic exterior. The hydrophobic interior includes petroleum sulfonate, a hydrophobic portion of a zwitterionic co-surfactant, and mineral oil. The hydrophilic exterior includes a hydrophilic portion of the zwitterionic co-surfactant. The aqueous environment includes divalent cations. The hydrophilic portion of the zwitterionic co-surfactant is configured to stabilize the nanoassembly by interacting with the divalent cations present in the aqueous environment. The mineral oil is configured to facilitate containment of the petroleum sulfonate in the hydrophobic interior of the nanoassembly.

In some embodiments, the nanoassembly has a diameter ranging between 10 nm and 100 nm. In some embodiments, the zwitterionic co-surfactant includes a sulfobetaine, a carboxybetaine, and combinations of the same. In some embodiments, the zwitterionic co-surfactant is cocamidopropyl hydroxysultaine. In some embodiments, the zwitterionic co-surfactant is lauryl betaine. In some embodiments, the gaseous component includes nitrogen, carbon dioxide, and combinations of the same.

Embodiments of the disclosure also provide a method of enhanced oil recovery. The method includes the step of preparing a nanosurfactant composition. The method includes the step of introducing the nanosurfactant composition and nitrogen gas into a hydrocarbon-bearing formation such that a nanosurfactant-based foam is generated to displace hydrocarbons from the hydrocarbon-bearing formation. The nanosurfactant-based foam reduces interfacial tension between the hydrocarbons and the saline water. The nanosurfactant composition is formed by the step of combining petroleum sulfonate, mineral oil, and fresh water to form a first mixture. The nanosurfactant composition is formed by the step of combining cocamidopropyl hydroxysultaine and the fresh water to form a second mixture. The nanosurfactant composition is formed by the step of combining the first mixture and the second mixture to form a third mixture. The nanosurfactant composition is formed by the step of combining the third mixture and saline water to form the nanosurfactant composition. The saline water includes divalent cations. The nanosurfactant composition includes a nanoassembly. The nanoassembly has a hydrophobic interior and a hydrophilic exterior. The hydrophobic interior includes the petroleum sulfonate, a hydrophobic portion of the cocamidopropyl hydroxysultaine, and the mineral oil. The hydrophilic exterior includes a hydrophilic portion of the cocamidopropyl hydroxysultaine. The hydrophilic portion of the cocamidopropyl hydroxysultaine stabilizes the nanoassembly by interacting with the divalent cations present in the saline water. The mineral oil facilitates containment of the petroleum sulfonate in the hydrophobic interior of the nanoassembly.

Embodiments of the disclosure also provide a method of enhanced oil recovery. The method includes the step of preparing a nanosurfactant composition. The method includes the step of introducing the nanosurfactant composition and nitrogen gas into a hydrocarbon-bearing formation such that a nanosurfactant-based foam is generated to displace hydrocarbons from the hydrocarbon-bearing formation. The nanosurfactant-based foam reduces interfacial tension between the hydrocarbons and the saline water. The nanosurfactant composition is formed by the step of combining petroleum sulfonate, mineral oil, and fresh water to form a first mixture. The nanosurfactant composition is formed by the step of combining lauryl betaine and the fresh water to form a second mixture. The nanosurfactant composition is formed by the step of combining the first mixture and the second mixture to form a third mixture. The nanosurfactant composition is formed by the step of combining the third mixture and saline water to form the nanosurfactant composition. The saline water includes divalent cations. The nanosurfactant composition includes a nanoassembly. The nanoassembly has a hydrophobic interior and a hydrophilic exterior. The hydrophobic interior includes the petroleum sulfonate, a hydrophobic portion of the lauryl betaine, and the mineral oil. The hydrophilic exterior includes a hydrophilic portion of the lauryl betaine. The hydrophilic portion of the lauryl betaine stabilizes the nanoassembly by interacting with the divalent cations present in the saline water. The mineral oil facilitates containment of the petroleum sulfonate in the hydrophobic interior of the nanoassembly.

BRIEF DESCRIPTION OF THE DRAWINGS

Embodiments will be readily understood by the following detailed description in conjunction with the accompanying drawings. Embodiments are illustrated by way of example and not by way of limitation in the figures of the accompanying drawings.

FIG. 3 is a photograph of a cryo-transmission electron microscopy (cryo-TEM) image of the nanosurfactant, according to an embodiment.

FIGS. 4A and 4B are photographs of nanosurfactant-containing fluids after 4 months at room temperature and following incubation in the oven at 100° C., respectively, according to an embodiment.

FIG. 10 shows seven samples whose labeling correspond to sample numbers provided in Table 6.

FIG. 12 is a graphical representation of the results from the IFT evaluation of the supernatant, which was obtained following filtration to remove the precipitate formed by the reaction between seawater and the petroleum sulfonate surfactant.

FIGS. 13A-13E are photographs showing the various steps of the preparation of a soluble fraction of petroleum sulfonate mixed with sea water, according to an embodiment.

FIGS. 18A and 18B are photographs of the samples taken before heating and FIGS. 18C and 18D are photographs of the samples taken after heating at 100° C. for 1 hour.

DETAILED DESCRIPTION

Figure 1:
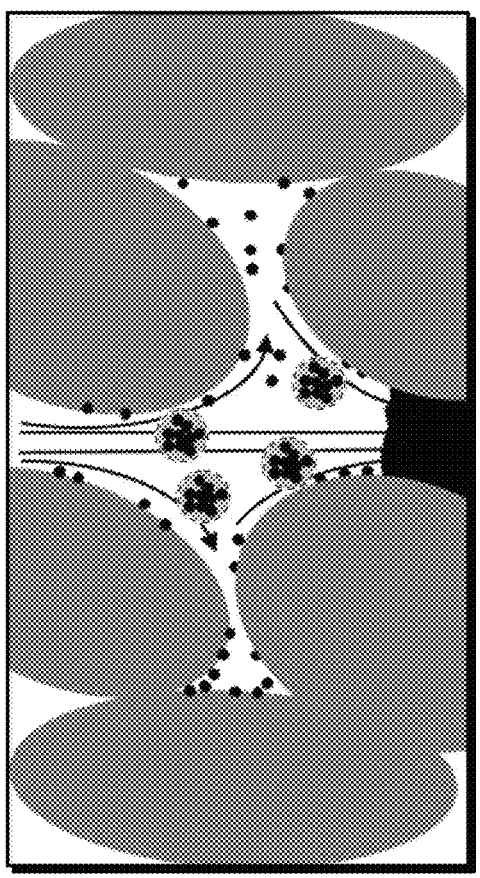
FIG. 1 is a drawing showing how size exclusion and chromatographic effects enable nanosurfactants to reach the oil-water interfaces.

Embodiments of this disclosure describe nanoparticle compositions that are stable under high salinity and high temperature conditions. More specifically, these compositions include petroleum sulfonate-based nanoparticles that are used for improved and enhanced oil recovery applications.

In the following description, numerous specific details are set forth in order to provide a thorough understanding of the various embodiments and reference is made to the accompanying drawings that form a part hereof. In other instances, well-known processes and methods may not be described in particular detail to refrain from unnecessarily obscuring the embodiments described here. Additionally, illustrations of embodiments here may omit certain features and/or details in order to not obscure the embodiments described here. Other embodiments may be utilized, and logical changes may be made without departing from the scope of the disclosure. Therefore, the following detailed description is not to be taken in a limiting sense.

The description may use the phrases "in certain embodiments," "in an embodiment," or "in embodiments," which may each refer to one or more of the same or different embodiments. Furthermore, the terms "comprising," "including," "having," and the like, as used with respect to embodiments of the present disclosure, are synonymous. As used here, the term "effective amount" refers to at least that amount of nanosurfactant or nanosurfactant components necessary to bring about a desired result, such as, for example, enhanced oil recovery or improved stability at high temperatures or improved stability for longer periods of time and at relatively high temperatures. The term salinity refers to the amount of total dissolved solids (TDS) in the water and is measured in parts per million (ppm). Water with a TDS concentration less than 3,000 ppm is considered fresh water. Water with a TDS concentration in excess of 10,000 ppm is considered saline. The term "high salinity conditions" refers to fluid conditions where the TDS concentration ranges from 30,000 ppm to 220,000 ppm. In certain embodiments, high salinity conditions include fluid conditions with the TDS concentration ranging from 60,000 ppm to 150,000 ppm. The term "high temperature conditions" refers to fluid or reservoir conditions where the temperature ranges from 75° C. to 150° C. In certain embodiments, high temperature conditions include fluid or reservoir conditions with the temperature ranging from 100° C. to 120° C.

Embodiments include nanosurfactant formulations and use of these formulations with long-term stability at high salinity and high temperature conditions. Nanosurfactants described here are nanoparticle compositions containing a sulfonate surfactant, a zwitterionic co-surfactant, and an oil. The nanosurfactants enable more economical oil recovery as compared to conventional surfactants by reducing the amount of surfactants lost by adsorption onto the rock surfaces. These compositions deliver surfactants more efficiently to the oil-water interfaces. Embodiments include aqueous suspensions of petroleum sulfonate-based nanoparticles with long-term stability at high salinity and high temperature conditions. These formulations contain small amounts of a class of zwitterionic co-surfactants (a surfactant with both anionic and cationic centers in the same molecule) that have no easily hydrolysable chemical bonds. These formulations are compatible with salty and hard water, in particular tolerant to high concentrations of sodium chloride and divalent cations. An example of a commercially-available zwitterionic surfactants used in these formulations is cocamidopropyl hydroxysultaine or betaine surfactants, such as SURFATEX CBS™, obtained from Surfactants International, LLC, headquartered in Allendale, N.J., USA; PETROSTEP® SB, PETROSTEP® CG-50, and Amphosol® CG-50 from Stepan, headquartered in Northfield, Ill., USA; and ColaTeric CBS-HP from Colonial Chemical Inc., headquartered in South Pittsburgh, Tenn. These formulations offer several advantages, such as colloidal and chemical stability at high salinity and high temperature for several months, substantial reduction of crude oil/seawater interfacial tension, ability to form an emulsion very rapidly upon contact with crude oil without any mechanical mixing. As demonstrated by experimental data from a lab-scale coreflooding setting, these formulations show appreciable increase in oil recovery beyond seawater flooding.

The formulations described here include sulfonates, mineral oil, and a class of co-surfactants that have no easily hydrolysable chemical bonds. For example, a nanosurfactant mixture was formulated using zwitterionic co-surfactants with petroleum sulfonate surfactants in the presence of mineral oil. The term "petroleum sulfonate" refers to a mixture containing sulfonated benzenoids (both alkyl aryl and aryl), and cycloaliphatic and paraffinic (alkyl) hydrocarbons in various ratios to one another depending on the nature of the source of the petroleum fraction. Petroleum sulfonates can include alkyl xylene sulfonates, alkyl aryl sulfonates, alpha-olefin sulfonates, and combinations thereof. An example of a commercially-available product that contains petroleum sulfonate is PETRONATE® EOR-2095 sodium sulfonate (EOR-2095) from Chemtura Corporation (headquartered in Philadelphia, Pa., USA) or PETRONATE® sodium sulfonates from Sonneborn LLC (headquartered in Parsippany, N.J., USA). Petroleum sulfonates are not stable by themselves in sea water. But, the formulation of zwitterionic co-surfactants with petroleum sulfonate surfactants in the presence of mineral oil was successfully operative in long-term stability tests in seawater and low salinity Arab-D water at 100° C. Seawater used in the experiments disclosed here has a TDS concentration of about 60,000 ppm. Low salinity Arab-D water has a TDS concentration of about 120,000 ppm. Certain alcohol ether sulfonates are not suitable for embodiments disclosed here as alcohol ether sulfonates do not combine with the zwitterionic co-surfactants to form the nanoparticles for cross well applications. Additional hydroxyl groups presented by the alcohol ether sulfonates increase material losses as they bind to calcium. In EOR fluids with seawater, the alcohol ether sulfonates bind preferentially to the carbonate rock instead of remaining available in the EOR fluid.

Embodiments disclosed here include compositions suitable for injection into a hydrocarbon-bearing formation for enhanced recovery operations. One such composition includes a sulfonate surfactant, a zwitterionic co-surfactant, and mineral oil.

In certain embodiments, the effective amounts of each of the sulfonate surfactant and the zwitterionic co-surfactant range from 0.1 to 0.9 wt % of the nanosurfactant mixture. In certain embodiments, the effective amounts of each of the sulfonate surfactant and the zwitterionic co-surfactant range from 0.1 to 0.5 wt % of the nanosurfactant mixture. In certain embodiments, the total amount of the sulfonate surfactant and the zwitterionic co-surfactant ranges from 0.2 to 1 wt % of the nanosurfactant mixture. In certain embodiments, the amount of mineral oil ranges from 0.002 wt %-0.02 wt % of the nanosurfactant mixture. In certain embodiments, the amount of mineral oil ranges from 0.002 wt %-0.01 wt % of the nanosurfactant mixture. In certain embodiments, the amount of mineral oil is approximately 0.005 wt % of the nanosurfactant mixture.

The wt % ratio of sulfonate/zwitterionic surfactants can range from 0.3 to 3. In certain embodiments, the wt % ratio of sulfonates/zwitterionic surfactants can range from 0.3 to 2.5. In certain embodiments, the wt % ratio of sulfonates/zwitterionic surfactants can range from 0.3 to 2.0. In certain embodiments, the wt % ratio of sulfonates/zwitterionic surfactants can range from 0.3 to 1.5. In certain embodiments, the wt % ratio of sulfonates/zwitterionic surfactants can range from 0.3 to 1.0. In certain embodiments, the wt % ratio of sulfonates/zwitterionic surfactants can range from 0.5 to 1.5. In certain embodiments, the wt % ratio of sulfonates/zwitterionic surfactants can range from 0.5 to 1. In certain embodiments, the wt % ratio of sulfonates/zwitterionic surfactants can range from 0.5 to 0.8. In certain embodiments, the wt % ratio of sulfonates/zwitterionic surfactants can range from 0.75 to 0.80.

Embodiments disclosed here include methods for recovering hydrocarbons from a hydrocarbon-bearing formation. One such method includes introducing into the hydrocarbon-bearing formation a fluid containing effective amounts of a sulfonate surfactant, a zwitterionic co-surfactant, and mineral oil; driving the fluid through the hydrocarbon-bearing formation to displace hydrocarbons from the hydrocarbon-bearing formation; and recovering the displaced hydrocarbons. The sulfonate surfactant and the zwitterionic co-surfactant can form nanoparticles having a particle diameter ranging from about 10 nm to 100 nm. In certain embodiments, the petroleum sulfonate-based nanoparticles in seawater-based formulations have particle diameters ranging from about 10 nm to 60 nm.

In an embodiment, a zwitterionic co-surfactant, such as cocamidopropyl hydroxysultaine, a petroleum sulfonate surfactant, such as sodium alkylbenzene sulfonates, and seawater were combined to form a colloidally and chemically stable formulation. Certain embodiments of these nanosurfactant formulations were colloidally and chemically stable for more than six months at 100° C. Stability refers to the ability of the particles to remain as part of the nanosurfactant composition without aggregating or displaying reduced sticking to the rock surfaces. Stability does not refer to the stability of the individual components. In certain embodiments, the seawater-crude oil IFT was reduced by two to three orders of magnitude. Certain embodiments showed reduced interfacial tension measured in milliNewtons per meter (mN/m) with crude oil at 90° C. and rapid formation of an emulsion at 100° C. without any mechanical mixing. Furthermore, in certain embodiments, the size of the formed nanoparticles was small (less than 50 nm) in comparison to pore diameters typically encountered in petroleum-bearing carbonate formations. The size of the nanoparticles was small and decreased to about 15 nm after increasing the temperature from 25° C. to 90° C. The size remained unchanged when the suspension is cooled back to 25° C. This indicates the enhanced stability of the formulation under oil reservoir conditions, and even when different temperatures are encountered in the reservoir.

When the surfactant molecules are formulated into nano-sized particles, the loss of surfactants is mitigated and the delivery of surfactants to the oil phase is enhanced. As illustrated in FIG. 1, due to size or volume exclusion as well as chromatographic effects, nano-sized particles can migrate long distances and efficiently deliver the surfactant to the entrapped or upswept oil for enhanced mobility. Petroleum sulfonate surfactants are inexpensive, readily available surfactants, and provide an exceptional performance for oil recovery applications. However, the sulfonates are only soluble in fresh water, and they form insoluble gummy precipitates in seawater. The precipitates consist of petroleum sulfonate salts of the naturally occurring divalent metal cations in seawater. These petroleum sulfonate salts are not very soluble in water, so most of the surfactant is kept in a solid form along with the metal cations, and only a small amount of the salts dissolves in seawater. The solid particles gradually dissolve in water when the already dissolved surfactant is consumed by oil.

When delivered as part of the nanoparticle composition, the surfactant is released in the presence of oil, otherwise it remains intact within the water phase. This approach is efficient and economical in delivering surfactants in targeted oil recovery applications. The nanoparticles are small enough to travel through the reservoir without straining. The sorption of these particles onto the rock matrix is not significant, and they are stable for periods of time exceeding their travel time to the oil-water interface. Flow of these aqueous nanoparticle compositions through the reservoir is different from the flow of foam compositions. These aqueous nanoparticle compositions easily permeate into low permeability zones, while the foam compositions do not have similar capability. Moreover, these aqueous nanoparticle compositions do not block the high permeability zones of a reservoir.

Previous surfactant formulations showed stability of about three to four days, and were thus deemed unsuitable for enhanced oil recovery applications. These prior surfactant formulations revealed instability and phase separation in the concentrated and seawater-diluted nanosurfactant suspensions even at room temperature (23-27° C.). Transmission electron microscopy (TEM) imaging indicated that the formed particles were present both as individual particles as well as linear (chain-like) aggregates up to 200 nm long. Both concentrated and seawater-diluted suspensions became more unstable at elevated temperatures (~100° C.). Phase separation and aggregation were apparent after less than three days of exposure to 100° C. Noticeable precipitation was observed at greater seawater dilutions while separation of the oily petroleum sulfonate salts was apparent at lower dilutions. Samples with a median dilution showed a crossover between petroleum sulfonate separation and precipitation. Results also implied noticeable sorption of nanosurfactant components onto crushed rock grains at elevated temperatures and the formation of a significant number of aggregates in the supernatant after sorption.

Embodiments formulated using petroleum sulfonate surfactants, zwitterionic co-surfactants, and mineral oil with did not suffer from the disadvantages described in the prior paragraph. Due to the co-existence of immiscible components (oil and water) in the nanosurfactant solution, the configuration of nanosurfactants formed in seawater is fundamentally different than just a mixture (or a blend) of surfactant molecules. The nanosurfactants are emulsions of nano-sized oil droplets that contain the petroleum sulfonate. The droplets are in turn stabilized by the co-surfactant molecules, which are not easily hydrolyzed in seawater.

Embodiments disclosed here include methods for producing nanosurfactant compositions suitable for injection into a hydrocarbon-bearing formation for enhanced recovery operations. One such method includes the steps of mixing a sulfonate surfactant and a zwitterionic co-surfactant in the presence of freshwater or deionized water. In certain embodiments, the sulfonate surfactant contains 2 wt % to 20 wt % of mineral oil. If the sulfonate surfactant does not contain the required amount of mineral oil, then external mineral oil is added to the sulfonate surfactant. If required, the various fluids are diluted with freshwater or deionized water to the desired concentrations. The method further includes introducing an aqueous salt solution with cations to the reactor to the freshwater mixture of sulfonate surfactant and zwitterionic co-surfactant to produce a nanosurfactant composition containing nanoparticles with a particle diameter in a range of from about 10 nm to 100 nm and the sulfonate surfactant and the zwitterionic co-surfactant at about 0.2-1 wt %. These nanoparticles are stable under high salinity and high temperature conditions. A substantial portion of the nanoparticles is stable for at least three months at temperatures of at least 100° C. The sulfonate surfactant is selected from the group consisting of an alkyl sulfonate, an alkyl aryl sulfonate, and combinations thereof. In certain embodiments, the sulfonate surfactant is a petroleum sulfonate salt. In certain embodiments, the petroleum sulfonate nanoparticles in seawater-based formulations have particle diameters ranging from about 10 nm to 60 nm. In certain embodiments, the zwitterionic co-surfactant contains cocamidopropyl hydroxysultaine.

Another method of producing nanosurfactant compositions includes mixing the sulfonate surfactant with the zwitterionic co-surfactant in the presence of fresh water. The resulting mixture contains water in an amount ranging from 80 wt % to 98 wt % and the total amount of surfactants ranging from about 2 wt % to 20 wt %. After mixing the surfactants, water containing cations, such as seawater, is introduced to form nanosurfactant compositions with the total amount of surfactants ranging from about 0.2 wt % to 1 wt %. The cations include one or more of sodium, calcium, magnesium, and potassium. The cations-containing water has a TDS concentration ranging from 50,000 ppm-150,000 ppm. In certain embodiments, the nanosurfactant compositions contain 0.1 wt %-0.25 wt % of petroleum sulfonates, 0.002 wt %-0.02 wt % of mineral oil, and 0.1 wt %-0.2 wt % of a zwitterionic co-surfactant. These nanosurfactant compositions are stable under reservoir conditions. An example of reservoir conditions includes a TDS concentration ranging from 60,000 ppm to 150,000 ppm and a reservoir temperature ranging from 100° C. to 120° C.

These nanosurfactant compositions are different from the fracturing fluids that contain zwitterionic and ionic surfactants. The fracturing fluids contain 10 wt % to 20 wt % of the zwitterionic surfactants and the methods of production of these fracturing fluids do not permit the formation of the nanoparticles. As the fracturing fluids contain large amounts of surfactants to increase fluid viscosity, the fracturing fluids do not pass through the pores but instead fracture the rocks of the reservoir. Disclosed here are nanosurfactant compositions containing surfactants ranging from about 0.2 wt % to 1 wt % of the fluid used for improved or enhanced oil recovery. At this reduced concentration of surfactants, the fluid containing the nanosurfactants passes through the pores. The salts contained in the seawater force the surfactant and co-surfactant to form nanoparticles and stabilize these nanoparticles. The fluid containing the nanoparticles passes through the pores easily and delivers the active surfactants to mobilize oil and enhance recovery.

Figure 30:
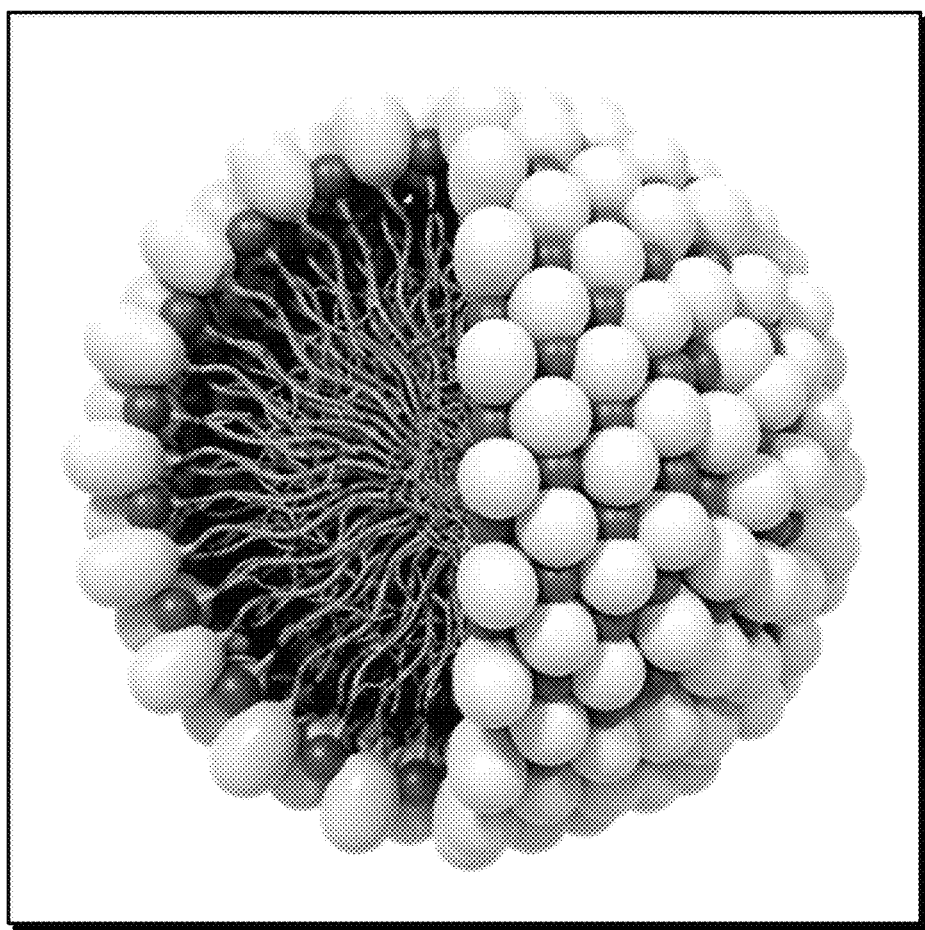
FIG. 30 is a schematic illustration of a nanoassembly included in a nanosurfactant composition, according to an embodiment.

In some embodiments, the nanosurfactant composition includes oil-containing nanoassemblies. As shown in FIG. 30, the nanoassembly is essentially an oil-based micelle surrounded by the zwitterionic co-surfactant (the hydrophilic heads of the zwitterionic co-surfactant are represented by the bright spheres). The nanoassembly includes a hydrophobic interior and a hydrophilic exterior. The hydrophobic interior includes the mineral oil. The hydrophobic interior also includes the hydrophobic portion of the sulfonate surfactant and the hydrophobic portion of the zwitterionic co-surfactant. The hydrophilic portion of the zwitterionic co-surfactant forming the hydrophilic exterior of the micelle interacts with the saline aqueous environment to stabilize the nanoassembly. Specifically, the hydrophilic portion of the zwitterionic co-surfactant interacts with the divalent cations present in the saline aqueous environment. In some embodiments, the sulfonate surfactant is contained within the hydrophobic interior. In alternate embodiments, the hydrophilic portion of the sulfonate surfactant (represented by the dark sphere) is shielded by adjacent hydrophilic portions of the zwitterionic co-surfactant. In this manner, the hydrophilic portion of the sulfonate surfactant, which may be due to steric hinderance by the hydrophilic portion of the zwitterionic co-surfactant, sparingly or does not participate in the stabilization of the nanoassembly with the exterior saline aqueous environment. In some embodiments, the mineral oil in the hydrophobic interior facilitates the containment of the sulfonate surfactant in the hydrophobic interior of the nanoassembly.

Embodiments provide nanosurfactant compositions suitable for injection into a hydrocarbon-bearing formation for enhanced recovery operations. A non-limiting example nanosurfactant composition includes a sulfonate surfactant, a zwitterionic co-surfactant, mineral oil, and saline water.

In some embodiments, the nanosurfactant composition has a sulfonate surfactant content ranging between about 0.05 wt. % and about 0.25 wt. %. In some embodiments, the nanosurfactant composition has a zwitterionic co-surfactant content ranging between about 0.01 wt. % and about 0.25 wt. %. In some embodiments, the nanosurfactant composition has an oil content ranging between about 0.002 wt. % and about 0.02 wt. %.

Embodiments include nanosurfactant compositions and use of these compositions with long-term stability at high salinity and high temperature conditions. The nanosurfactant compositions include nanoassemblies including a sulfonate surfactant, a zwitterionic co-surfactant, and an oil (such as mineral oil). The hydrophobic interior of the nanoassembly includes the mineral oil, the hydrophobic portion of the sulfonate surfactant, and the hydrophobic portion of the zwitterionic co-surfactant. The hydrophilic exterior of the nanoassembly includes the hydrophilic portion of the zwitterionic co-surfactant. Such nanosurfactant compositions are capable of generating and stabilizing foams using gaseous components such as nitrogen or carbon dioxide. The nanosurfactant-based foams can be used in porous media, and are capable of providing conformance control functionality in reservoirs, ultralow crude oil-brine IFT, and wettability alteration of the reservoir rock surfaces. The nanosurfactant-based foams can improve sweep efficiency in reservoirs during a miscible gas (corresponding to carbon dioxide) injection or an immiscible gas (corresponding to nitrogen) injection. The nanosurfactant-based foams are capable of reducing the permeability in certain reservoirs having high permeability zones providing enhanced horizontal and vertical sweep efficiency. The nanosurfactant-based foams are capable of preventing gravity override of the gas and limiting viscous fingering of the gas. The nanosurfactant composition present in the lamellae of the foam is capable of providing reduced crude oil-water IFT. Reducing the IFT between crude oil and brine (or water) leads to increased oil recovery. The nanosurfactant composition is capable of altering the wettability of an oil-wet rock surface to a water-wet rock surface, resulting in enhanced imbibition in tight formations. The nanosurfactant composition can be co-injected or slug injected with gaseous components such as carbon dioxide and nitrogen, to generate foam at desired downhole locations.

In some embodiments, the sulfonate surfactant can include petroleum sulfonate. Petroleum sulfonate can include alkyl sulfonates, alkyl aryl sulfonates, alkyl xylene sulfonates, and alpha-olefin sulfonates, and combinations of the same. Non-limiting examples of a commercially-available product that contains petroleum sulfonate include PETRONATE® EOR-2095 sodium sulfonates and PETRONATE® HL/L sodium sulfonates.

In some embodiments, the zwitterionic co-surfactant can include a sulfobetaine (or a sultaine) and a carboxybetaine (or a betaine). The sulfobetaine can include an alkyl sultaine, an alkyl hydroxysultaine, an alkylamidopropyl sultaine, and an alkylamidopropyl hydroxysultaine. The carboxybetaine can include an alkyl betaine and an alkylamidopropyl betaine. Non-limiting examples of the sulfobetaine include capryl sultaine, cetyl hydroxysultaine, lauryl hydroxysultaine, myristyl hydroxysultaine, coco-sultaine, coco-hydroxysultaine, lauryl sultaine, myristyl sultaine, cocamidopropyl hydroxysultaine, erucamidopropyl hydroxysultaine, lauramidopropyl hydroxysultaine, myrisamidopropyl hydroxysultaine, oleamidopropyl hydroxysultaine, and tallowamidopropyl hydroxysultaine. Non-limiting examples of the carboxybetaine include betaine, lauryl betaine, behenyl betaine, myristyl betaine, cetyl betaine, oleyl betaine, cocobetaine, strearyl betaine, decyl betaine, tallow betaine, hydrogenated tallow betaine, cocamidopropyl betaine, erucamidopropyl betaine, lauramidopropyl betaine, myrisamidopropyl betaine, oleamidopropyl betaine, and tallowamidopropyl betaine. The molecular structure of the sulfobetaine is shown in Formula (I):

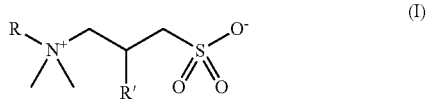

where R is an alkyl group or an alkylamidopropyl group, both having 1 to 30 carbons in the alkyl chain, and R' is a hydrogen atom or a hydroxyl group. The molecular structure of the carboxybetaine is shown in Formula (II):

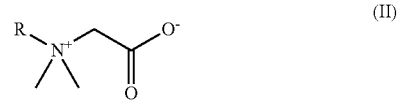

where R is an alkyl group or an alkylamidopropyl group, both having 1 to 30 carbons in the alkyl chain. Non-limiting examples of a commercially available product that contains the sulfobetaine or carboxybetaine include SURFATEX CBS™, PETROSTEP® SB, PETROSTEP® CG-50, Amphosol® CG-50, and ColaTeric CBS-HP.

In some embodiments, a gaseous component is used to generate the nanosurfactant-based foam. The gaseous component may include nitrogen, air, argon, carbon dioxide, and combinations of the same. In at least one embodiment, nitrogen or carbon dioxide is used as the gaseous component, in any quality readily available.

In an example embodiment of the method, the petroleum sulfonate, the mineral oil, and fresh water are combined to form a first mixture. The zwitterionic co-surfactant and fresh water are combined to form a second mixture. Subsequently, the first mixture and the second mixture are combined to form a third mixture. Thereafter, the third mixture and saline water are combined to form the nanosurfactant composition. The saline water includes divalent cations where the hydrophilic portion of the zwitterionic co-surfactant interacts with the divalent cations present in the aqueous saline environment to stabilize the nanoassembly. The mineral oil facilitates the containment of the petroleum sulfonate in the hydrophobic interior of the nanoassembly.

In an example embodiment of the method, a gaseous component is introduced to the nanosurfactant composition to generate a nanosurfactant-based foam. The nanosurfactant-based foam is used for enhanced oil recovery. The nanosurfactant-based foam can be generated on the surface. Alternately, the nanosurfactant-based foam can be generated in situ, where the nanosurfactant composition is prepared on the surface and is introduced downhole with the gaseous component to form a foam downhole.

In an example embodiment of the method, the nanosurfactant-based foam is introduced into a hydrocarbon-bearing formation. The hydrocarbon-bearing formation can include carbonate-based rocks. The nanosurfactant-based foam is driven through the hydrocarbon-bearing formation such that the nanoassembly makes contact with and displaces hydrocarbons from the formation by reducing the interfacial tension between the hydrocarbons and the saline water included in the nanosurfactant composition.

EXAMPLES

Examples of certain embodiments are provided here to facilitate a better understanding of the nanosurfactant compositions and methods of production of the nanosurfactant compositions for use in enhanced oil recovery.

Example 1

Experiments were conducted to evaluate performance of a petroleum sulfonate surfactant (EOR-2095) in combination with specific zwitterionic co-surfactants. Four zwitterionic co-surfactants were tested. Amphosol® LB is a mild amphoteric surfactant, containing lauramidopropyl betaine & myristamidopropyl betaine. PETROSTEP® CG-50 contains cocamidopropyl betaines. PETROSTEP® SB contains cocoamidopropyl hydroxysultaine. SURFATEX CBS™ contains cocamidopropyl hydroxysultaine. The qualitative results of these zwitterionic co-surfactants with EOR-2095 were analyzed by stability tests. Two co-surfactants— PETROSTEP® SB and SURFATEX® CBS (STRX)—were chosen for further experimentation with different sulfonates (EOR-095, BIOSOFT 5101®, NACCANOL 90G®, G-3300®, ENORDET 0342®, ENORDET 0352®, ENORDET 0242®). These surfactant and co-surfactant formulations were evalutated in seawater as well as in low salinity Arab-D brine. The stability and properties of the nanosurfactant compositions are dependent on type of the sulfonates used as the core of the nanostructured entity. The properties of the nanosurfactants are affected by factors such as co-surfactant type, salt concentration, type of petroleum sulfonate/alternative, oil content, and amount. Based on these tests, EOR-2095 and SURFATEX® CBS were selected for conducting further analysis.

Example 2

Provided below in Table 1 is an example of the composition of the synthetic seawater. The different compounds were added in grams as shown in Table 1 to make one liter of synthetic seawater.

TABLE 1

| NaCl | $CaCl_2 \cdot 2H_2O$ | $MgCl_2 \cdot 6H_2O$ | $Na_2SO_4$ | $NaHCO_3$ |
|---|---|---|---|---|
| 41.04 | 2.384 | 17.645 | 6.343 | 0.165 |

Figure 2:
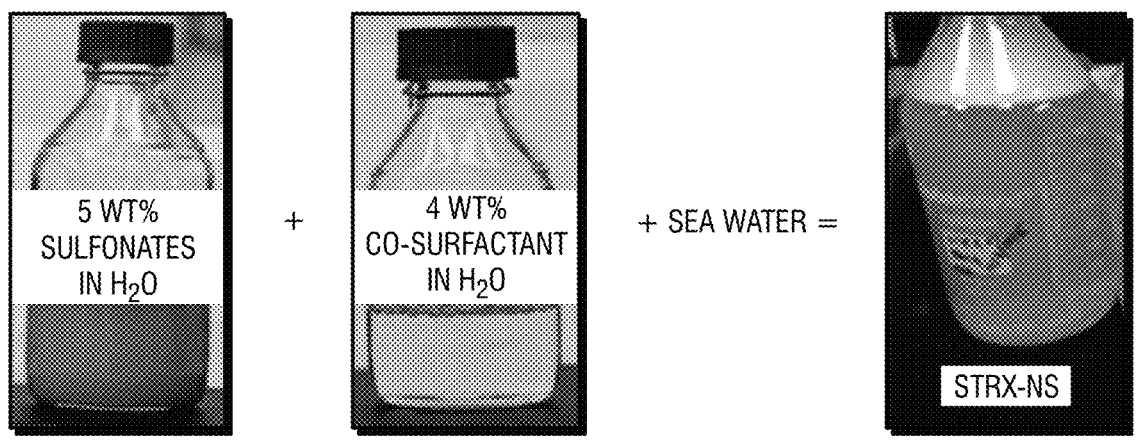
FIG. 2 shows photographs demonstrating the components used in the preparation of the nanosurfactant compositions, according to an embodiment.

FIG. 2 shows an example of a method for the preparation of the nanosurfactant mixture. Provided is an example of a process for the preparation of nanosurfactant (stock solution) using a zwitterionic co-surfactant and petroleum sulfonate with mineral oil. A 5% stock solution of EOR-2095 surfactant was prepared by dissolving commercial 50 g of EOR-2095 in 900 milliliters (mL) of deionized water and adjusting the volume to 1000 mL with more deionized water once the dissolution is complete. A 4% stock solution of the zwitterionic co-surfactant was prepared by dissolving 40 g of the STRX commercial co-surfactant in 900 mL of deionized water and adjusting the volume to 1000 mL with more deionized water once the dissolution is complete. About 100 mL of the 5% EOR-2095 stock and 125 mL of the 4% co-surfactant stock were mixed and 1000 mL of synthetic seawater was added followed by vigorous mixing. The nanosurfactant mixture does not include any hydrolyzed polyacrylamides. The ratio of petroleum sulfonate to the zwitterionic co-surfactant can be varied and optimized to meet the desired properties of the final product.

Cryo-TEM was used to study the morphology of the nanosurfactant samples. About 20 microliters (μL) of the nanosurfactant mixture samples were deposited without dilution onto copper C-flat holey carbon grids (Product code: CF-1.2/1.3-4C-T-50 from Electron Microscopy Sciences). The samples were blotted and frozen on a Gatan CP3 Cryoplunge in liquid ethane cooled with liquid nitrogen. Samples were mounted on the autoloader of an FEI Tecnai Arctica Field Emission Cryo-TEM (available at Center of Nanoscale Systems, Harvard University, Cambridge, Mass., USA). Low electron dose images were taken under 200 kilovolts accelerating voltage. As shown in FIG. 3, spherical particles with dimeters ranging from 15 to 40 nm were observed for the nanosurfactant fluid. This result confirmed the size of the nanosurfactant particles being in the range required for better transportability in tight reservoir rocks.

The stability of the nanosurfactant suspensions was tested in seawater at elevated temperatures (100° C.) for more than four months. Nanosurfactant samples were placed in cylindrical pressure tubes with air-tight Teflon lids. The tubes were sealed tightly and incubated in the oven at 100° C. The stability of these samples was checked and photographed over different periods of time. FIG. 4A shows the nanosurfactant suspension after being stored for 4 months at room temperature and FIG. 4B shows the nanosurfactant suspension following incubation in the oven at 100° C. after 4 months. The nanosurfactant suspensions were still as stable as the suspensions at room temperature, as seen by the lack of phase separation. The color and turbidity of the oven-incubated and room-temperature samples did not change significantly.

Figure 5:
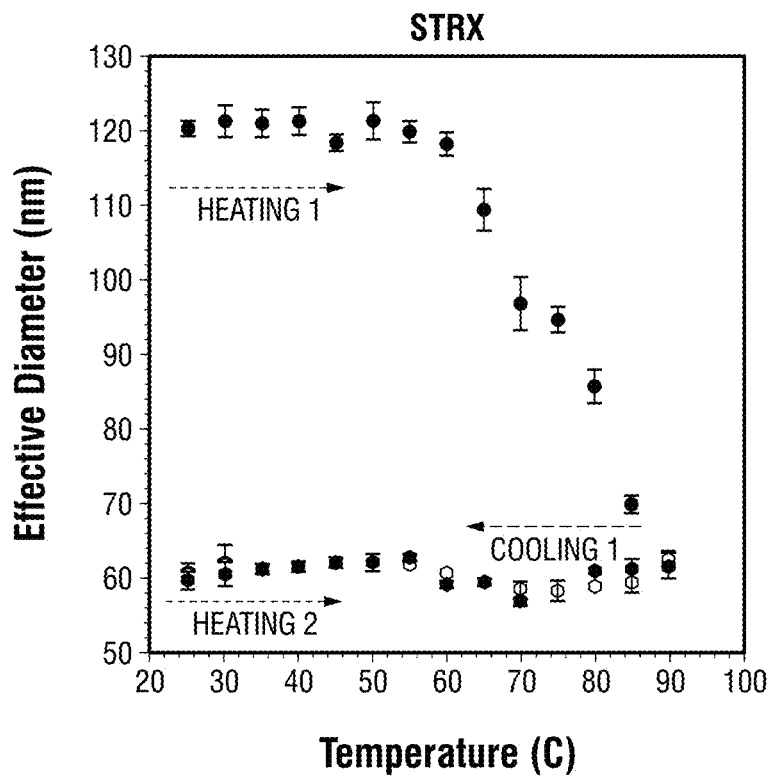
FIG. 5 is a graphical representation of the particle size of the nanoparticles in nanosurfactant mixture during heating followed by cooling, according to an embodiment.
Figure 6A:
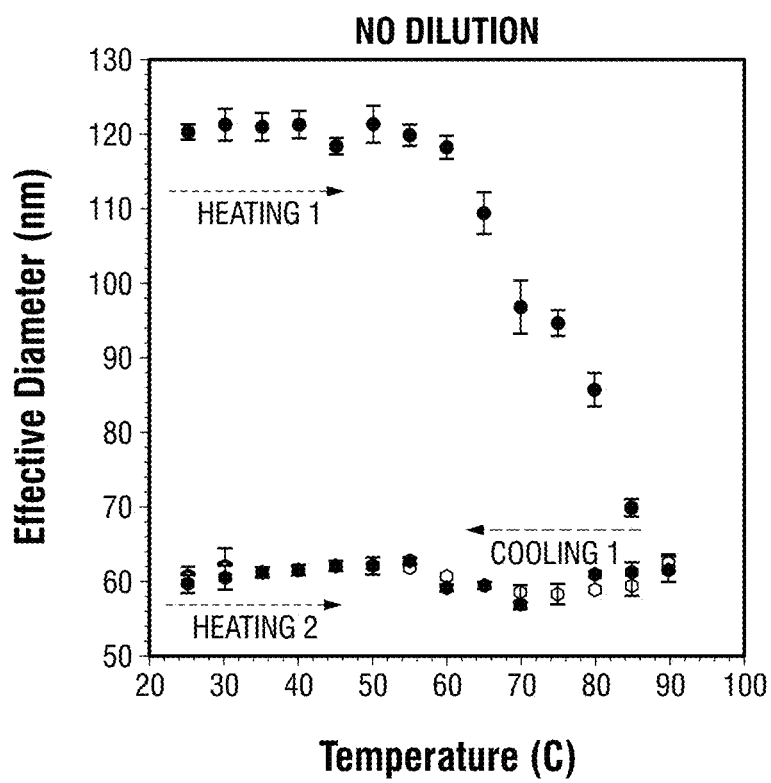
FIGS. 6A, 6B, and 6C are graphical representations of the particle size of the nanoparticles at different dilutions of the nanosurfactant mixture during heating followed by cooling, according to an embodiment.
Figure 6B:
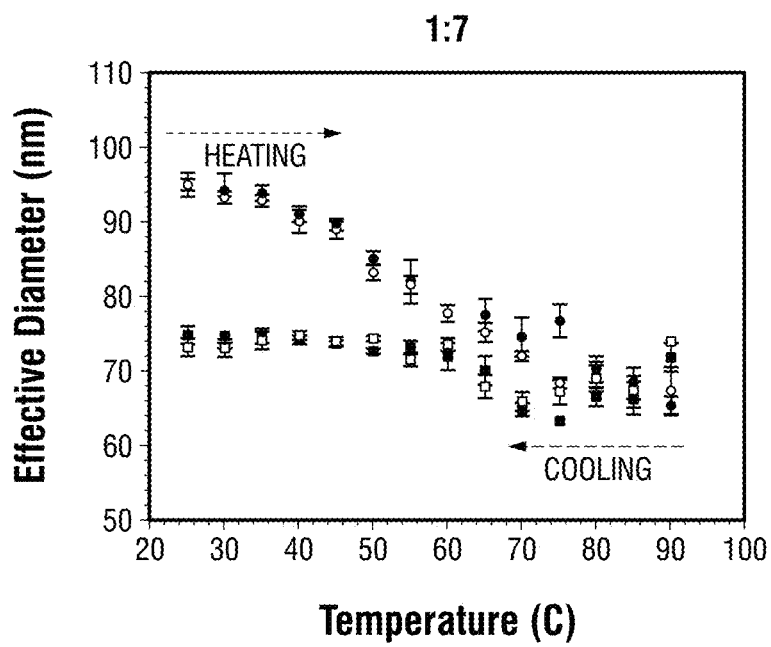
Figure 6C:
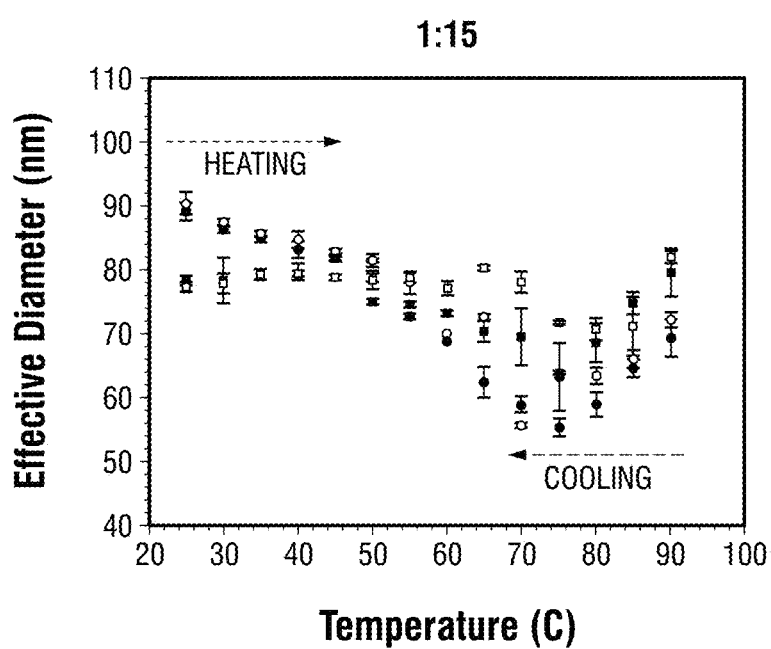

Dynamic Light Scattering (DLS) analysis was used to measure changes in size of the nanosurfactant particles and aggregation behavior with increasing temperature and upon cooling back to room temperature. Different dilutions of about 3 mL nanosurfactant solutions in seawater (none, 1:3, 1:5, 1:7, 1:15) were placed in capped quartz cuvettes. The temperature was increased uniformly from 25° C. to 90° C. at 5° C. increments with a 15-minute equilibration time at each temperature prior to measuring the particle size. For each temperature, the particle size was taken as an average of five measurements of 90 seconds each. At the end of the heating cycle, measurements were repeated for the cooling process from 90° C. to 25° C. with all other parameters being the same. FIG. 5 is a graphical representation of the particle size of the nanosurfactant particles with the petroleum sulfonate and the zwitterionic co-surfactant as measured during the heating and cooling cycles. The size of the nanosurfactant particles with the zwitterionic co-surfactant decreases with increasing temperature and remains small after cooling. Similar behavior was observed at different seawater dilutions as shown in FIGS. 6A-6C. FIGS. 6A-6C are graphical representations of the particle size of the nanosurfactant particles when diluted with seawater as measured during the heating and cooling cycles. FIG. 6A shows the particle size of the nanosurfactant particles in the fluid that was not diluted with any further seawater. FIG. 6B shows the particle size of the nanosurfactant particles in the fluid that was diluted with seven parts of seawater and FIG. 6C shows the particle size of the nanosurfactant particles in the fluid that was diluted with fifteen parts of seawater. These observations represent interesting characteristics of this nanosurfactant formulation. The nanosurfactant particles reach smaller sizes when injected into the reservoir, and will remain small even if they experience lower temperatures during their journey within the reservoir.

Example 3—Interfacial Tension (IFT) Measurements

One of the most important characteristics that determine the efficiency of a surfactant treatment in EOR is the IFT reduction. The IFT between crude oil and an aqueous solution (i.e. nanosurfactant-containing fluid) was measured using a spinning drop interfacial tensiometer (M6500). The solution to be tested was filled in a capillary tube and a drop of filtered UTMN crude oil (from Uthmaniyah oil field) was spun at ~4000 revolutions per minute (rpm) at 90° C. The diameter of the oil droplet was recorded every 5 minutes for around 30 minutes and used to calculate the IFT based on known density deference, temperature, speed, and the drop diameter. The IFT is calculated as:

$$IFT\left(\frac{mN}{m}\right) = 2.78 \times 10^{-16} \frac{\pi^2}{8n^3}(\rho_a - \rho_o)\omega D^3$$

Figure 7:
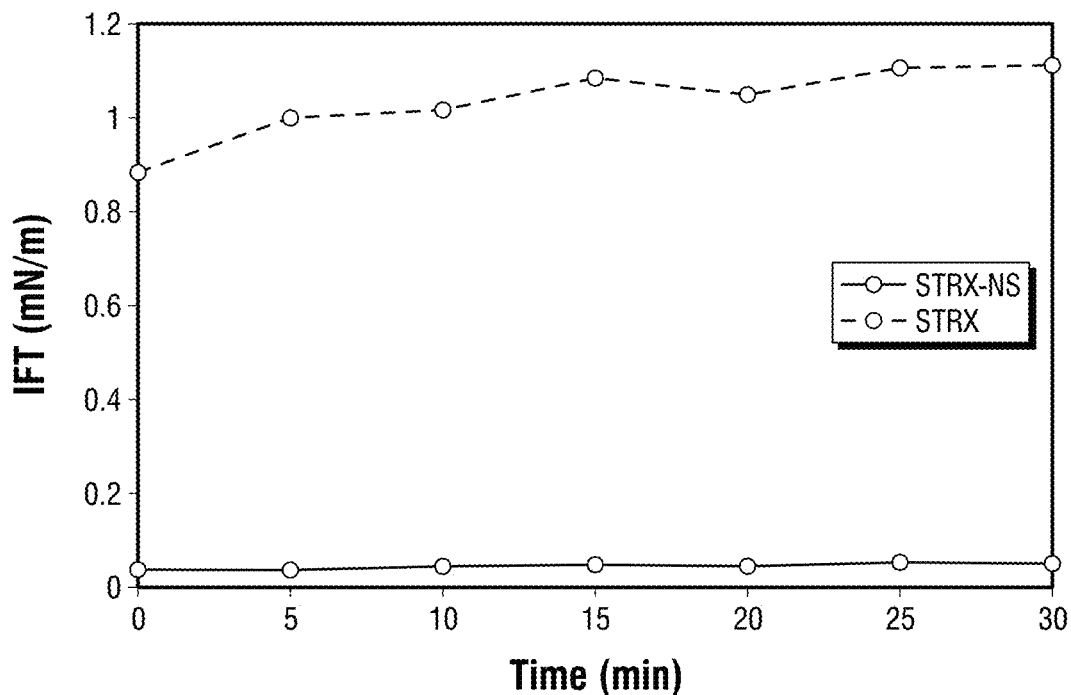
FIG. 7 is a graphical representation of the results from the interfacial tension (IFT) evaluation of the zwitterionic co-surfactant alone (STRX) and when it is present as part of the nanosurfactant mixture (NS STRX), according to an embodiment.

$\rho_a$ = density of the aqueous phase in grams per cubic centimeters (g/cm$^3$)
$\rho_o$ = density of oil in g/cm$^3$
D = diameter of cylindrical droplet in micrometers
$\omega$ = rotation speed (rpm)
n = refractive index of the aqueous solution IFT Measurements for Nanosurfactant Samples The IFT was measured for nanosurfactant samples and for fluids containing the zwitterionic co-surfactant alone. Table 2 and FIG. 7 show the IFT results for the nanosurfactant samples and for the zwitterionic co-surfactant alone. Extremely low IFT was observed for nanosurfactant sample as compared to the fluid containing the zwitterionic co-surfactant alone. These results signify that the reduction in IFT is mainly due to the cumulative functionality of the petroleum surfactant, the zwitterionic co-surfactant, and the mineral oil. This significant reduction of IFT results in better capillary action, and thus better mobilization of oil by the flood fluids compared to conventional surfactants. The results also signify the key role of petroleum sulfonates, which could only be made stable in seawater via transformation into nanosurfactants, and consequently used in oil recovery applications at high temperature and elevated salinities.

TABLE 2

| Time | IFT, mN/m | |
|---|---|---|
| (min) | STRX-NS | STRX |
| 0 | 0.041 | 0.885 |
| 5 | 0.039 | 0.997 |
| 10 | 0.049 | 1.018 |
| 15 | 0.052 | 1.086 |
| 20 | 0.050 | 1.052 |
| 25 | 0.056 | 1.107 |
| 30 | 0.056 | 1.113 |

Figure 8:
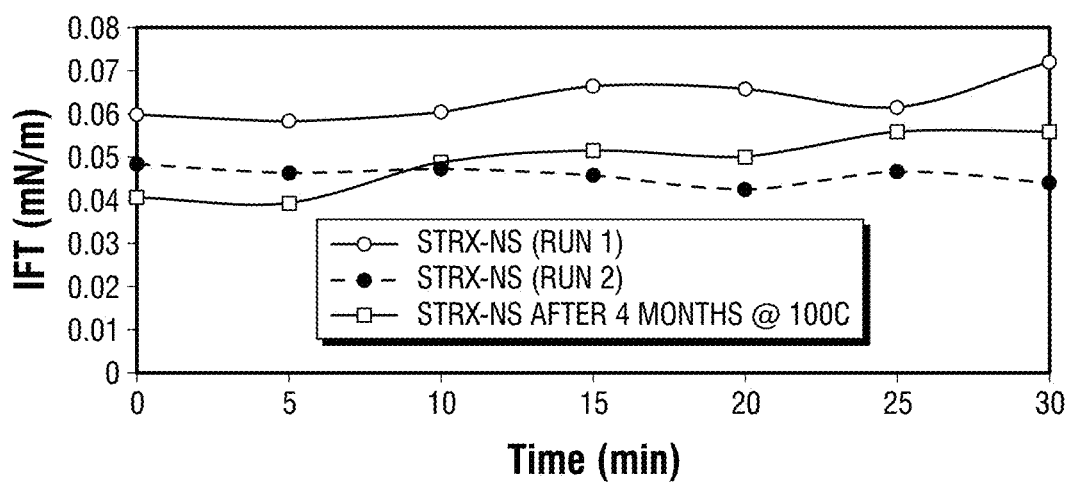
FIG. 8 is a graphical representation of the results from the IFT evaluation of the nanosurfactant mixture before and after being maintained at 100° C. for over 4 months, according to an embodiment.

Additionally, interfacial tension evaluation was conducted after the nanosurfactant composition was kept in the oven for more than 4 months at 100° C. About 5 mL of the sample was taken from the tube and the rest of the sample was sealed tightly and returned to the oven. The results were compared with the IFT values for the same sample that was measured previously before being incubated in the oven. Table 3 and FIG. 8 show the IFT results for the nanosurfactant composition before (two independent runs) and after being in the oven at 100° C. for more than four months. As mentioned previously, the stability experiments revealed that the nanosurfactant composition was stable during this period. The IFT values of the nanosurfactant composition are almost identical (within acceptable measurements error), confirming the long-term functionality and thermal stability of the nanosurfactant composition.

TABLE 3

| | IFT | | |
|---|---|---|---|
| Time (min) | STRX-NS (Run 1) | STRX-NS (Run 2) | STRX-NS after more than 4 months at 100° C. |
| 0 | 0.0599 | 0.0407 | 0.0484 |
| 5 | 0.0583 | 0.0392 | 0.0463 |
| 10 | 0.0604 | 0.0487 | 0.0472 |
| 15 | 0.0664 | 0.0515 | 0.0457 |
| 20 | 0.0658 | 0.0501 | 0.0424 |
| 25 | 0.0614 | 0.0558 | 0.0466 |
| 30 | 0.0720 | 0.0558 | 0.0440 |

More IFT evaluations were conducted using different dilutions of the zwitterionic co-surfactant alone and the nanosurfactant composition. These samples were prepared by mixing components as shown in Table 4, and their IFT was measured. For the nanosurfactant composition, the previously prepared stock solution was diluted with seawater and used. On the other hand, for the zwitterionic co-surfactant samples, a new solution was prepared by adding 10 mL deionized water to the 4 wt % STRX original solution followed by 100 mL seawater. This co-surfactant solution was used as a stock for IFT and phase behavior experiments.

TABLE 4

| Dilution | Co-surfactant alone or Nanosurfactant mixture (mL) | Seawater (mL) |
|---|---|---|
| Stock | 20 | 0 |
| 1:1 | 10 | 10 |
| 1:2 | 7 | 14 |
| 1:4 | 4 | 16 |
| 1:8 | 2.5 | 20 |
| 1:16 | 1.5 | 24 |

Figure 9A:
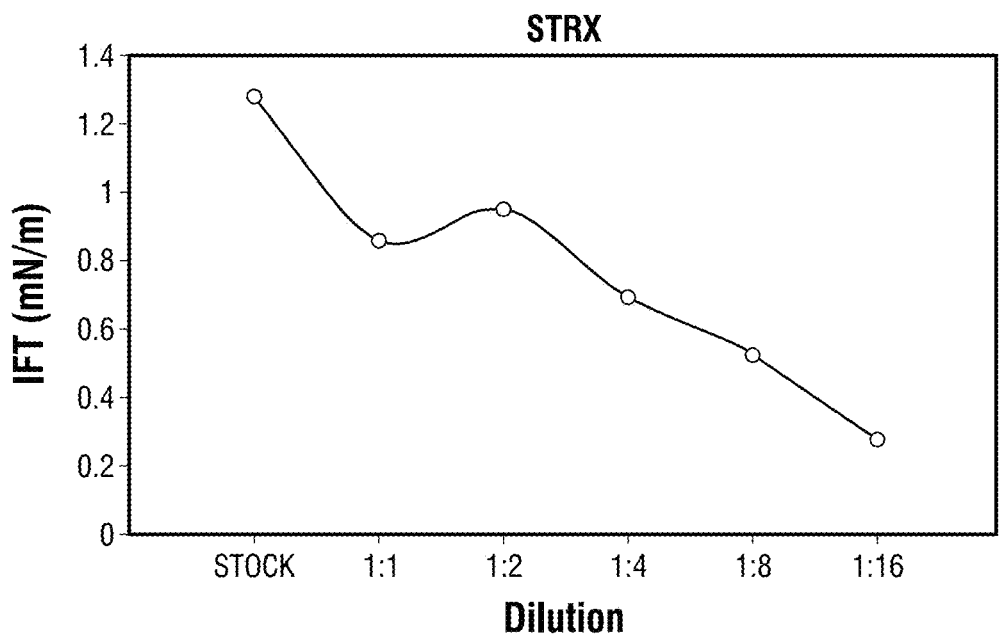
FIGS. 9A and 9B are graphical representations of the results from the IFT evaluation of different concentrations of the co-surfactant alone (STRX) and when present as part of the nanosurfactant mixture (NS STRX), according to an embodiment.
Figure 9B:
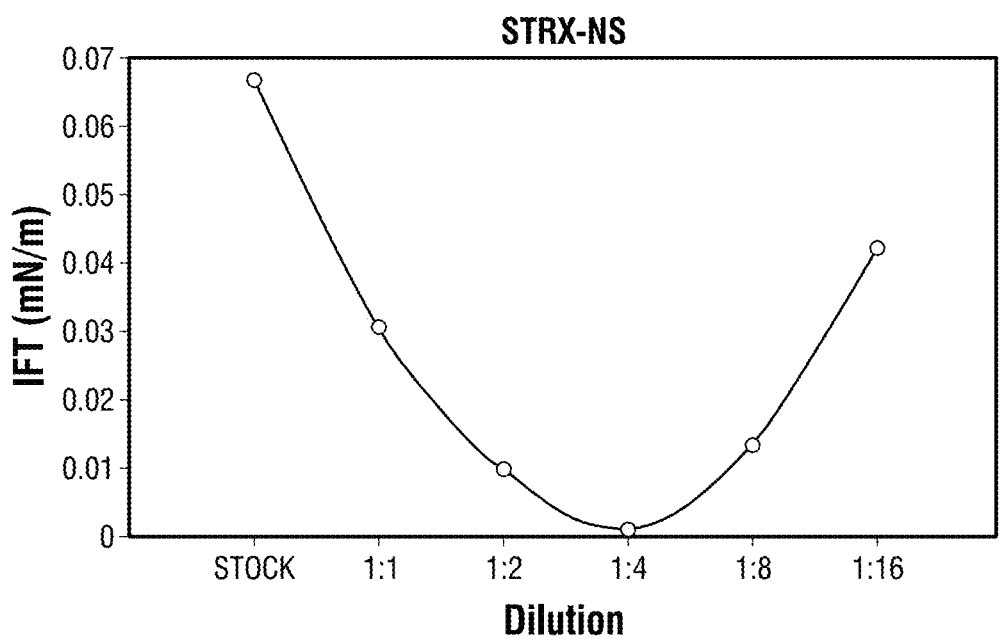

The results are summarized in FIGS. 9A and 9B. As shown in FIG. 9A, the IFT between seawater and crude oil mostly decreases when the concentration of the zwitterionic co-surfactant decreases. As shown in FIG. 9B, the IFT between seawater and crude oil decreases almost monotonically with decreasing concentration of the nanosurfactant mixture, while it reaches a minimum with nanosurfactant mixture at ~1:4 dilution. The lower the IFT, the larger the capillary number, so the nanosurfactant fluid has an increased ability to mobilize the oil with seawater. The IFT values of the nanosurfactant composition are about two orders of magnitude lower than the IFT values of a fluid with the zwitterionic co-surfactant alone. These results indicate that the efficiency of the nanosurfactant composition to mobilize oil in the reservoir becomes better as it mixes with the pore water in the reservoir.

Further IFT measurements were obtained for the zwitterionic co-surfactant alone and the nanosurfactant composition containing the same amount of zwitterionic co-surfactant with different amounts of petroleum sulfonate. In order to realize the effect of the EOR-2095 concentration on the IFT values, samples with different zwitterionic co-surfactant/EOR-2095 ratios were prepared according to Table 5, where the volume of the zwitterionic co-surfactant solution was held constant in all the samples while varying the amount of EOR-2095.

TABLE 5

| Sample # | 5 wt % EOR (mL) | 4 wt % STRX (mL) | SW (mL) |
|---|---|---|---|
| 1 | 0.5 | 1.3 | 10 |
| 2 | 0.6 | | |
| 3 | 0.7 | | |
| 4 | 0.8 | | |
| 5 | 0.9 | | |
| 6 | 1.0 | | |
| 7 | 1.1 | | |
| 8 | 1.2 | | |
| 9 | 1.3 | | |
| 10 | 1.4 | | |
| 11 | 1.5 | | |
| 12 | 1.6 | | |
| 13 | 1.7 | | |
| 14 | 1.8 | | |

Figure 10:
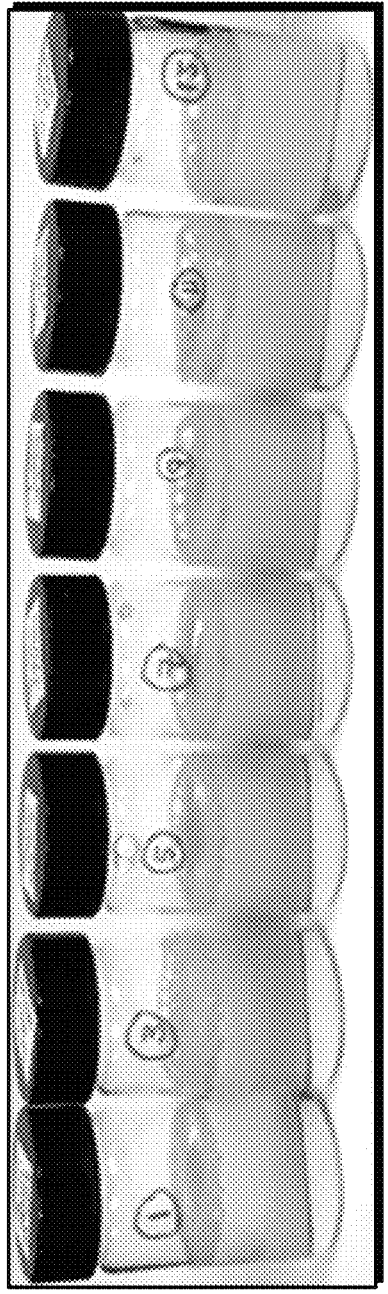
FIG. 10 is a photograph showing the various nanosurfactant samples with different ratios of the zwitterionic co-surfactant to petroleum sulfonate.

Initially, the samples were prepared for IFT tests by mixing petroleum sulfonate and seawater first, then the zwitterionic co-surfactant was added. The mixtures appeared cloudy, indicating the formation of precipitates. So the measurements were repeated by first mixing the zwitterionic co-surfactant with petroleum sulfonate prepared in fresh water, followed by mixing with seawater. Only half of the samples were prepared for repeating the IFT (FIG. 10). The IFT values of seven nanosurfactant samples with different zwitterionic co-surfactant/petroleum sulfonate ratios were measured as shown in Table 6. The average of the last three readings was used here to present the IFT for each sample. It can be seen that the IFT decreased as the amount of petroleum sulfonate in nanosurfactant was increased as shown in Table 6.

TABLE 6

| Sample # | EOR/STRX | New IFT (mN/m) |
|---|---|---|
| 1 | 0.385 | 0.134 |
| 3 | 0.538 | 0.104 |
| 5 | 0.692 | 0.055 |
| 7 | 0.846 | 0.036 |
| 9 | 1.000 | 0.022 |
| 11 | 1.154 | 0.014 |
| 13 | 1.308 | 0.002 |

Example 4

Figure 11:
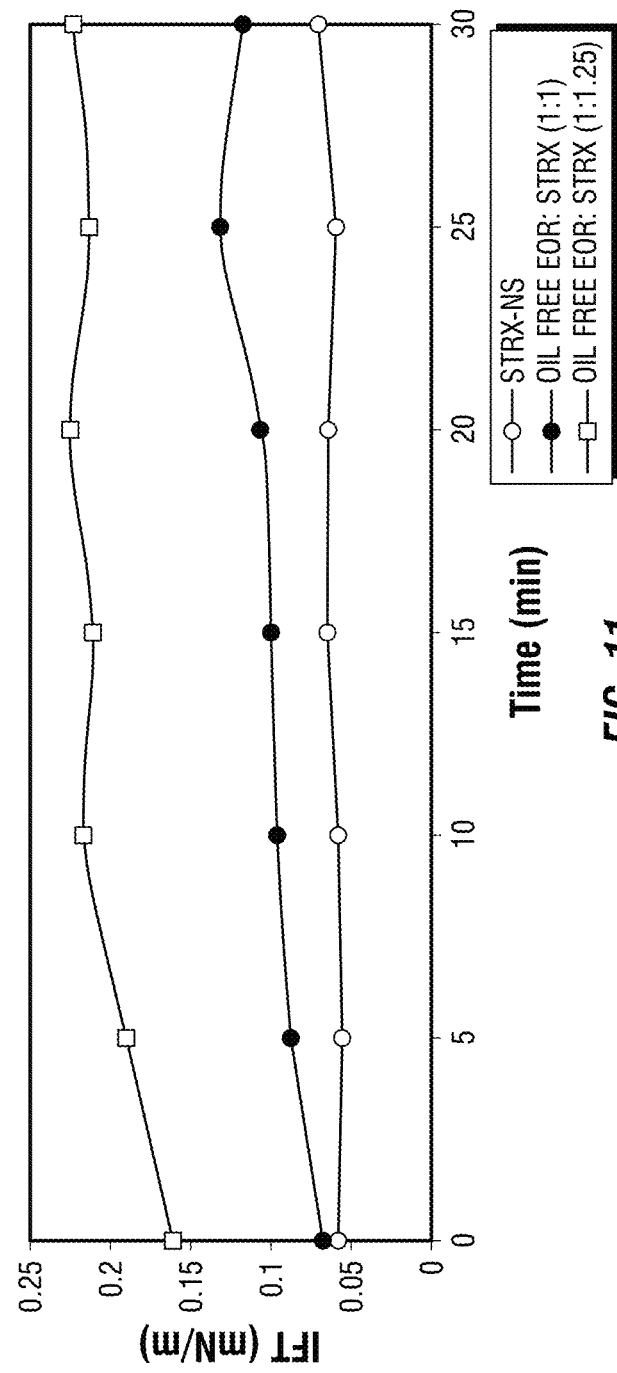
FIG. 11 is a graphical representation of the results from the IFT evaluation of a nanosurfactant mixture with mineral oil and nanosurfactant mixtures without the mineral oil.

To evaluate the role of mineral oil on IFT, a clear brown solution of EOR-2095 (2.5 wt %) was formed by mixing 2 g of oil-free petroleum sulfonate with 19.5 mL of deionized water. Mineral oil was intentionally removed from EOR-2095. The sample was sonicated using a probe sonicator for few minutes followed by using the ultrasonic bath for around 40 minutes with heating the sample at 60° C. This oil-free petroleum sulfonate (2.5 wt %) was used with the zwitterionic co-surfactant (4 wt %) and seawater to prepare two samples with the ratios 1:1:10 and 1:1.25:10 for petroleum sulfonate:the zwitterionic co-surfactant:seawater. The IFT was measured for theses samples for around 30 minutes and compared to the IFT for the zwitterionic co-surfactant-nanosurfactant (stock). Table 7 and FIG. 11 show the role of the mineral oil as well as increasing the ratio of oil-free EOR-2095 to the zwitterionic co-surfactant from 0 to 1.0 (the IFT for the zwitterionic co-surfactant alone is not included, but is in the range of ~0.3-0.4 mN/m).

TABLE 7

| | IFT (mN/m) | | |
|---|---|---|---|
| Time (min) | STRX-NS | Oil-free EOR:STRX (1:1) | oil free EOR:STRX (1:1.25) |
| 0 | 0.060 | 0.069 | 0.163 |
| 5 | 0.058 | 0.089 | 0.192 |
| 10 | 0.060 | 0.097 | 0.218 |
| 15 | 0.066 | 0.101 | 0.212 |
| 20 | 0.066 | 0.108 | 0.226 |
| 25 | 0.061 | 0.133 | 0.214 |
| 30 | 0.072 | 0.119 | 0.223 |

The presence of mineral oil improves the IFT performance of the nanosurfactant by approximately 4-5 times. Mineral oil facilitates the formation of nano-emulsion droplets and containment of the petroleum sulfonates. Also, this suggests that doping the petroleum sulfonates with different types and amounts of oil may play an important role.

Example 5—Testing the Effect of the Soluble Fraction of the Petroleum Sulfonate on the IFT An experiment was done using two different filtration options to address a concern about how much the soluble fraction of the petroleum sulfonate affects the IFT value with crude oil. About 10 mL of the 5 wt % EOR-2095 was mixed with 12.5 mL deionized water and 100 mL seawater. Sample was set for an hour and precipitated chunks were filtered by a filter paper under vacuum and IFT was measured for this supernatant. The other part of the sample was further filtered using a 0.22 μm syringe filter, then IFT was measured again. Table 8 and FIG. 12 show the IFT results for the supernatant containing EOR-2095 after removal of the gummy precipitate, which was formed in seawater, by filtration through a paper disk. The other part of the supernatant was further filtered by a 0.22 μm syringe filter. The IFT for filtered supernatant was very hard to measure due to the inability to move the oil droplet inside the capillary to the viewing field per the standard procedure. This is an indication of a greater IFT value of the filtered supernatant with crude oil. This confirms that the soluble fraction of petroleum sulfonates in the nanosurfactant structure has no role in the observed IFT reduction of nanosurfactant with crude oil.

TABLE 8

| Time (min) | Supernatant IFT (mN/m) |
|---|---|
| 0 | 0.464 |
| 5 | 0.518 |
| 10 | 0.555 |
| 15 | 0.575 |
| 20 | 0.639 |
| 25 | 0.633 |
| 30 | 0.688 |

Figure 14:
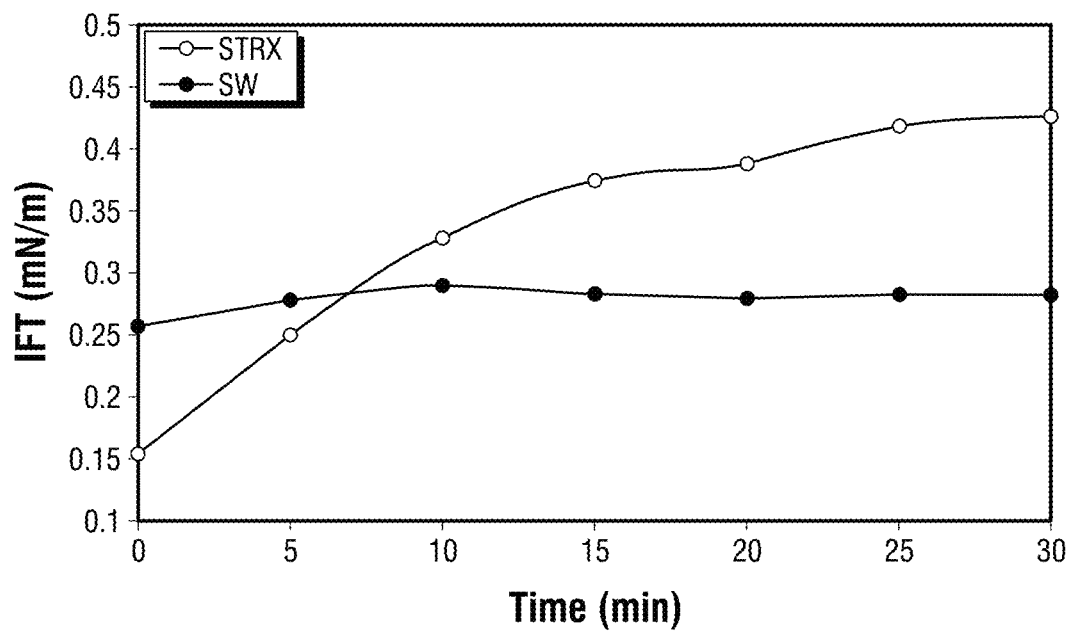
FIG. 14 is a graphical representation of the results obtained following interfacial tension evaluation of the seawater alone (shown as blue line labeled SW on the graph) and the nanosurfactant mixture with petroleum sulfonate surfactant, zwitterionic co-surfactant, and mineral oil mixed with sea water (shown as green line labeled STRX on the graph).

IFT for Seawater and the Zwitterionic Co-Surfactant Using Petroleum Sulfonates/Oil A solution of 5 wt % petroleum sulfonates was prepared by mixing 50 g of EOR-2095 with 950 mL deionized water, as shown in FIG. 13A. The mixture was stirred for about 10 minutes to ensure complete dissolution. About 10 g of petroleum sulfonates/deionized water was added to 50 mL seawater to form precipitates of calcium and magnesium petroleum sulfonate (FIGS. 13B and 13C). The mixture was kept for some time, then the precipitates were filtered and dried under vacuum in the desiccator for several days. After drying, 0.5 g of the waxy sample, as shown in FIG. 13D, was mixed with 5 mL of UTMN crude oil forming petroleum sulfonates/oil, as shown in FIG. 13E. The IFT values of the petroleum sulfonates/oil mixture and seawater only as well as seawater containing the zwitterionic co-surfactant were measured. FIG. 14 shows that the IFT values for the oil-seawater (SW) is greater in the presence of the zwitterionic co-surfactant. This result confirms that the reduction of the oil-seawater IFT is not due to any soluble fraction of petroleum sulfonate that may coexist in the nanosurfactant composition.

Figure 15:
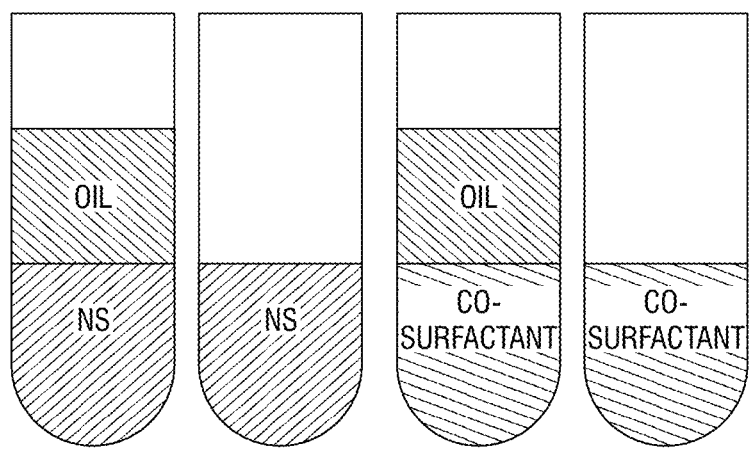
FIG. 15 is a schematic illustration for the phase behavior experimental setup, according to an embodiment.
Figures 16A, 16B:
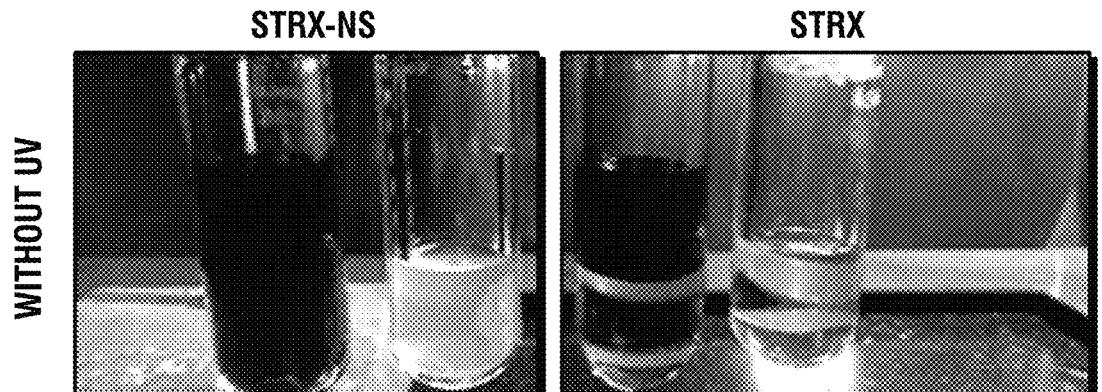
FIGS. 16A-16D are photographic images under normal light and under ultraviolet (UV) light of the zwitterionic co-surfactant alone and the nanosurfactant mixture with zwitterionic co-surfactant in contact with crude oil; and both mixtures being incubated at 100° C. for one week.
Figures 16C, 16D:
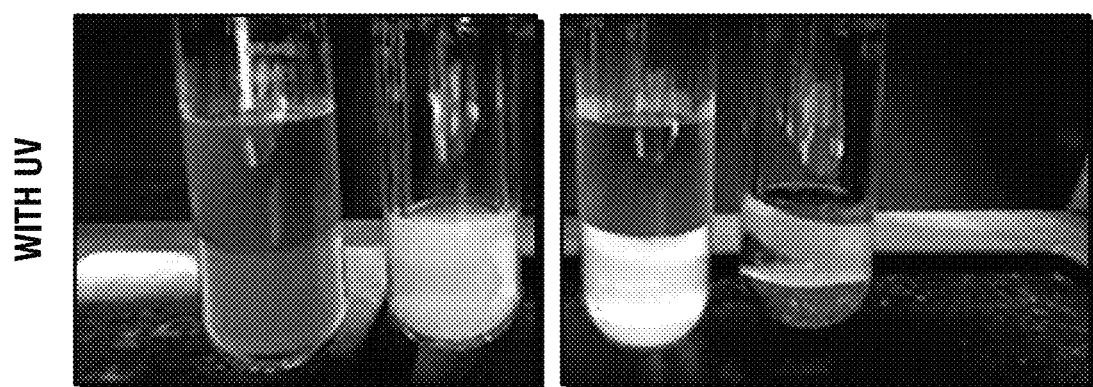

Phase behavior experiments were conducted on samples of the zwitterionic co-surfactant alone and the nanosurfactant composition. The experimental results were recorded by visual inspection with the use of UV light (365 nm). About 5 mL from each sample was placed into a pressure tube and sealed tightly to avoid any fluid loss. From each sample, two tubes were prepared; one with the addition of oil and the other without any oil. UTMN crude oil was used and was added gently to the surface of the sample, as shown in FIG. 15. The same procedure was done with deionized water as a control sample. All the tubes were incubated in the oven at 100° C., without any mechanical mixing. At different time intervals (1 h, 2 h, 4 h, 1 d, etc.) the samples were checked and photographs were taken with and without exposure to UV light. FIG. 16A shows the phase behavior results under normal light for the nanosurfactant composition after being incubated in the oven at 100° C. for one week. FIG. 16B shows the phase behavior results under normal light for the fluid containing the zwitterionic co-surfactant alone after being incubated in the oven at 100° C. for one week. FIGS. 16C and 16D show the images of the samples in FIGS. 16A and 16B, respectively, when exposed to UV light.

Comparing the tubes containing the nanosurfactant mixture in contact with crude oil with those containing the co-surfactant alone in contact with crude oil, it can be seen that the samples with the nanosurfactant mixture are much darker, indicating improved formation of oil-in-water emulsions. Comparing the tubes containing the nanosurfactant mixture in contact with crude oil with those containing the co-surfactant alone, but containing no oil indicates that the more pronounced blue light emitted from the nanosurfactant mixture is due to the petroleum sulfonate. When they get in contact with crude oil, samples of the nanosurfactant composition and the fluid with the zwitterionic co-surfactant alone exchange some components with the crude oil into the aqueous phase, with the nanosurfactant composition being more efficient in enhancing that exchange. The above observations further support the ability of the nanosurfactant formulation to enhance the interaction of seawater with crude oil and form oil-in-water emulsions, thus improving recovery.

Figure 17:
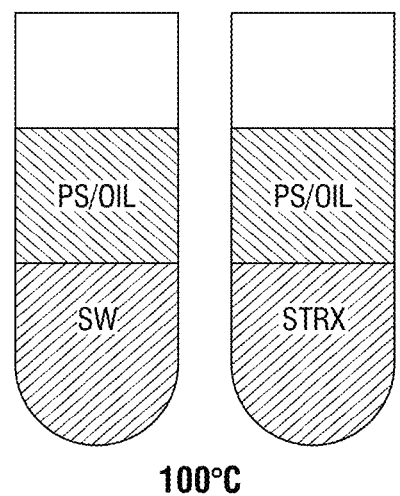
FIG. 17 is a schematic illustration for the phase behavior experimental setup, according to an embodiment.
Figure 18A:
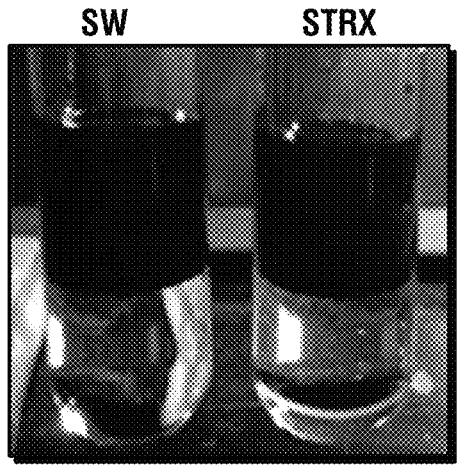
FIGS. 18A and 18C are photographic images under normal light and FIGS. 18B and 18D are photographic images under UV light of the seawater alone (SW) and the nanosurfactant mixture with a zwitterionic co-surfactant (STRX), all samples being incubated with a second layer of a mixture of petroleum sulfonate and oil.
Figure 18B:
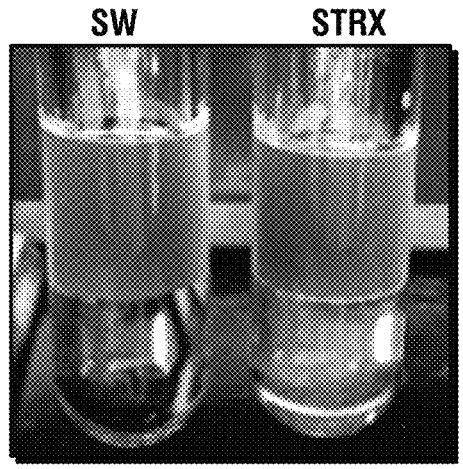
Figure 18C:
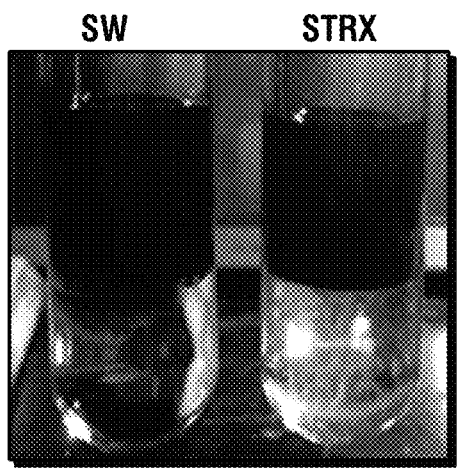
Figure 18D:
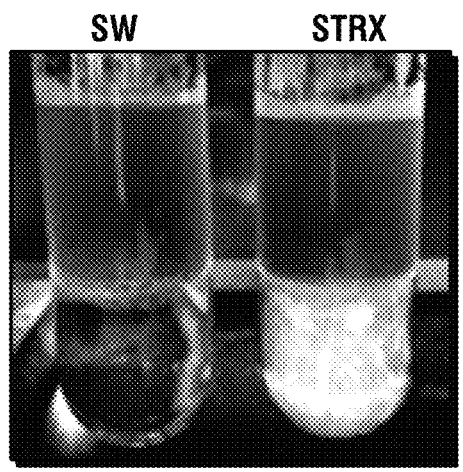

Further phase behavior experiments were conducted to examine the interaction of the zwitterionic co-surfactant and seawater with the petroleum sulfonates and oil. FIG. 17 shows a schematic of the experimental set up. About five (5) mL the zwitterionic co-surfactant was added in a cylindrical pressure tube with air-tight Teflon lids, followed by the addition of 5 mL of petroleum sulfonates and oil carefully over it. The tubes were incubated in the oven at 100° C. without any mechanical mixing and were checked and photographed with and without being exposed to UV light (365 nm) over different time intervals. The same procedure was followed with seawater, which was prepared as a control sample. FIGS. 18A and 18B show the phase behavior of the zwitterionic co-surfactant and seawater using petroleum sulfonates/oil immediately after set up. After 1 h of incubation at 100° C., the zwitterionic co-surfactant solution was cloudy. FIGS. 18C and 18D show the phase behavior of the zwitterionic co-surfactant and seawater using petroleum sulfonates/oil after one hour at 100° C. These observations signify the ability of the nanosurfactant mixture with zwitterionic co-surfactant to emulsify crude oil without the need of any mechanical mixing, solely by the effect of the reservoir's temperature, due to the extremely low IFT induced by the mixture.

Example 6—Static Sorption Tests

Figure 19A:
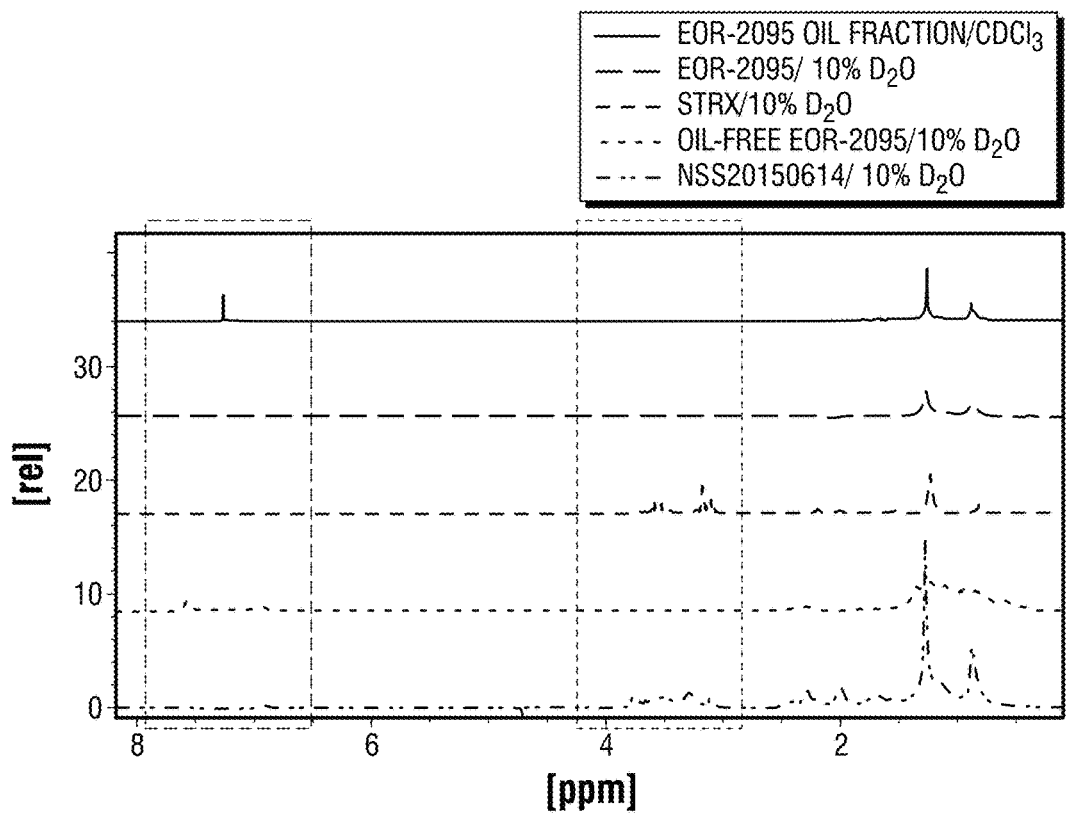
FIG. 19A is a proton nuclear magnetic resonance ($^1$H-NMR) spectrum of the nanosurfactant mixture and each of its individual ingredients. Regions of the spectrum in FIG. 19A that are highlighted as a red rectangle and a green rectangle are enhanced and shown separately in FIGS. 19B and 19C, respectively.
Figure 19B:
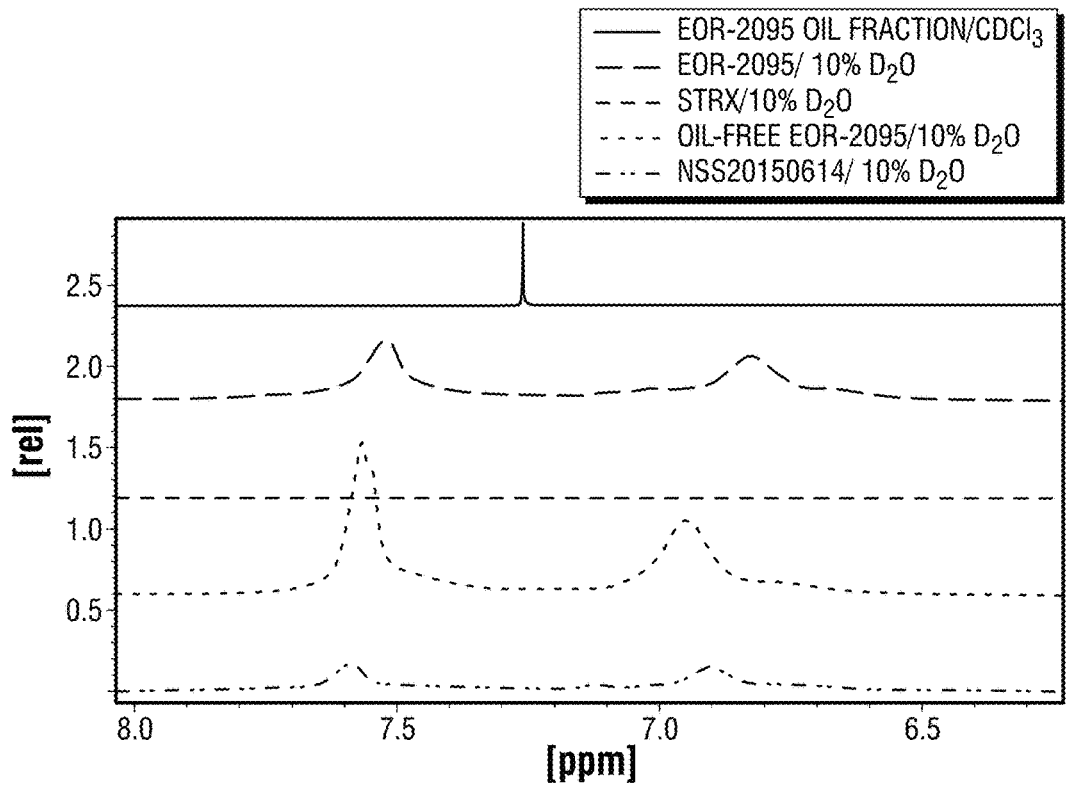
Figure 19C:
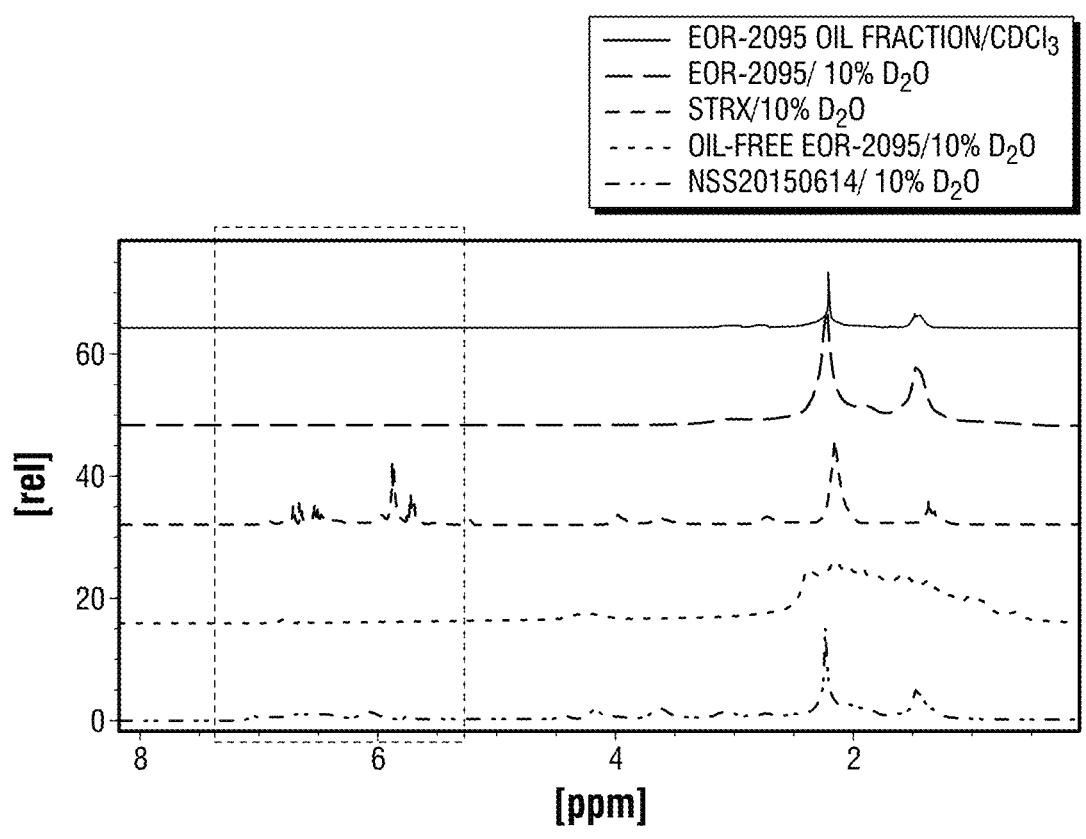

Static sorption tests were conducted to evaluate the nanosurfactant solution with zwitterionic co-surfactant (~0.2 wt % total active ingredients) and the zwitterionic co-surfactant alone (~0.1 wt % STRX). Briefly, outcrop Arab-D rock was crushed as fine as possible and sieved to isolate the fraction passing through mesh size 40 and retained mesh size 100. In two 15 mL pressure tubes, about 4.0 g of crushed rock was added with 10 mL of the nanosurfactant mixture. In another two 15 mL pressure tubes, 4.0 g of crushed rock was added with 10 mL of the zwitterionic co-surfactant solution alone. The control samples were separate tubes of 10 mL of the nanosurfactant solution and 10 mL of the zwitterionic co-surfactant solution. Tubes were shaken 10 times and placed in the oven for 24 hours at 100° C. Samples were removed from the oven and 3 mL from the supernatant were collected in centrifuge tubes. Samples were centrifuged for 30 minutes at 3000 rpm, and about 2 mL of the supernatant (uppermost layer) was collected from each centrifuge tube into separate clean test tubes. NMR measurements were done on the supernatant samples. As shown in FIGS. 19A-19C, the $^1$H NMR spectra for five different formulations with suppressed/removed H$_2$O signal are present. The first spectrum from the top is EOR-2095 oil fraction/CDCl$_3$ for the mineral oil fraction which was removed from EOR-2095 sample and dissolved in deuteriated chloroform. The second spectrum from the top is EOR-2095/10% D$_2$O for commercial EOR-2095 dissolved in 10% deuterium oxide (D$_2$O) in water. The third spectrum from the top is STRX/10% D$_2$O for Surfatex CBS dissolved in 10% deuterium oxide in water. The fourth spectrum from the top is oil-free EOR-2095/10% D$_2$O for EOR-2095 with originally present mineral oil removed from it and EOR-2095 fractions dissolved in 10% D$_2$O in water. The last spectrum is NSS20150614/10% D$_2$O for nanosurfactant formulations in 10 wt % deuterium oxide in water. As shown in FIG. 19A, the nanosurfactant mixture (spectrum at the bottom) has two regions (presented by the left hand side and right hand side dashed rectangles), where the signals of the individual ingredients (peaks at 3-4 ppm coming from Surfatex CBS and 6.6-8.0 ppm from EOR-2095) did not overlap and could be integrated with sufficient accuracy. FIG. 19B and FIG. 19C are expanded visualizations of the $^1$H NMR spectra between 6.3 and 8 ppm and between 0 and 4.2 ppm, respectively.

To quantify the loss of surfactants due to adsorption, three 10 mL aliquots of zwitterionic co-surfactant alone (0.2 wt % in synthetic seawater) and three 10 mL aliquots of the nanosurfactant mixture (0.2 wt % of active ingredients) were placed in 15 mL screwcap tubes. Then, powdered Arab-D outcrop rock (4.00 g, 40-100 mesh fraction) was added to the two tubes containing the zwitterionic co-surfactant alone and two tubes containing the nanosurfactant mixture. The tubes were sealed, vigorously shaken and placed in an oven maintained at 100° C. for 24 hours. Following the heating step, the tubes were cooled to room temperature and 3 mL aliquots of the supernatants were withdrawn. The aliquots were placed in disposable polyethylene centrifuge test tubes and centrifuged at 3000 rpm for 30 minutes. Aliquots of the resulting supernatants (0.9 mL) were withdrawn using an Eppendorf micropipette and mixed with a standard solution of maleic acid (0.1 mL, 0.10 g of maleic acid in 11.08 g of D$_2$O) as an internal reference in scintillation vials. Then about 0.7 mL aliquots of the mixed solutions were transferred to the NMR tubes for measurements. The $^1$H-NMR spectra were measured on Bruker Avance spectrometer operating at 400 MHz. To suppress the water peak, each spectrum was induced with an excitation sculpting pulse sequence using the standard (zgespg) program from the Bruker pulse library. A 4000 Hz acquisition window centered at the peak of the water signal (about 4.7 ppm) was used and 64 scans were collected for each sample with a 3 second delay between the scans. The integral of maleic acid (sharp singlet at 6.45 ppm) was given the value of 1000 for every sample and the other integrals were referenced to it. As shown in FIGS. 20A-20B, 21A-21B, 22, and 23, the residual amounts of EOR-2095 and the zwitterionic co-surfactant were determined by dividing the corresponding integral values for the rock exposed samples by the integral values for the control samples ($S_{after}/S_{before}$), where is Sa corresponds for amount of EOR-2095, Sb for amount of Surfatex CBS, and Sc for combined amount of EOR-2095 with Surfatex CBS.

Figure 20A:
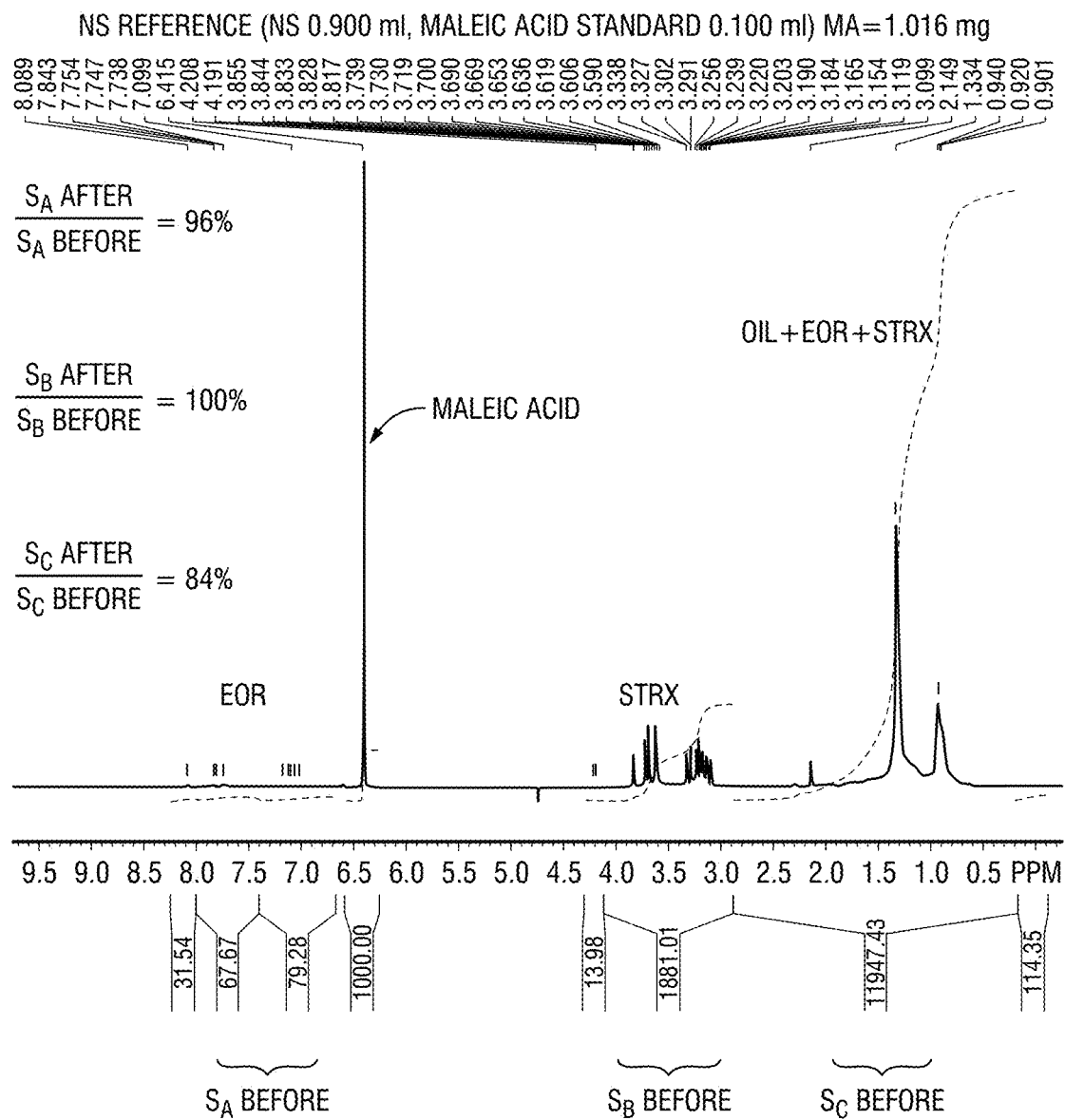
FIGS. 20A and 20B are $^1$H-NMR spectra of samples of the nanosurfactant-containing fluid collected before and after contact with powdered Arab-D outcrop rock, respectively, according to an embodiment.
Figure 20B:
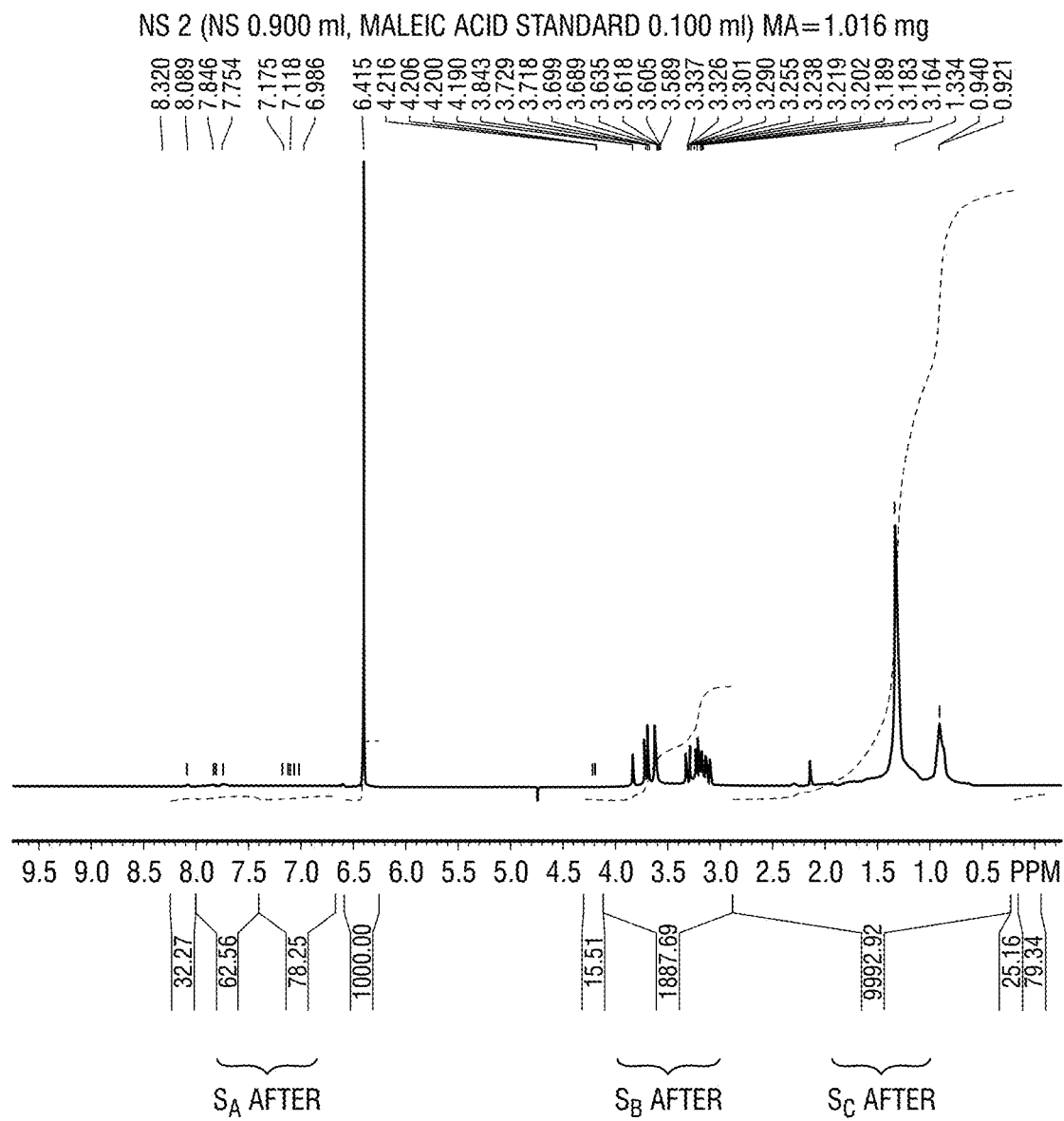
Figure 21A:
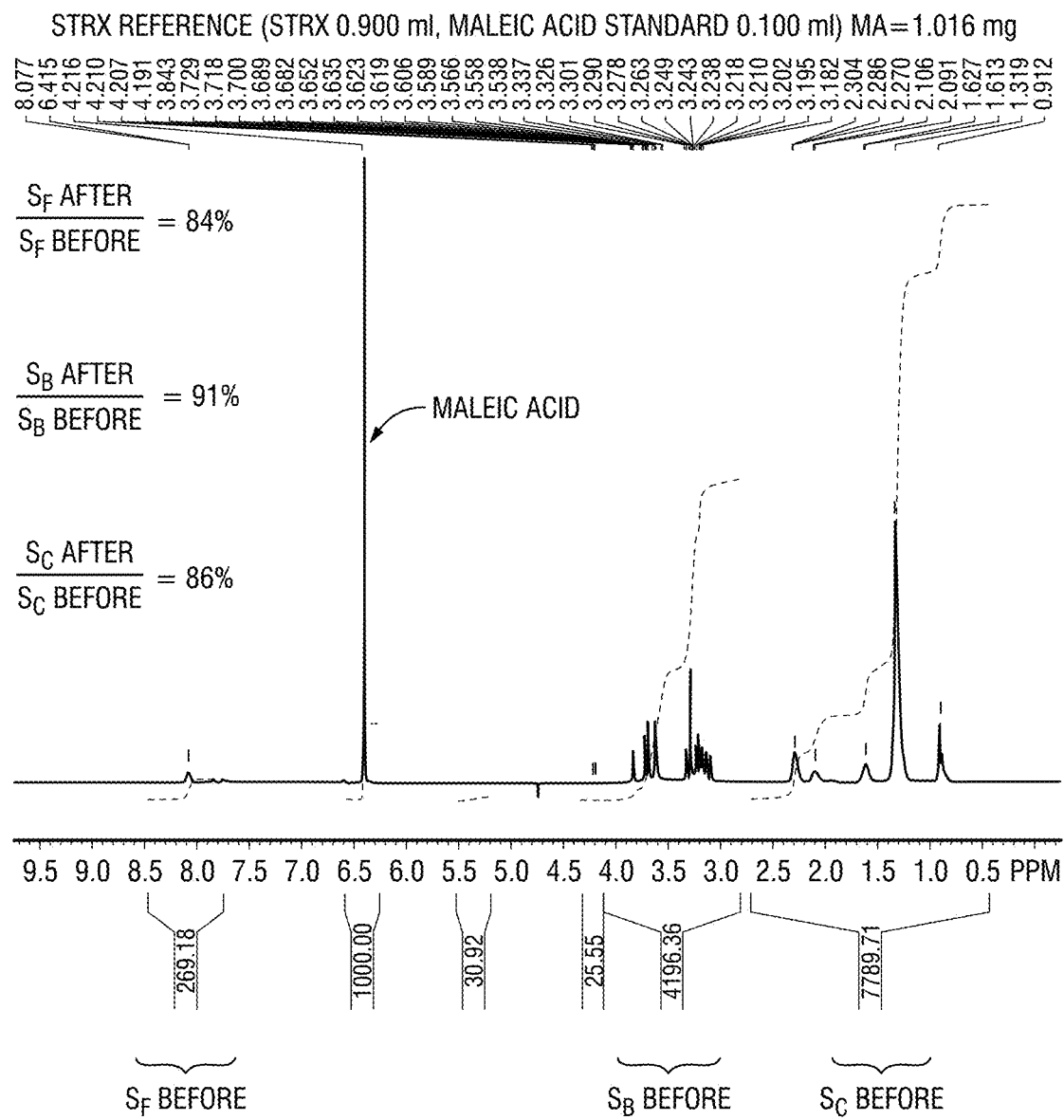
FIGS. 21A and 21B are $^1$H-NMR spectra of samples of a fluid containing the zwitterionic co-surfactant collected before and after contact with powdered Arab-D outcrop rock, respectively, according to an embodiment.
Figure 21B:
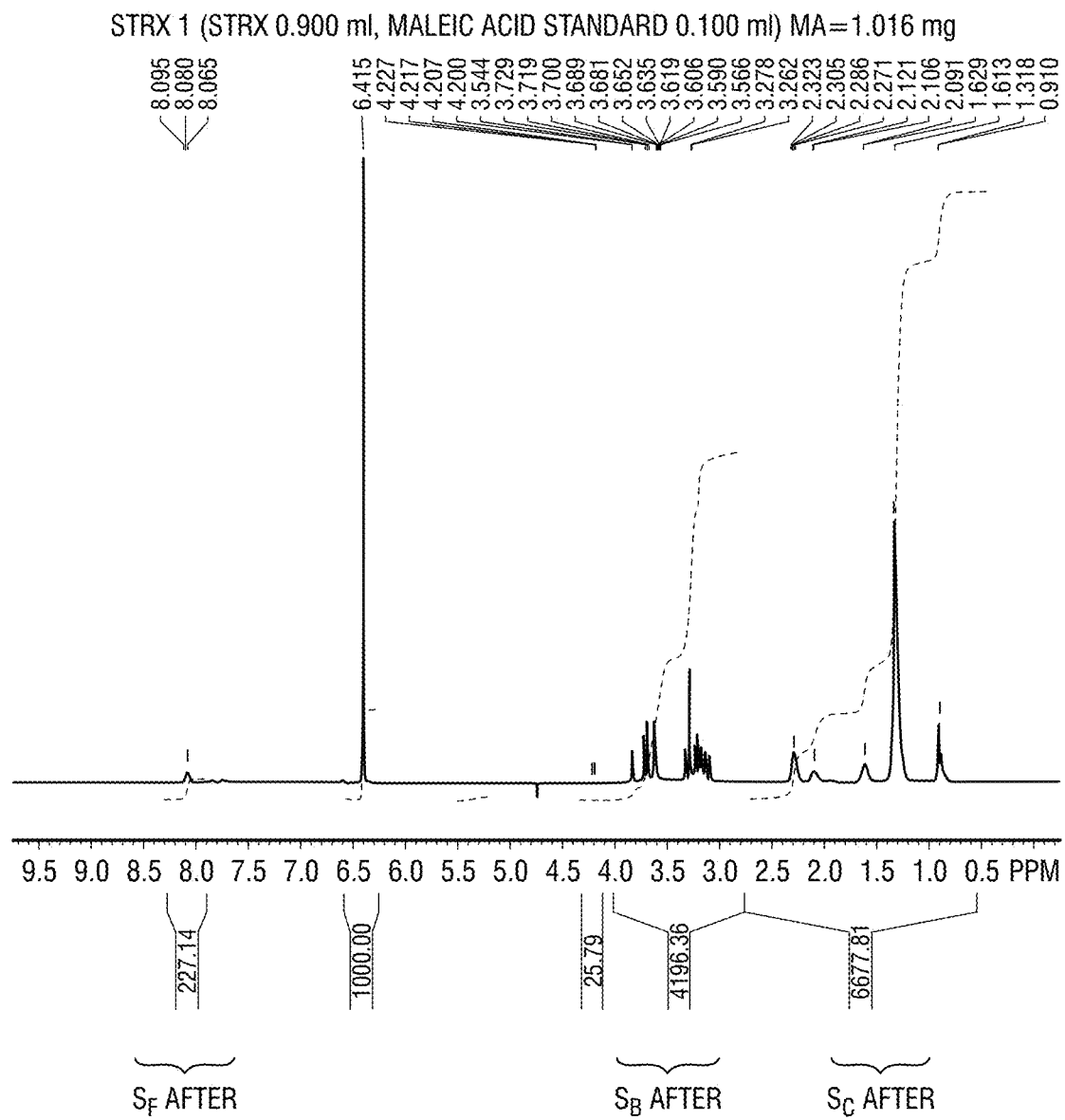
Figure 22:
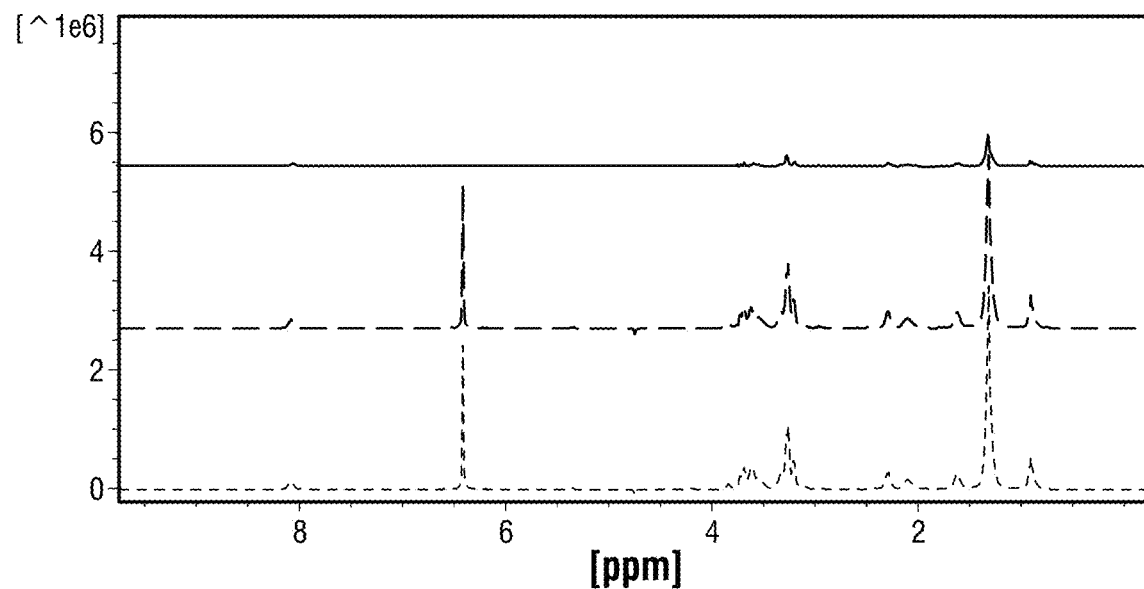
FIG. 22 is a series of difference spectra based on the $^1$H-NMR spectra of samples of a fluid containing the zwitterionic co-surfactant collected before and after contact with powdered Arab-D outcrop rock, respectively, according to an embodiment.
Figure 23:
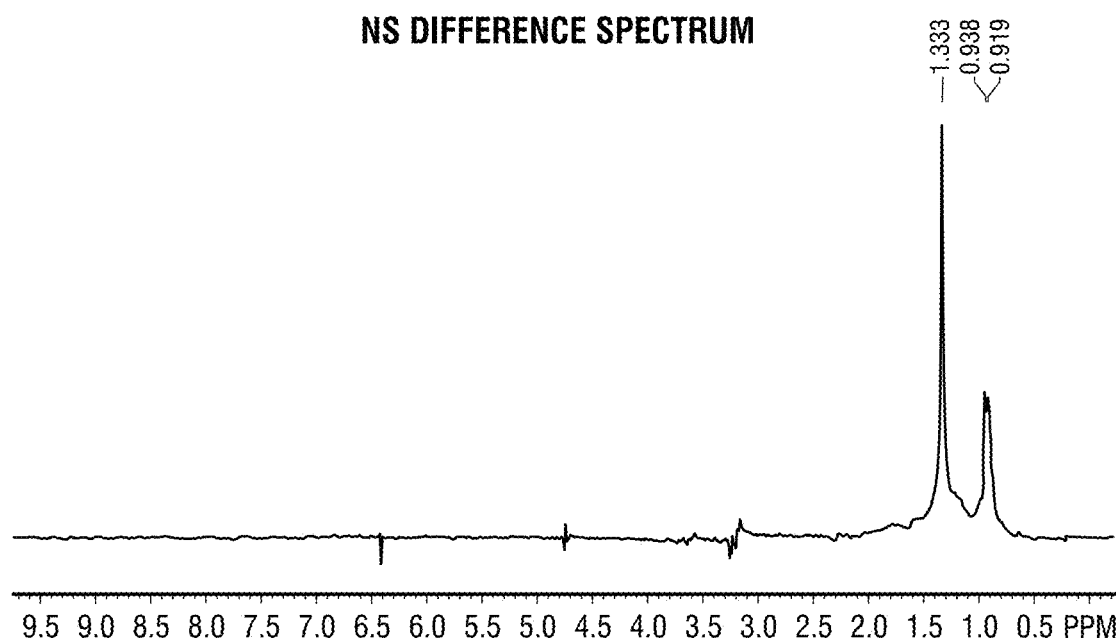
FIG. 23 is a difference spectrum based on the $^1$H-NMR spectra of samples of the nanosurfactant-containing fluid collected before and after contact with powdered Arab-D outcrop rock, respectively, according to an embodiment.

FIGS. 20A and 20B are $^1$H-NMR spectra of samples of the nanosurfactant composition collected before and after contact with powdered Arab-D outcrop rock, respectively. The loss of surfactants due to adsorption when using the nanosurfactant composition (STRX-NS) was quantified from these $^1$H-NMR spectra. FIG. 23 is a difference spectrum based on the $^1$H-NMR spectra of samples of the nanosurfactant-containing fluid before and after contact with powdered Arab-D outcrop rock, respectively. FIGS. 21A and 21B are $^1$H-NMR spectra of samples of a fluid containing the zwitterionic co-surfactant collected before and after contact with powdered Arab-D outcrop rock, respectively. The loss of surfactants due to adsorption when using the zwitterionic co-surfactant (STRX) alone was quantified from these $^1$H-NMR spectra. FIG. 22 is a series of difference spectra based on the $^1$H-NMR spectra of samples of a fluid containing the zwitterionic co-surfactant collected before and after contact with powdered Arab-D outcrop rock, respectively. The red line is the spectrum for surfactant solution before exposure to rock and the blue line is the spectrum for surfactant solution after exposure to rock. The green line is the difference spectrum that supports the measurement of the amount of surfactant retained on the powdered Arab-D outcrop.

NMR results in FIGS. 21A and 21B showed significant difference between loss values for integrals B and C in the pure the zwitterionic co-surfactant sample, indicating that components of the surfactant containing long aliphatic chain ($C_{11}H_{23}$ on average, integral C) are adsorbed preferentially. The signals in area B (2.8-4.0 ppm) correspond to the short diamine link derived from N,N-dimethyl-1,3-propanediamine, the aliphatic protons of the hydroxysulfonate head group derived from 3-chloro-2-hydroxypropane sulfonic acid and byproducts derived from the same amine and sulfonic acid. Moreover, as the surfactancy of the zwitterionic co-surfactant results from the presence of long-chain components, using integral C for this surfactant's quantification will provide an estimate better correlated with its activity. Therefore, the present test should be interpreted to show that 23% of the original amount of the zwitterionic co-surfactant (20 mg) was lost to adsorption. This value corresponds to about 1.2 mg of surfactant per 1 gram of rock and is in line with observations reported for other brine-compatible surfactants.

In studies using the nanosurfactant mixture with zwitterionic co-surfactant as shown in FIGS. 20A and 20B, the amounts of aliphatic (area C, 0.30-2.80 ppm) and aromatic (area A, 7.0-8.0 ppm) are significantly reduced after exposure to the rock powder, while signals in area B are not affected as much. As area A ($S_A$) shows only signals resulting from surface active ingredients (long-chain alkylbenzene sulfonates) of EOR-2095, the loss of this surfactant can be reliably quantified by integrating this area alone. Thus, 38% of the original amount of EOR-2095 (10 mg) was lost corresponding to about 1 mg per gram of rock. The amount of zwitterionic co-surfactant that is lost cannot be calculated from direct integration of area C ($S_C$), because of overlapping of signals given by all ingredients, although it can be estimated assuming that the ratio of loss between areas B ($S_B$) and C ($S_C$) remains the same for pure the zwitterionic co-surfactant alone and the nanosurfactant mixture with zwitterionic co-surfactant (STRX-NS). Consequently, the loss of the zwitterionic co-surfactant from the nanosurfactant solution is estimated to be 6%*23%/14%=10% or 1 mg corresponding to 0.25 mg per gram of rock.

Figure 24:
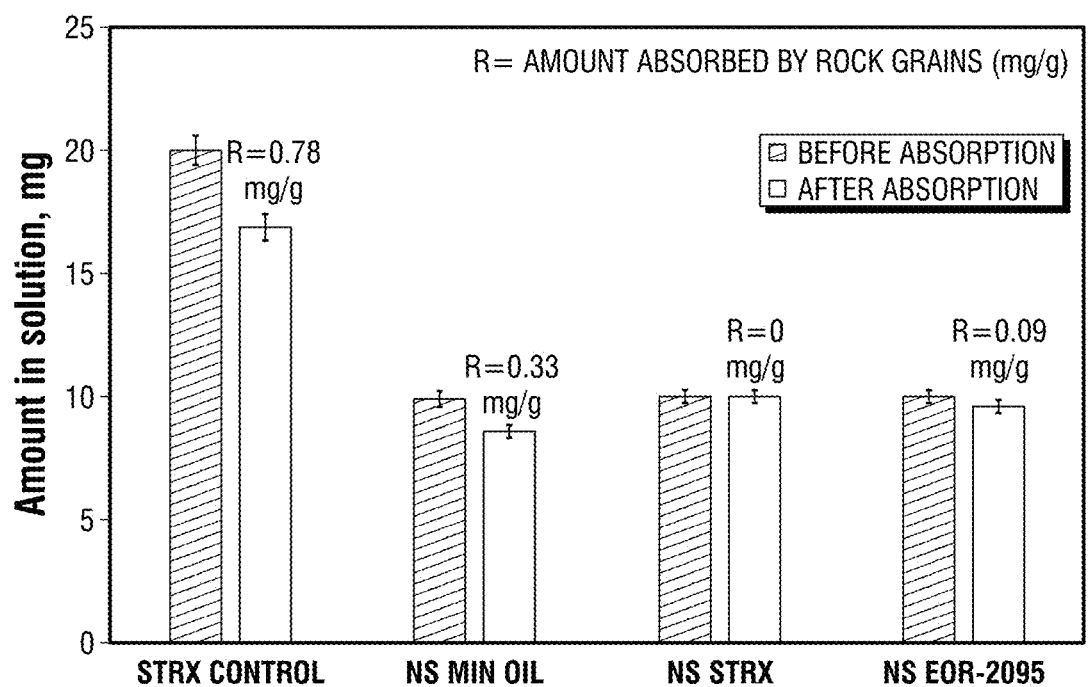
FIG. 24 is a graphical representation of the adsorption of active ingredients onto rock from different compositions—the zwitterionic co-surfactant alone (STRX control), the petroleum sulfonate alone (NS EOR-2095), the nanosurfactant mixture with the petroleum sulfonate and the zwitterionic co-surfactant (NS STRX), and the nanosurfactant mixture with the petroleum sulfonate, the zwitterionic co-surfactant, and mineral oil (NS min oil), according to an embodiment.
Figure 25:
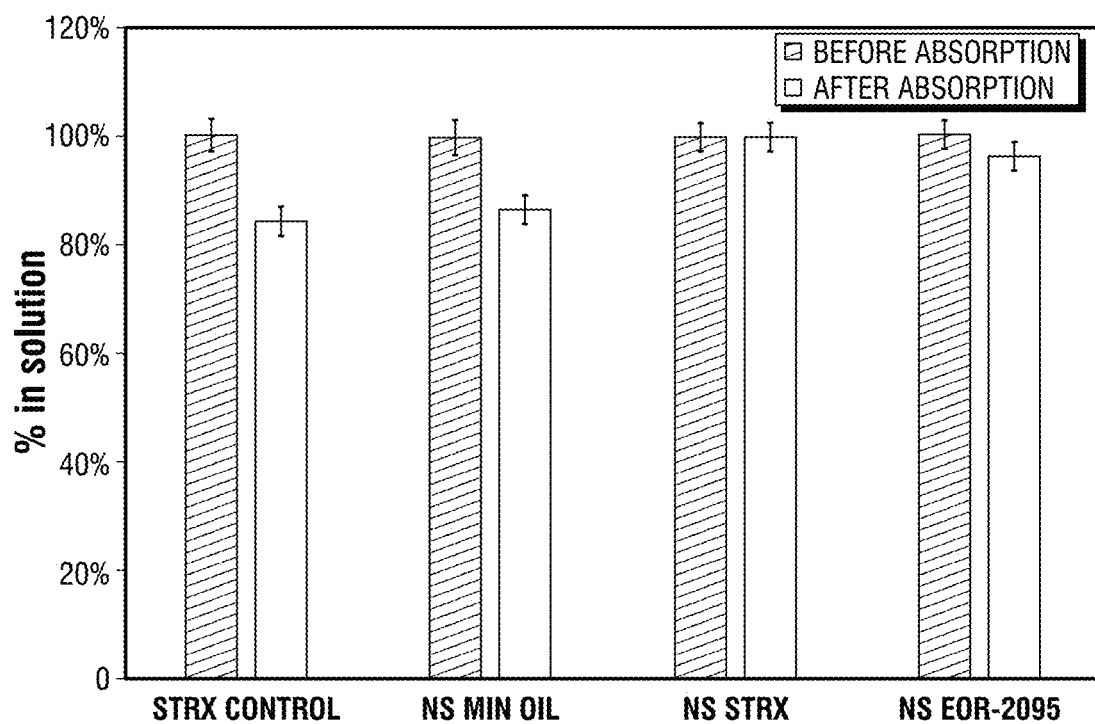
FIG. 25 is a graphical representation of the active ingredients that remain in solution from different compositions—the zwitterionic co-surfactant alone (STRX control), the petroleum sulfonate alone (NS EOR-2095), the nanosurfactant mixture with the petroleum sulfonate and the zwitterionic co-surfactant (NS STRX), and the nanosurfactant mixture with the petroleum sulfonate, the zwitterionic co-surfactant, and mineral oil (NS min oil), according to an embodiment.

In order to assess the effects of mineral oil on the stability and functionality of the nanosurfactant composition (STRX-NS), a set of stability experiments and IFT measurements were conducted following the same procedures and conditions described in the previous sections. FIGS. 24 and 25 and Table 9 summarize the results. As shown in Table 9, when the zwitterionic co-surfactant control was used alone, there was about 16% loss due to adsorption. When the nanosurfactant was used without the zwitterionic co-surfactant but still containing the petroleum sulfonates, then there was a 3% loss due to adsorption. When the nanosurfactant was used without mineral oil, there was a 13% loss due to adsorption as compared to almost no loss when the nanosurfactant was used with mineral oil. FIG. 24 shows the adsorption of the active ingredients onto the rock grains in mg/g and FIG. 25 on a percentage basis for the same samples.

TABLE 9

|  | Before mg | After mg | Loss mg | Loss (mg/g) | % Lost | % Remaining |
|---|---|---|---|---|---|---|
| Fluid with Zwitterionic co-surfactant only | 20 | 16.883 | 3.1169 | 0.7792 | 16% | 84% |
| Nanosurfactant without mineral oil | 10 | 8.6751 | 1.3249 | 0.3312 | 13% | 87% |
| Nanosurfactant with mineral oil | 10 | 10 | 0 | 0 | 0 | 100% |
| Fluid with petroleum sulfonates only | 10 | 9.6543 | 0.3457 | 0.0864 | 3% | 97% |

Figure 26A:
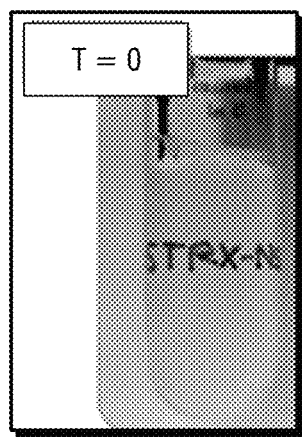
FIGS. 26A and 26B are photographs of test tubes containing compositions of the nanosurfactant mixture with the petroleum sulfonate, the zwitterionic co-surfactant, and mineral oil, before and after a seven day incubation period.
Figure 26B:
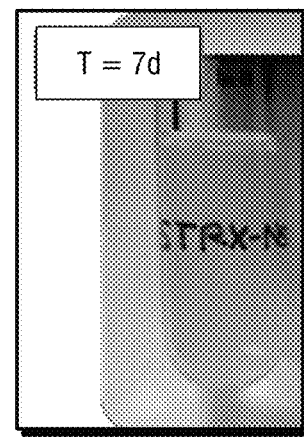
Figure 26C:
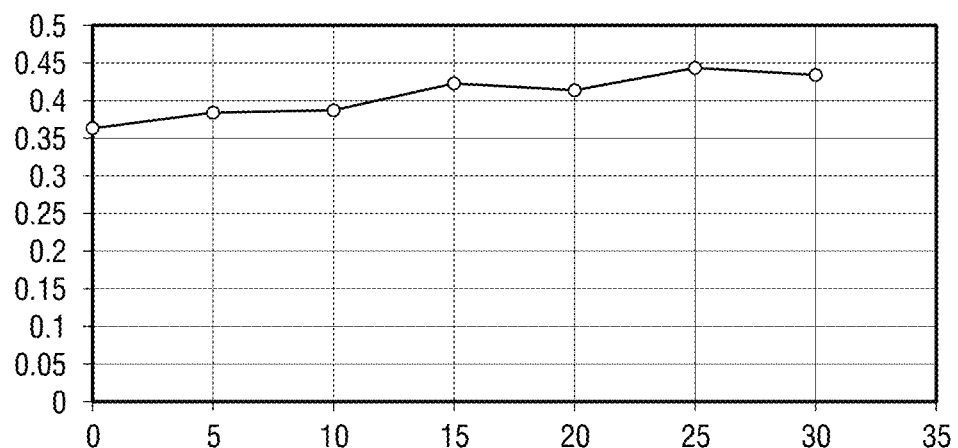
FIG. 26C is a graphical representation of the results from an IFT evaluation of the nanosurfactant mixture with the petroleum sulfonate, the zwitterionic co-surfactant, and mineral oil.

As shown in FIGS. 26A and 26B, removing ~100% of the mineral oil from the nanosurfactant composition did not affect its stability for the one week period reported. FIG. 26C is a graphical representation of the results from THE IFT evaluation of the nanosurfactant mixture with the petroleum sulfonate, the zwitterionic co-surfactant, and mineral oil. It is also important to note that in FIG. 26C, there is an increase in IFT to 0.43 mN/m caused by removing the mineral oil as compared to the previously reported IFT value of 0.3 mN/m for the zwitterionic co-surfactant-nanosurfactant containing mineral oil data. This result signifies the importance of the mineral oil in aiding the reduction of the IFT induced by the nanosurfactant mixture containing the zwitterionic co-surfactant, and also points out the possibilities of using different oils.

Several sorption tests were also conducted in which total organic carbon was used to quantify the amount of total carbon lost by sorption to the rock. For the nanosurfactant formulation containing the zwitterionic co-surfactant, the tests showed a total carbon loss of 0.88 mg/g after contact with the rock for 14 days at 100° C. This number corresponds to 13% loss of the total mineral oil introduced to the rock that aligns with the NMR results.

Example 7—Oil Recovery Efficiency

Figure 27:
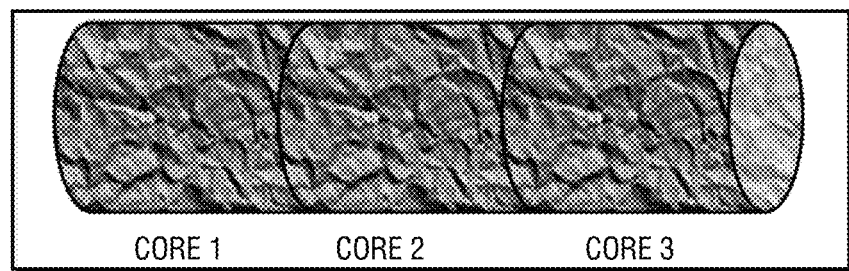
FIG. 27 is a diagrammatic representation of the composite arrangement of core plugs for the coreflooding experiments, according to an embodiment.
Figure 28:
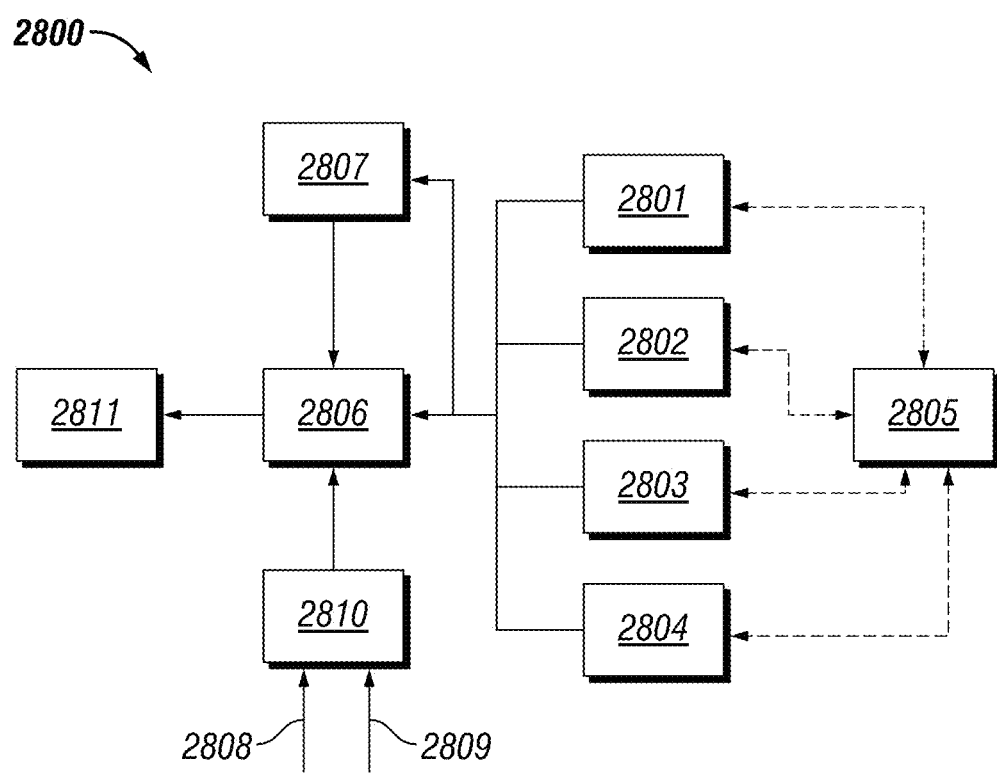
FIG. 28 is a schematic illustration of the automatic coreflooding system, according to an embodiment.

The nanosurfactant formulation containing the zwitterionic co-surfactant was subjected to further evaluation of oil recovery using several core plugs (17) from Arab-D reservoir. Routine core analysis was conducted and the petrophysical parameters, such as dimensions, porosity, permeability and pore volume were measured. For the first composite, three core plugs were selected based on their permeability, computed tomography (CT) scan and NMR data. The plugs were arranged as shown in FIG. 27. A schematic illustration of the experimental instrumentation 2800 is shown in FIG. 28. Four different vessels 2801, 2802, 2803, and 2804 are part of the instrumentation 2800. The vessels 2801, 2802, 2803, and 2804 were filled up with dead oil, live oil, synthetic seawater, and nanosurfactant composition, respectively, and the flow of these fluids is controlled by a flow control module 2805. The coreflooding experiment was performed using core sample holder 2806 at reservoir temperature (90° C.) with a flow rate of 0.5 cubic centimeter per minute. During the test, the differential pressure, oil, and water production were recorded in 30 second intervals. This data was used to calculate the incremental oil recovery.

The experimental instrumentation 2800 includes a delta pressure module 2807, capable of delivering low delta pressure, or medium delta pressure, or high delta pressure, and in fluid communication with the core sample holder 2806. The experimental instrumentation 2800 also includes an air inlet 2808 and a water inlet 2809 that are supplied to a confining pressure module 2810. This module 2810 is in fluid communication with the core sample holder 2806. Effluent from the core sample holder 2806 is supplied to a sample analysis module 2811. Not shown in the figure are separators, back-pressure modulators, filters, pressure and temperature sensors, valves, pumps, heating elements and cooling elements that are in fluid communication with various components of the experimental instrumentation 2800 and are known to one of ordinary skill in the art.

About 20 core plugs with known air permeability ($k_{air}$>50 milliDarcy)) were selected. These plugs were cleaned and dried and their dry parameters were measured ($k_{air}$, weight, porosity, density). These plugs were saturated with seawater and their wet weight and brine permeability ($k_w$) were measured. Effluent water samples leaving the plugs were subjected to geochemistry analysis (every 4 pore volumes (PV)). Aliquots were provided to an external laboratory for IFT and micromodel experiments and for later imbibition tests. The saturated volumes were calculated and NMR (T2) on seawater-saturated samples were conducted. Core plugs were then saturated with dead UTMN crude oil (4-5 PVs). Samples were centrifuged if needed. The volume of water was measured and the initial water saturation ($S_{wi}$) was calculated. The plugs were weighed and the volume of oil was calculated. NMR (T2) on oil-saturated plugs was conducted at $S_{wi}$. The effluent oil samples were processed for IFT and micromodel experiments. These plugs were then age-saturated with oil at 90° C. and 1000 psi. Then, the NMR (T2) analysis of the aged samples was conducted. Three sets of core plug composites (3 plugs each) were assembled and dynamic coreflooding was run on two sets of composite core plugs using seawater until reaching residual oil saturation, $S_{or}$. Two core plugs were flooded with nanosurfactant composition, one at $S_{wi}$ and one at $S_{or}$. NMR was conducted on plugs after the dynamic coreflood tests.

Figure 29A:
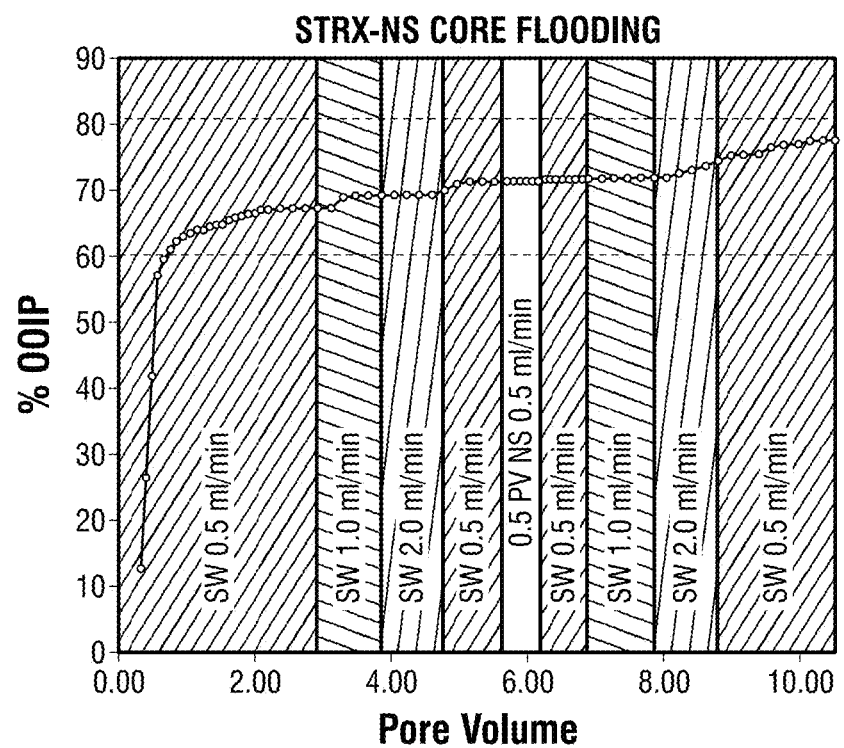
FIG. 29A is a graphical representation of the results from the coreflooding recovery experiment using a nanosurfactant mixture, according to an embodiment.
Figure 29B:
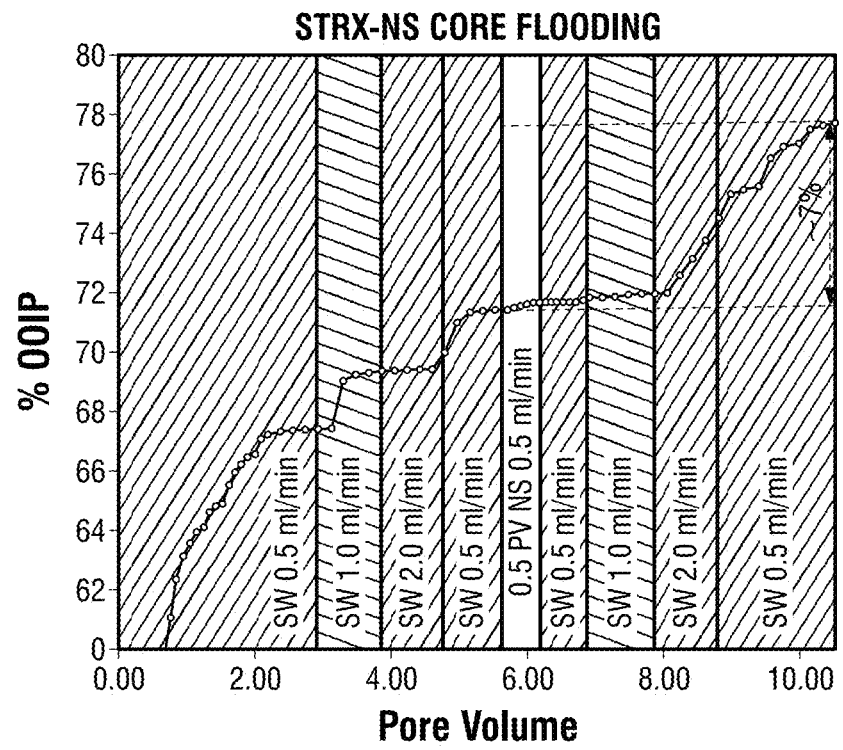
FIG. 29B is a zoomed-in version of a select section of FIG. 29A.

FIG. 29A shows the oil recovery results using the nanosurfactant composition. FIG. 29B shows the expanded view of the core flooding results after the original oil-in-place recovery. Around 70% of original oil-in-place was recovered by seawater flooding. After injecting the nanosurfactant formulation, about 7% of additional oil was recovered. The incremental increase in oil recovery took place shortly after injecting the nanosurfactant slug, but at a low rate. Later, when the flow rate was increased to 2 mL/min, there was a significant increase in the rate of oil recovery.

Example 8

Petroleum sulfonate was formulated by the following process. 60 mL of crude oil (API gravity of 35, viscosity of 10 cP at 30° C., 27% aromatics content) was placed in a syringe pump. 10 mL of 60% fuming sulfuric acid was placed in a sulfur trioxide (SO3) generation reactor. Sulfur trioxide gas was generated by bubbling nitrogen gas in the fuming sulfuric acid at 24° C. The crude oil and the nitrogen/sulfur trioxide gas were co-injected into a vertical polytetrafluoroethylene (PTFE) reactor having a 0.13 inch inner diameter and a 0.25 inch outer diameter at a rate where over-sulfonating and solid formation were prevented. The nitrogen gas rate was set at 130 mL/min using an air flow meter while the crude oil injection rate was set at 0.6 mL/min using a syringe pump. In the PTFE reactor, the crude oil drops are forced to deform against the tube wall and form a thin layer of sulfonated crude oil. The sulfonated crude oil (that is, the petroleum sulfonate) was collected at the bottom of the PTFE reactor in a flask while excess tail gas was scrubbed. After the reaction was over, 1.5 times the volume of isopropyl alcohol was added to the production flask and 35 wt. % aqueous sodium hydroxide was added dropwise while mixing until pH 7 was reached. The neutralized mixture was then filtered using filter paper. The solvents from the product were further removed using a rotary evaporator and the thick product was collected. To minimize hydrophobicity of the petroleum sulfonate product, deionized water was added and placed in a separation funnel until two phases were recognized. The water phase containing the petroleum sulfonate product was collected. The petroleum sulfonate had a sulfonate content ranging between 61 wt. % and 63 wt. %. The mixture had a mineral oil content ranging between 31 wt. % and 35 wt. %.

Example 9

Sample nanosurfactant compositions, including the petroleum sulfonate (formulated as shown in Example 8), the zwitterionic co-surfactant, and the mineral oil, were formulated by the following process. The petroleum sulfonate of Example 8 was used as the source for the petroleum sulfonate and the mineral oil. A petroleum sulfonate mixture was prepared by dissolving the petroleum sulfonate of Example 8 in deionized water. An aqueous zwitterionic co-surfactant solution was prepared by dissolving cocamidopropyl hydroxysultaine in deionized water. The petroleum sulfonate mixture and various quantities of the aqueous zwitterionic co-surfactant solution were vigorously mixed to form suspensions. Synthetic seawater (as shown for example in Table 1, having a TDS concentration of about 66,000 ppm) and each of the suspension were vigorously mixed to form the sample nanosurfactant compositions that may or may not include the stabilized nanoassemblies. The sample nanosurfactant compositions had an oil content ranging between about 0.002 wt. % and about 0.02 wt. %. The sample nanosurfactant compositions had properties as shown in Table 10.

TABLE 10

| Samples | Petroleum Sulfonate Concentration (wt. %) | Zwitterionic Co-Surfactant Concentration (wt. %) | Zwitterionic Co-Surfactant-to-Petroleum Sulfonate Ratio (v/v) |
|---|---|---|---|
| Sample 1 (Control) | 0.1 | 0 | 0 |
| Sample 2 | 0.1 | 0.0075 | 0.075 |
| Sample 3 | 0.1 | 0.015 | 0.15 |
| Sample 4 | 0.1 | 0.03 | 0.3 |

Figure 31:
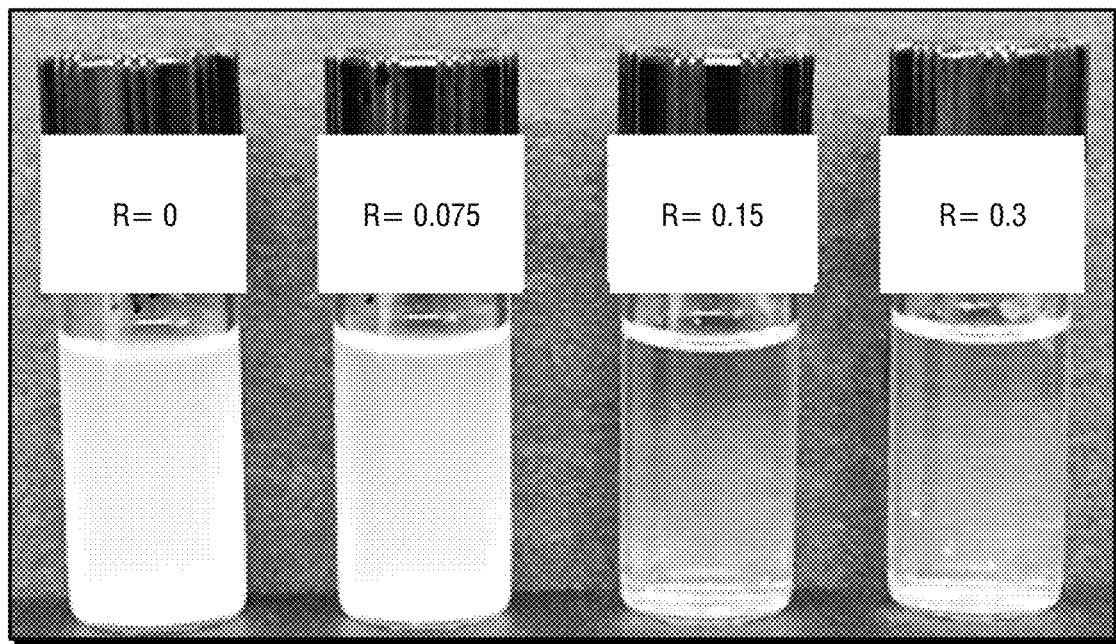
FIG. 31 is a photographic image of sample nanosurfactant compositions under white background light, according to an embodiment.

FIG. 31 shows a photographic image of the sample nanosurfactant compositions under white background light. Samples 1-4 are shown in order from the left hand side to the right hand side of FIG. 31. As can be seen, Samples 1 and 2 are relatively opaque while Samples 3 and 4 are relatively transparent. Without being bound by any theory, the opacity of the samples corresponds to the degree of stabilization of the nanoassemblies. Samples 3 and 4 include stabilized nanoassemblies where the hydrophilic portion of the zwitterionic co-surfactant interacts with the exterior saline aqueous environment while the petroleum sulfonate does not. Conversely, Sample 1 does not include the zwitterionic co-surfactant, and therefore the petroleum sulfonate alone does not form stable nanoassemblies. Sample 2 includes the zwitterionic co-surfactant, but the quantity of the zwitterionic co-surfactant is not sufficient to form a stable and transparent nanosurfactant composition.

Example 10

Sample nanosurfactant compositions, including the petroleum sulfonate (formulated as shown in Example 8), the zwitterionic co-surfactant, and the mineral oil, were formulated by the following process. The petroleum sulfonate of Example 8 was used as the source for the petroleum sulfonate and the mineral oil. A petroleum sulfonate mixture was prepared by dissolving the petroleum sulfonate of Example 8 in deionized water. A number of aqueous zwitterionic co-surfactant solutions were prepared by dissolving various types and quantities of sulfobetaines and carboxybetaines in deionized water. The petroleum sulfonate mixture and each of the aqueous zwitterionic co-surfactant solutions were vigorously mixed to form suspensions. Synthetic seawater (as shown for example in Table 1, having a TDS concentration of about 66,000 ppm) and each of the suspensions were vigorously mixed to form the sample nanosurfactant compositions that may or may not include the stabilized nanoassemblies. The sample nanosurfactant compositions had an oil content ranging between about 0.002 wt. % and about 0.02 wt. %. The sample nanosurfactant compositions had properties as shown in Table 11.

TABLE 11

| Samples | Petroleum Sulfonate Concentration (wt. %) | Zwitterionic Co-Surfactant | Zwitterionic Co-Surfactant Concentration (wt. %) | Zwitterionic Co-Surfactant-to-Petroleum Sulfonate Ratio (v/v) |
|---|---|---|---|---|
| Sample 5 | 0.1 | Cocamidopropyl Hydroxysultaine | 0.03 | 0.3 |

TABLE 11-continued

| Samples | Petroleum Sulfonate Concentration (wt. %) | Zwitterionic Co-Surfactant | Zwitterionic Co-Surfactant Concentration (wt. %) | Zwitterionic Co-Surfactant-to-Petroleum Sulfonate Ratio (v/v) |
|---|---|---|---|---|
| Sample 6 | 0.1 | Lauryl Betaine | 0.03 | 0.3 |
| Sample 7 | 0.1 | Coco-Betaine | 0.03 | 0.3 |
| Sample 8 | 0.1 | Cetyl Betaine | 0.03 | 0.3 |
| Sample 9 | 0.1 | Cetyl Betaine | 0.045 | 0.45 |
| Sample 10 (Control) | 0 | Cocamidopropyl Hydroxysultaine | 0.03 | — |
| Sample 11 (Control) | 0 | Lauryl Betaine | 0.03 | — |

Figure 32:
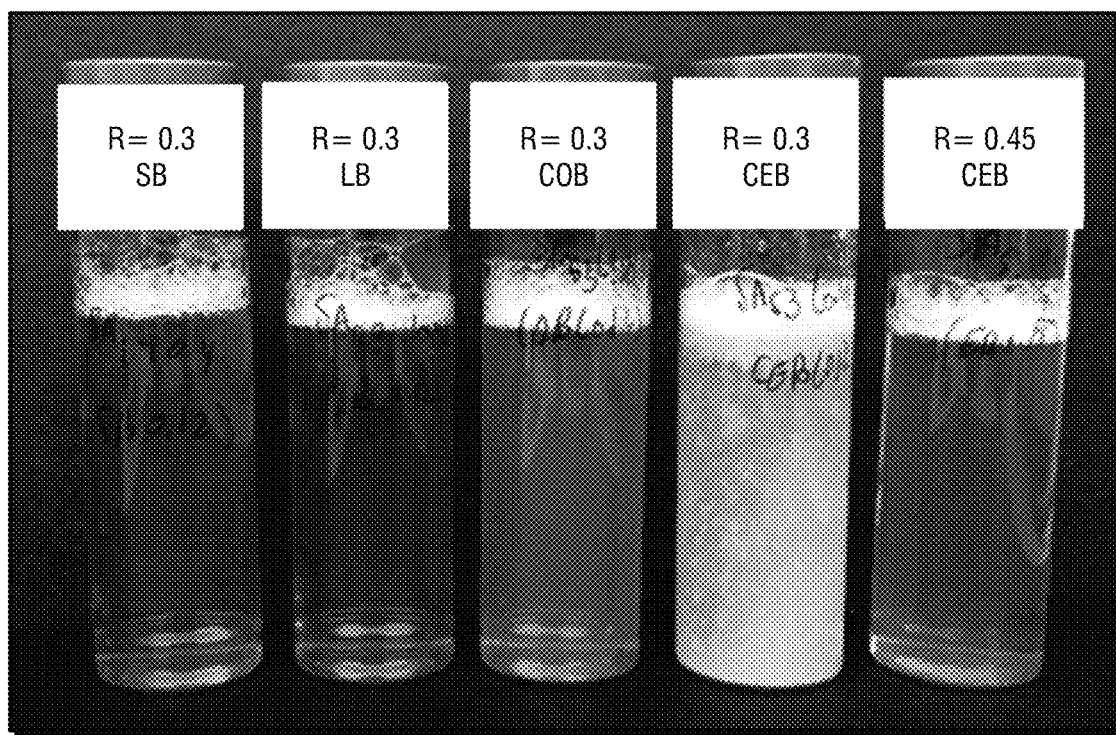
FIG. 32 is photographic image of sample nanosurfactant compositions under ambient background light, according to an embodiment.

FIG. 32 shows a photographic image of the sample nanosurfactant compositions (Samples 5-9) under ambient background light. Samples 5-9 are shown in order from the left hand side to the right hand side of FIG. 32. As can be seen, Sample 8 are relatively opaque while Samples 5-7 and 9 are relatively transparent. Without being bound by any theory, the opacity of the samples corresponds to the degree of stabilization of the nanoassemblies. Samples 5-7 and 9 include stabilized nanoassemblies where the hydrophilic portion of the zwitterionic co-surfactant interacts with the exterior aqueous saline environment while the petroleum sulfonate does not. Conversely, Sample 8 includes the zwitterionic co-surfactant, but the quantity of the zwitterionic co-surfactant lacks to form a stable and transparent nanosurfactant composition.

Example 11

Sand pack flood studies were performed to determine the degree of mobility reduction and conformance control of the nanosurfactant composition. Carbon dioxide gas and various quantities of the nanosurfactant composition were co-injected into a sand pack. The sand pack was contained in a stainless steel cylinder having an inner diameter of about 0.38 cm and a length of about 6 cm. The permeability of the sand pack was calculated based on the water viscosity of about 0.9 centipoise (cP) at about 24° C. using Darcy's Law. The total volumetric flow rate of the combined gas and aqueous phases during co-injection was kept constant.

In one study, a 50 Darcy sand pack was used representing a high permeability zone. Carbon dioxide gas and various quantities of Sample 6 of Example 10 were co-injected into the sand pack. A first control study was performed using carbon dioxide gas and water. A second control study was performed using water only. The results are shown in FIG. 33A.

Figure 33A:
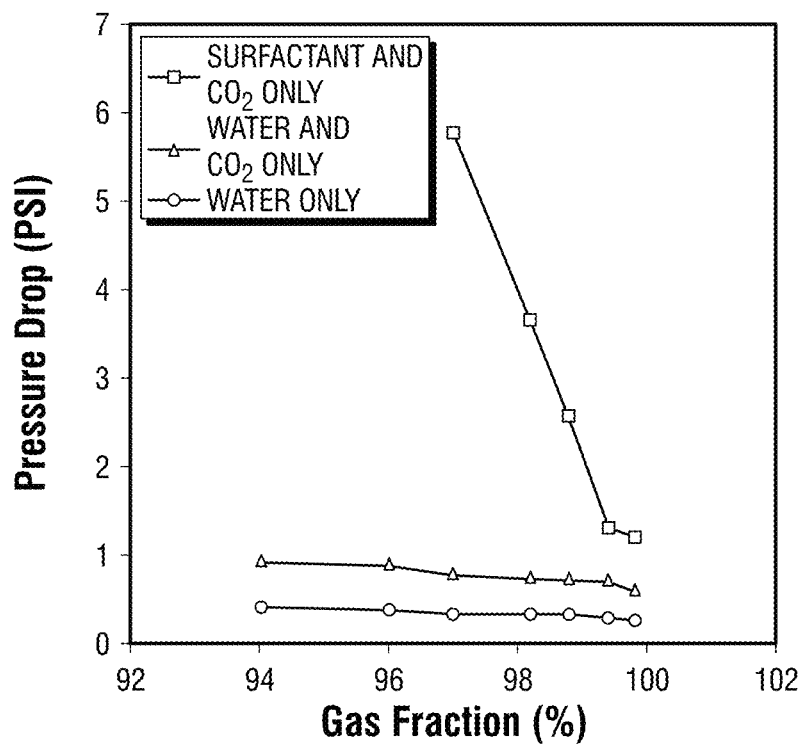
FIG. 33A is a graphical representation showing mobility reduction in a sand pack by co-injecting carbon dioxide and the nanosurfactant composition, according to an embodiment.

FIG. 33A is a graphical representation showing mobility reduction in the 50 Darcy sand pack by co-injecting carbon dioxide as the gas phase component and the nanosurfactant composition (or water) as the liquid phase component. The horizontal axis represents the gas fraction in vol. %. The vertical axis represents the pressure drop in psi. The square data points represent sand pack flooding studies conducted using carbon dioxide and Sample 6 as the nanosurfactant composition. The triangular data points represent sand pack flooding studies conducted using carbon dioxide and water. The circular data points represent sand pack flooding studies using only water.

The results show that when carbon dioxide was injected in conjunction with the nanosurfactant composition, at a 97 vol. % gas fraction, the mobility was reduced by a factor of about 16.8 times compared to water flooding.

In another study, a 27 Darcy sand pack was used representing a lower permeability zone. Carbon dioxide gas and various quantities of Sample 5 of Example 10 were co-injected into the sand pack. A first control study was performed using carbon dioxide gas and water. A second control study was performed using water only. The results are shown in FIG. 33B.

Figure 33B:
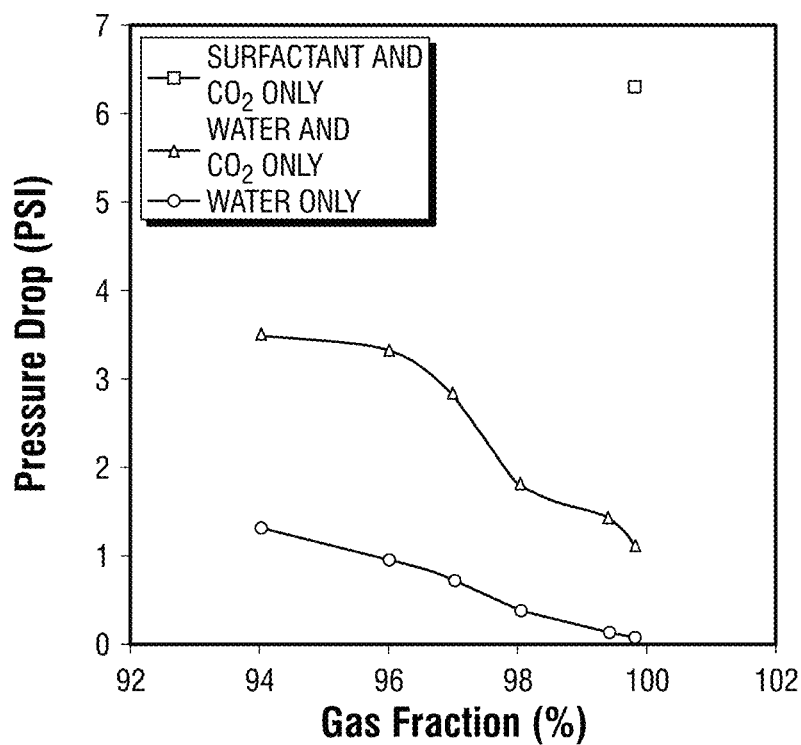
FIG. 33B is a graphical representation showing mobility reduction in a sand pack by co-injecting carbon dioxide and the nanosurfactant composition, according to an embodiment.

FIG. 33B is a graphical representation showing mobility reduction in the 27 Darcy sand pack by co-injecting carbon dioxide as the gas phase component and the nanosurfactant composition (or water) as the liquid phase component. The horizontal axis represents the gas fraction in vol. %. The vertical axis represents the pressure drop in psi. The square data points represent sand pack flooding studies conducted using carbon dioxide and Sample 5 as the nanosurfactant composition. The triangular data points represent sand pack flooding studies conducted using carbon dioxide and water. The circular data points represent sand pack flooding studies using only water.

The results show that when carbon dioxide was injected in conjunction with the nanosurfactant composition, at a 99.8 vol. % gas fraction, the mobility was reduced by a factor of about 115 times compared to water flooding.

In sum, the sand pack flooding studies collectively show that the nanosurfactant-based foam exhibits an excellent degree of mobility reduction and conformance control.

Example 12

Bubbling foam height studies were performed to determine foam stability of the nanosurfactant composition. The nanosurfactant composition (Samples 5 and 6 of Example 10) was placed in a 16 ounce or 500 mL glass graduated cylinder having a height of about 40 cm. A gaseous component (such as carbon dioxide and nitrogen) was continuously injected (or bubbled) into the bottom of the nanosurfactant composition to generate a foam on the surface. The flow rate of the gaseous component was about 100 mL/min. The gaseous component was injected until the foam reached a maximum height. Control studies were performed using only the zwitterionic co-surfactant (Samples 10 and 11 of Example 9). The results are shown in Table 12.

TABLE 12

| Samples | Carbon Dioxide Bubbling Foam Height (cm) | Nitrogen Bubbling Foam Height (cm) |
|---|---|---|
| Sample 5 | >35 | >35 |
| Sample 6 | >35 | >35 |
| Sample 10 (Control) | 26 | 30 |

TABLE 12-continued

| Samples | Carbon Dioxide Bubbling Foam Height (cm) | Nitrogen Bubbling Foam Height (cm) |
|---|---|---|
| Sample 11 (Control) | 28 | 22 |

The results show that the nanosurfactant composition is capable of generating a greater quantity of foam than using only the zwitterionic co-surfactant.

Example 13

Long term foam stability studies of the nanosurfactant composition were performed. About 30 mL of the nanosurfactant composition (Samples 5 and 6 of Example 10) was placed in a 100 mL glass graduated cylinder having a height of about 40 cm. Under a carbon dioxide or nitrogen environment, the nanosurfactant composition was vigorously shaken for about 20 seconds to generate a foam. The change of foam height was observed over time. Studies were performed at ambient temperature and at 90° C. Control studies were performed using only the zwitterionic co-surfactant (Samples 10 and 11 of Example 10). The results are shown in FIGS. 34A-C and 35A-C.

Figure 34C:
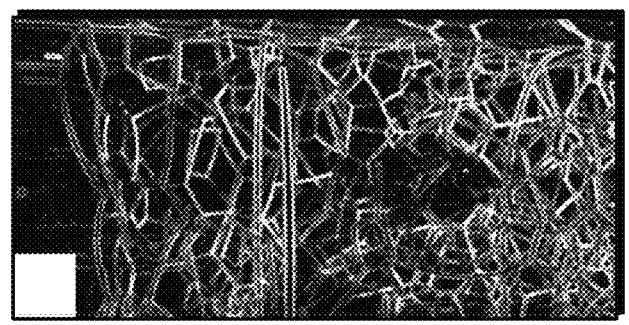
FIG. 34C is magnified dark field photographic image of a nitrogen-based foam containing a sample nanosurfactant composition at t=1,000 min, according to an embodiment.
Figure 34B:
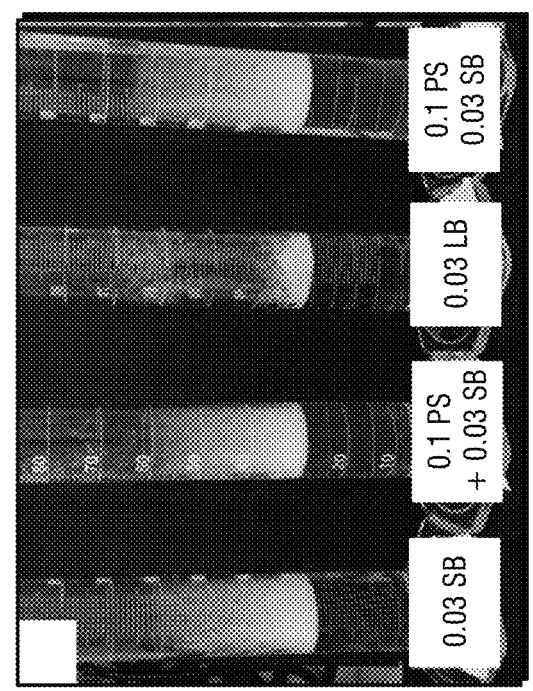
FIG. 34B is a photographic image showing nitrogen-based foam stability of sample nanosurfactant compositions at t=200 min, according to an embodiment.
Figure 34A:
FIG. 34A is a photographic image showing nitrogen-based foam stability of sample nanosurfactant compositions at t=0, according to an embodiment.

FIG. 34A is a photographic image showing nitrogen-based foam stability of the sample nanosurfactant compositions (Samples 10, 5, 11, and 6 are shown in order from the left hand side to the right hand side) at time zero (that is, immediately after vigorously shaking the nanosurfactant compositions). FIG. 34B is a photographic image showing nitrogen-based foam stability of the sample nanosurfactant compositions (Samples 10, 5, 11, and 6 are shown in order from the left hand side to the right hand side) after 200 min. FIG. 34C is a magnified dark field photographic image of a nitrogen-based foam containing Sample 5 showing spider web lamellae after 1,000 min.

Figure 35A:
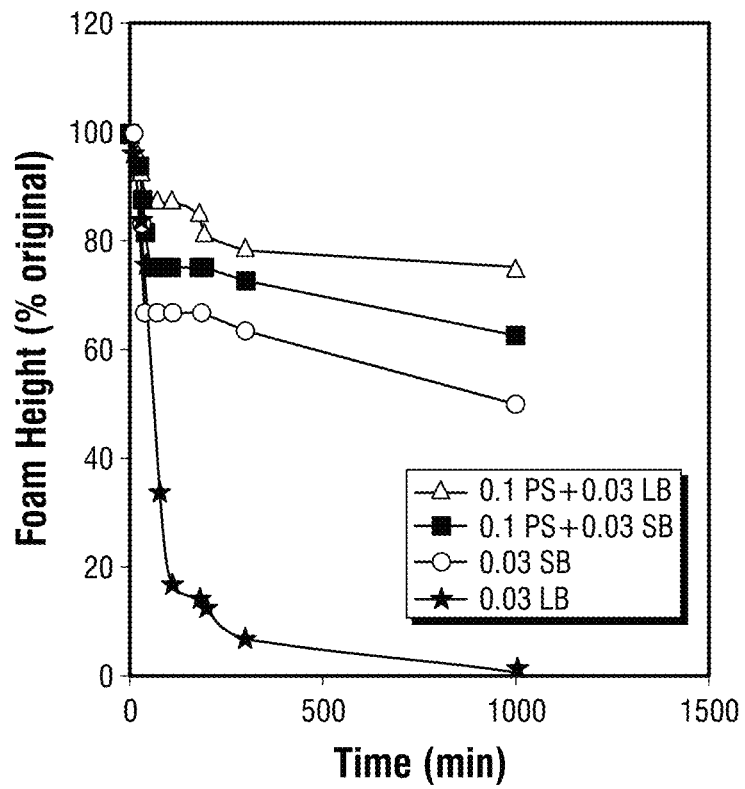
FIG. 35A is a graphical representation showing nitrogen-based foam heights of sample nanosurfactant compositions over time at ambient temperature and pressure, according to an embodiment.

FIG. 35A is a graphical representation showing nitrogen-based foam heights of the sample nanosurfactant compositions over time at ambient temperature and pressure. The horizontal axis represents time in min. The vertical axis represents the foam height relative to time zero in percent. The square data points represent the foam height of Sample 5. The triangular data points represent the foam height of Sample 6. The circular data points represent the foam height of Sample 10. The star-shaped data points represent the foam height of Sample 11. As can be seen, the nitrogen-based foams of Samples 5 and 6 at ambient conditions exhibit superior foam stability in comparison with Samples 10 and 11 for over 1,000 min.

Figure 35B:
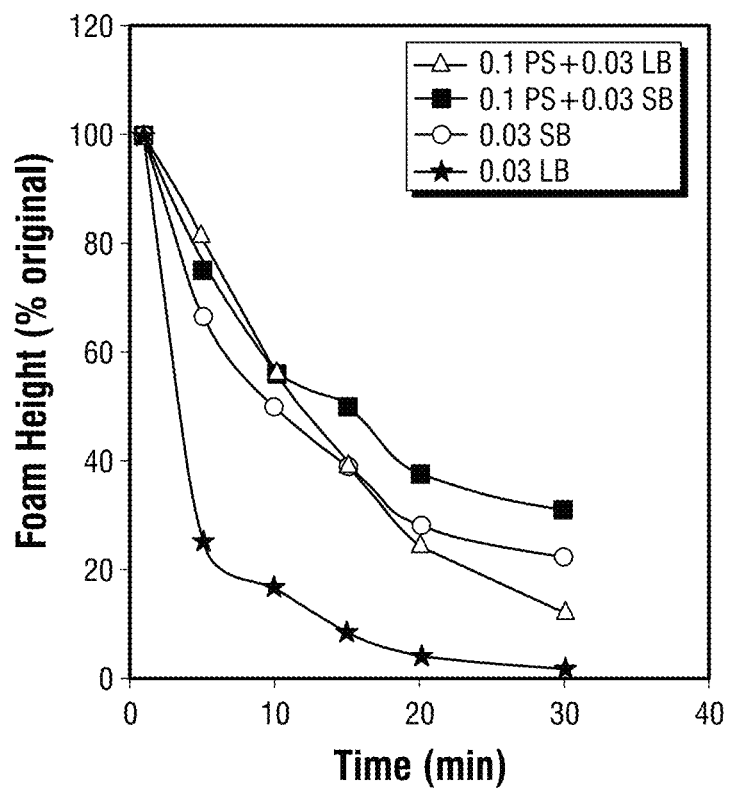
FIG. 35B is a graphical representation showing nitrogen-based foam heights of sample nanosurfactant compositions over time at 90° C. and ambient pressure, according to an embodiment.

FIG. 35B is a graphical representation showing nitrogen-based foam heights of the sample nanosurfactant compositions over time at 90° C. and ambient pressure. The horizontal axis represents time in min. The vertical axis represents the foam height relative to time zero in percent. The square data points represent the foam height of Sample 5. The triangular data points represent the foam height of Sample 6. The circular data points represent the foam height of Sample 10. The star-shaped data points represent the foam height of Sample 11. As can be seen, the nitrogen-based foams of Samples 5 and 6 at 90° C. are less stable than that at ambient temperature. Without being bound by any theory, the stability of the nitrogen-based foams at elevated temperatures may be negatively affected by the faster rate of water evaporation.

Figure 35C:
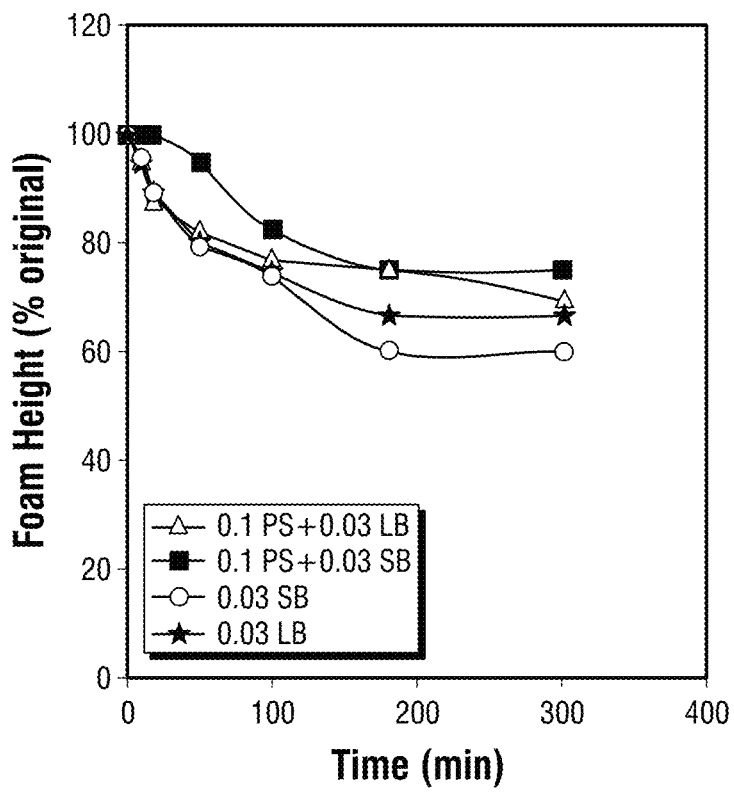
FIG. 35C is a graphical representation showing carbon dioxide-based foam heights of sample nanosurfactant compositions over time at ambient temperature and pressure, according to an embodiment.

FIG. 35C is a graphical representation showing carbon dioxide-based foam heights of the sample nanosurfactant compositions over time at ambient temperature and pressure. The horizontal axis represents time in min. The vertical axis represents the foam height relative to time zero in percent. The square data points represent the foam height of Sample 5. The triangular data points represent the foam height of Sample 6. The circular data points represent the foam height of Sample 10. The star-shaped data points represent the foam height of Sample 11. As can be seen, the carbon dioxide-based foams of Samples 5 and 6 at ambient temperature are less stable than the nitrogen-based foams of Samples 5 and 6 at ambient temperature. Without being bound by any theory, the lesser foam stability of the carbon dioxide-based foams than the nitrogen-based foams may be due to the miscibility of carbon dioxide in water.

Example 14

IFT studies (similar to Example 3) were performed using a Kruss spinning drop tensiometer. A crude oil droplet was suspended in various concentrations of the nanosurfactant composition. The nanosurfactant composition included cocamidopropyl hydroxysultaine as the zwitterionic co-surfactant and the petroleum sulfonate. The zwitterionic co-surfactant-to-petroleum sulfonate volume ratio was about 0.3. The temperature was elevated to and maintained at 90° C. The IFT values between the crude oil and the nanosurfactant composition were monitored until no further reduction in IFT occurred. The IFT measurements were taken while no further reduction in IFT occurred, which was about 10 minutes. The results are shown in FIG. 36.

Figure 36:
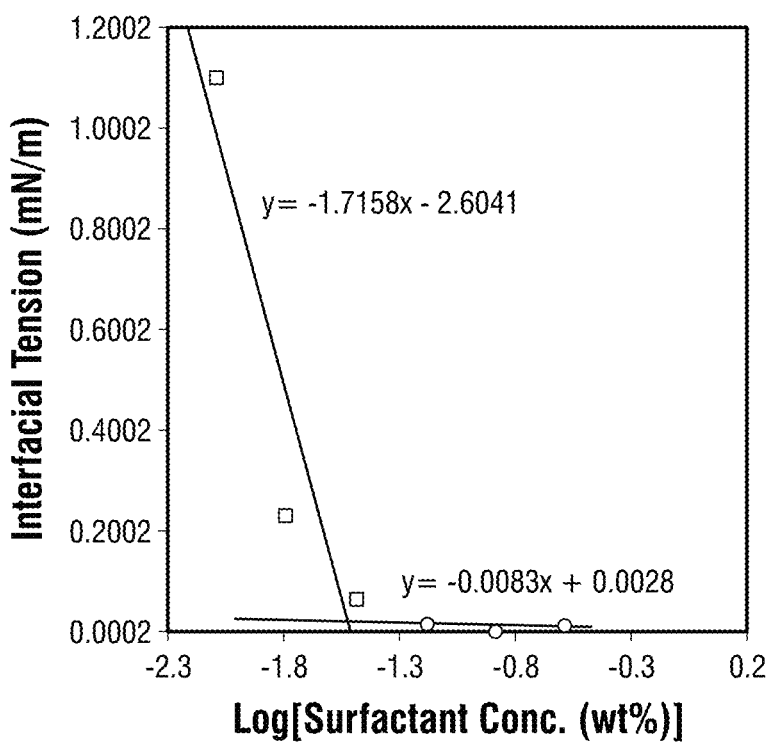
FIG. 36 is a graphical representation showing oil-water IFT values for a nanosurfactant composition having crude oil as a light phase, according to an embodiment.

FIG. 36 is a graphical representation showing oil-water IFT values between the crude oil and the nanosurfactant composition. The horizontal axis represents the concentration of the nanosurfactant composition in $\log_{10}$[wt. %]. The vertical axis represents the IFT in mN/m. As can be seen, as the concentration of the nanosurfactant composition increased, the crude oil-brine IFT at 90° C. decreased according to the left hand side linear regression line (based on the square data points) until the critical micelle concentration (CMC) was met. The CMC of the nanosurfactant composition was determined to be about 0.03 wt. %. Once the CMC was met, as the concentration of the nanosurfactant composition increased, the crude oil-brine IFT at 90° C. decreased (in a rate less than before the CMC was met) according to the right hand side linear regression line (based on the circular data points). The least IFT value obtained was about 0.0014 mN/m at about 0.13 wt. %, corresponding to Sample 5 of Example 10.

Figure 37:
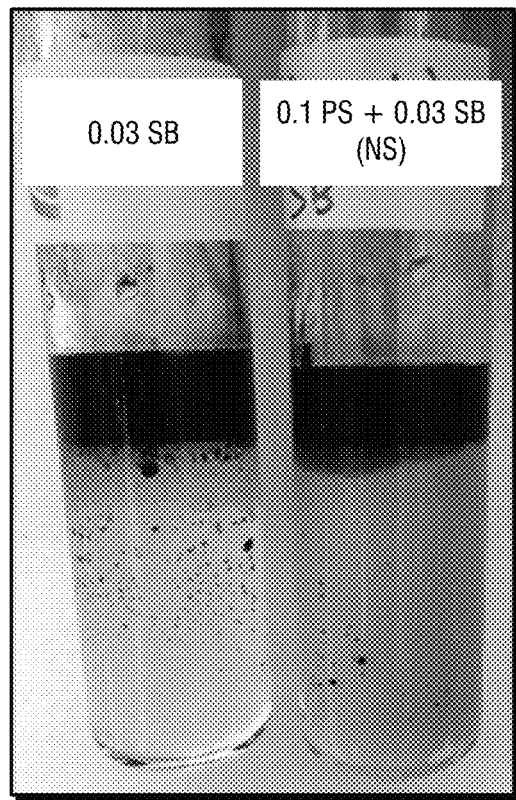
FIG. 37 is a photographic image showing emulsion formation at 90° C. using a crude oil-suspended nanosurfactant composition, according to an embodiment.

FIG. 37 is a photographic image showing emulsion formation at 90° C. using the crude oil-suspended nanosurfactant composition. The right hand side vial represents crude oil suspended in Sample 5 of Example 10 (corresponding to the least IFT value of 0.0014 mN/m) forming an emulsion. The left hand side vial represents crude oil suspended in Sample 10 of Example 10 (0.03 wt. % zwitterionic co-surfactant in the absence of the petroleum sulfonate), exhibiting immiscibility between the oil phase and the aqueous phase.

In one study, the crude oil-suspended Sample 5 nanosurfactant composition was maintained at 90° C. for as long as a month, and IFT measurements were taken after a day, a week, and a month. After a day, the IFT value was maintained at about 0.0014 mN/m. After a week, the IFT value was about 0.0020 mN/m. After a month, the IFT value was about 0.0028 mN/m. The results show that the nanosurfactant composition maintains relatively low degrees of crude oil-brine IFT values for a prolonged period at elevated temperatures, making it suitable for enhanced oil recovery.

Example 15

Contact angle studies were performed to determine the rock surface wettability of the nanosurfactant composition. A drop of Sample 5 of Example 10 was placed on the surface of an aged calcium carbonate rock and the contact angle was measured. This sequence was repeated multiple times to obtain a mean contact angle. A first control study was performed using a drop of Sample 10 of Example 10 in the absence of petroleum sulfonate. A second control study was performed using a drop of synthetic sea water only. The results are shown in Table 13.

TABLE 13

| Sample | Mean Contact Angle |
|---|---|
| Sample 5 | 13.2° |
| Sample 10 (Control) | 30.5° |
| Synthetic Sea Water (Control) | 82.8° |

The results show that the contact angle of Sample 5 on aged hydrophobic calcium carbonate rock indicates a change of surface wettability of the carbonate rock from oil-wet to water-wet. In comparison, synthetic sea water by itself had a relatively large contact angle due to hydrophobicity of the carbonate rock. Sample 10 moderately changed the surface wettability of the carbonate rock but substantially less than Sample 5.

Example 16

Wettability alteration-based oil recovery studies were performed. An aged calcium carbonate rock was cut in half. One half of the rock was submerged in Sample 5 of Example 10 and was maintained at 90° C. overnight. In a control study, the other half of the rock was submerged in Sample 10 of Example 10 (in the absence of petroleum sulfonate) and was maintained at 90° C. overnight. The results are shown in FIG. 38.

Figure 38:
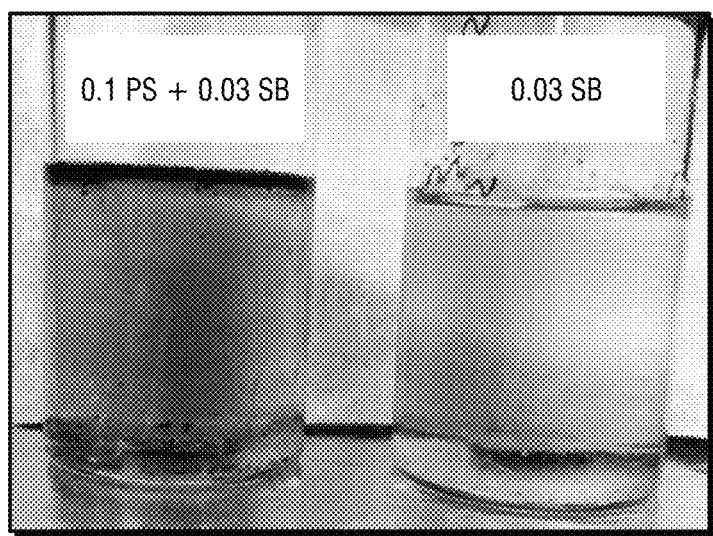
FIG. 38 is a photographic image showing oil recovery by imbibition and wettability alteration using a nanosurfactant composition, according to an embodiment.

FIG. 38 is a photographic image showing oil recovery by imbibition and wettability alteration using the nanosurfactant composition. The left hand side vial represents the carbonate rock submerged in Sample 5. The right hand side vial represents the carbonate rock submerged in Sample 10. As shown in the left hand side vial, the nanosurfactant composition of Sample 5 was capable of recovering crude oil contained within the carbonate rock, which is shown as the dark layer on the surface of the transparent liquid. In comparison, crude oil recovery was not observed in the right hand side vial using Sample 10.

The results show that the nanosurfactant composition is suitable for enhanced oil recovery.

Example 17

Figure 39A:
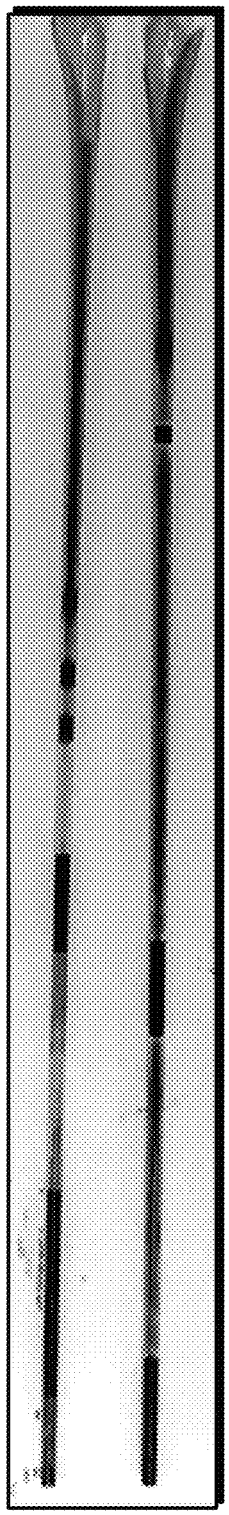
FIG. 39A is a photographic image showing two glass tubes filled with crude oil, according to an embodiment.

Foam-based oil recovery studies were performed. As shown in FIG. 39A, crude oil was passed and filled in two glass tubes both having an inner diameter of about 0.034 inch and an outer diameter of about 0.054 inch. The opaque color of the glass tubes indicates the adsorption of the crude oil onto the silica-based glass surface. In one study, 4 mL of a nitrogen-based foam of Example 13 including the nano-surfactant composition of Sample 5 were introduced to one of the crude oil-filled glass tube. In a control study, 4 mL of a nitrogen-based foam of Example 13 including Sample 10 (in the absence of petroleum sulfonate) were introduced to the other crude oil-filled glass tube. The results are shown in FIG. 39B.

Figure 39B:
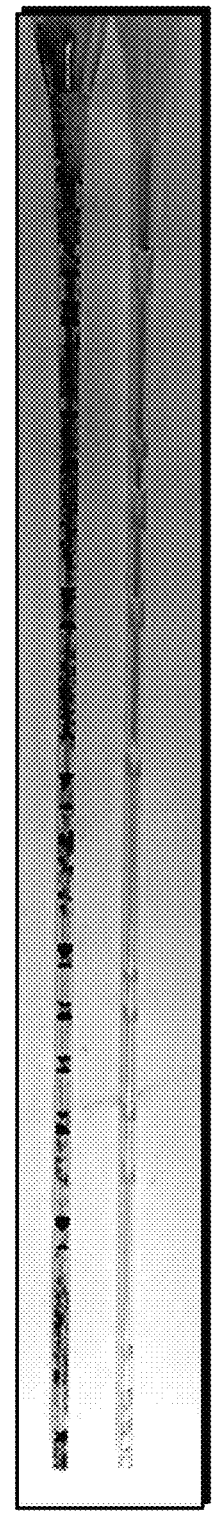
FIG. 39B is a photographic image showing oil recovery by wettability alteration using a nitrogen-based foam including a nanosurfactant composition, according to an embodiment.

FIG. 39B is a photographic image showing oil recovery by wettability alteration using a nitrogen-based foam including the nanosurfactant composition. The lower glass tube represents the result of passing 4 mL of the nitrogen-based foam of Example 13 including the nanosurfactant composition of Sample 5 to the crude oil-filled glass tube. The upper glass tube represents the results of passing 4 mL of the nitrogen-based foam of Example 13 including Sample 10 (in the absence of petroleum sulfonate) to the crude oil-filled glass tube. As can be seen, passing the nitrogen-based foam including Sample 5 resulted in recovering substantially all of the crude oil that was previously filled in the glass tube such that the glass tube became transparent. Without being bound by any theory, this is due to the nanosurfactant composition of Sample 5 being capable of altering the wettability of the glass tube from oil-wet to water-wet and capable of reducing the IFT between the oil phase and the aqueous phase. In comparison, passing the nitrogen-based foam including Sample 10 resulted in a certain degree of crude oil left on the inner surface of the glass tube such that the glass tube had an opaque color.

The results show that the nitrogen-based foam including the nanosurfactant composition is suitable for enhanced oil recovery.

Ranges may be expressed here as from about one particular value and to about another particular value. Where the range of values is described or referenced here, the interval encompasses each intervening value between the upper limit and the lower limit as well as the upper limit and the lower limit and includes smaller ranges of the interval subject to any specific exclusion provided. Where a method comprising two or more defined steps is recited or referenced here, the defined steps can be carried out in any order or simultaneously except where the context excludes that possibility. While various embodiments have been described in detail for the purpose of illustration, they are not to be construed as limiting, but are intended to cover all the changes and modifications within the spirit and scope thereof.

What is claimed is:

1. A method of producing hydrocarbons from a hydrocarbon-bearing formation, the method comprising the steps of:
   preparing a nanosurfactant composition, the nanosurfactant composition formed by the steps of:
      combining a sulfonate surfactant, an oil, and fresh water to form a first mixture;
      combining a zwitterionic co-surfactant and the fresh water to form a second mixture;
      combining the first mixture and the second mixture to form a third mixture; and
      combining the third mixture and saline water to form the nanosurfactant composition, the saline water comprising divalent cations, the nanosurfactant composition comprising a nanoassembly,
   wherein the nanoassembly has a hydrophobic interior and a hydrophilic exterior, the hydrophobic interior comprising the sulfonate surfactant, a hydrophobic portion of the zwitterionic co-surfactant, and the oil, the hydrophilic exterior comprising a hydrophilic portion of the zwitterionic co-surfactant, wherein the hydrophilic portion of the zwitterionic co-surfactant stabilizes the nanoassembly by interacting with the divalent cations present in the saline water, wherein the oil facilitates containment of the sulfonate surfactant in the hydrophobic interior of the nanoassembly, wherein the quantity of the sulfonate surfactant in the nanosurfactant composition ranges between 0.1 wt % and 0.25 wt %, wherein the quantity of the oil in the nanosurfactant composition ranges between 0.002 wt % and 0.02 wt %; and introducing the nanosurfactant composition and a gaseous component into the hydrocarbon-bearing formation such that a nanosurfactant-based foam is generated to displace the hydrocarbons from the hydrocarbon-bearing formation, wherein the nanosurfactant-based foam reduces interfacial tension between the hydrocarbons and the saline water.

2. The method of claim 1, wherein the nanoassembly has a diameter ranging between 10 nm and 100 nm.

3. The method of claim 1, wherein the sulfonate surfactant is petroleum sulfonate.

4. The method of claim 3, wherein the petroleum sulfonate includes one selected from the group consisting of: an alkyl sulfonate, and alkyl aryl sulfonate, and combinations of the same.

5. The method of claim 1, wherein the zwitterionic co-surfactant is selected from the group consisting of: a sulfobetaine, a carboxybetaine, and combinations of the same.

6. The method of claim 1, wherein the zwitterionic co-surfactant is cocamidopropyl hydroxysultaine.

7. The method of claim 1, wherein the zwitterionic co-surfactant is lauryl betaine.

8. The method of claim 1, wherein the nanosurfactant composition has a zwitterionic co-surfactant content ranging between 0.01 wt. % and 0.25 wt. %.

9. The method of claim 1, wherein the oil is mineral oil.

10. The method of claim 1, wherein the gaseous component is selected from the group consisting of: nitrogen, carbon dioxide, and combinations of the same.

11. The method of claim 1, wherein the fresh water has a total dissolved solids concentration less than 3,000 ppm.

12. The method of claim 1, wherein the saline water has a total dissolved solids concentration greater than 10,000 ppm.

13. A nanosurfactant-based foam composition suitable for injection into a hydrocarbon-bearing formation for enhanced oil recovery operations, the nanosurfactant-based foam composition comprising:

a gaseous component; and a nanosurfactant composition, the nanosurfactant composition comprising:

a nanoassembly, the nanoassembly comprising:

a hydrophobic interior, the hydrophobic interior comprising:

petroleum sulfonate;

a hydrophobic portion of a zwitterionic co-surfactant; and mineral oil; and a hydrophilic exterior, the hydrophilic exterior comprising a hydrophilic portion of the zwitterionic co-surfactant; and an aqueous environment, the aqueous environment comprising divalent cations, wherein the hydrophilic portion of the zwitterionic co-surfactant is configured to stabilize the nanoassembly by interacting with the divalent cations present in the aqueous environment, wherein the mineral oil is configured to facilitate containment of the petroleum sulfonate in the hydrophobic interior of the nanoassembly, wherein the quantity of the petroleum sulfonate in the nanosurfactant composition ranges between 0.1 wt % and 0.25 wt %, wherein the quantity of the mineral oil in the nanosurfactant composition ranges between 0.002 wt % and 0.02 wt %.

14. The nanosurfactant-based foam composition of claim 13, wherein the nanoassembly has a diameter ranging between 10 nm and 100 nm.

15. The nanosurfactant-based foam composition of claim 13, wherein the zwitterionic co-surfactant is selected from the group consisting of: a sulfobetaine, a carboxybetaine, and combinations of the same.

16. The nanosurfactant-based foam composition of claim 13, wherein the zwitterionic co-surfactant is cocamidopropyl hydroxysultaine.

17. The nanosurfactant-based foam composition of claim 13, wherein the zwitterionic co-surfactant is lauryl betaine.

18. The nanosurfactant-based foam composition of claim 13, wherein the gaseous component is selected from the group consisting of: nitrogen, carbon dioxide, and combinations of the same.

19. A method of enhanced oil recovery, the method comprising the steps of:

preparing a nanosurfactant composition, the nanosurfactant composition formed by the steps of:

combining petroleum sulfonate, mineral oil, and fresh water to form a first mixture;

combining cocamidopropyl hydroxysultaine and the fresh water to form a second mixture;

combining the first mixture and the second mixture to form a third mixture; and combining the third mixture and saline water to form the nanosurfactant composition, the saline water comprising divalent cations, the nanosurfactant composition comprising a nanoassembly, wherein the nanoassembly has a hydrophobic interior and a hydrophilic exterior, the hydrophobic interior comprising the petroleum sulfonate, a hydrophobic portion of the cocamidopropyl hydroxysultaine, and the mineral oil, the hydrophilic exterior comprising a hydrophilic portion of the cocamidopropyl hydroxysultaine, wherein the hydrophilic portion of the cocamidopropyl hydroxysultaine stabilizes the nanoassembly by interacting with the divalent cations present in the saline water, wherein the mineral oil facilitates containment of the petroleum sulfonate in the hydrophobic interior of the nanoassembly, wherein the quantity of the petroleum sulfonate in the nanosurfactant composition ranges between 0.1 wt % and 0.25 wt %, wherein the quantity of the mineral oil in the nanosurfactant composition ranges between 0.002 wt % and 0.02 wt %; and introducing the nanosurfactant composition and nitrogen gas into a hydrocarbon-bearing formation such that a nanosurfactant-based foam is generated to displace hydrocarbons from the hydrocarbon-bearing formation, wherein the nanosurfactant-based foam reduces interfacial tension between the hydrocarbons and the saline water.

20. A method of enhanced oil recovery, the method comprising the steps of:
preparing a nanosurfactant composition, the nanosurfactant composition formed by the steps of:
combining petroleum sulfonate, mineral oil, and fresh water to form a first mixture;
combining lauryl betaine and the fresh water to form a second mixture;
combining the first mixture and the second mixture to form a third mixture; and
combining the third mixture and saline water to form the nanosurfactant composition, the saline water comprising divalent cations, the nanosurfactant composition comprising a nanoassembly,
wherein the nanoassembly has a hydrophobic interior and a hydrophilic exterior, the hydrophobic interior comprising the petroleum sulfonate, a hydrophobic portion of the lauryl betaine, and the mineral oil, the hydrophilic exterior comprising a hydrophilic portion of the lauryl betaine,
wherein the hydrophilic portion of the lauryl betaine stabilizes the nanoassembly by interacting with the divalent cations present in the saline water,
wherein the mineral oil facilitates containment of the petroleum sulfonate in the hydrophobic interior of the nanoassembly,
wherein the quantity of the petroleum sulfonate in the nanosurfactant composition ranges between 0.1 wt % and 0.25 wt %,
wherein the quantity of the mineral oil in the nanosurfactant composition ranges between 0.002 wt % and 0.02 wt %; and
introducing the nanosurfactant composition and nitrogen gas into a hydrocarbon-bearing formation such that a nanosurfactant-based foam is generated to displace hydrocarbons from the hydrocarbon-bearing formation, wherein the nanosurfactant-based foam reduces interfacial tension between the hydrocarbons and the saline water.

* * * * *